(12) United States Patent
Acharya et al.

(10) Patent No.: US 9,704,393 B2
(45) Date of Patent: Jul. 11, 2017

(54) INTEGRATED INTELLIGENT SERVER BASED SYSTEM AND METHOD/SYSTEMS ADAPTED TO FACILITATE FAIL-SAFE INTEGRATION AND/OR OPTIMIZED UTILIZATION OF VARIOUS SENSORY INPUTS

(75) Inventors: Tinku Acharya, Kolkata (IN); Tutai Kumar Dalal, Paschim Medinipur (IN); Soumyadip Maity, Purba Medinipur (IN); Dipak Bhattacharyya, Hooghly (IN); Sawan Das, Kolkata (IN); Soumyadeep Dhar, Darjeeling (IN); Tuhin Bose, Kolkata (IN)

(73) Assignee: VIDEONETICS TECHNOLOGY PRIVATE LIMITED, Kolkata (IN)

( * ) Notice: Subject to any disclaimer, the term of this patent is extended or adjusted under 35 U.S.C. 154(b) by 360 days.

(21) Appl. No.: 13/347,796

(22) Filed: Jan. 11, 2012

(65) Prior Publication Data

US 2012/0179742 A1    Jul. 12, 2012

Related U.S. Application Data

(60) Provisional application No. 61/431,448, filed on Jan. 11, 2011.

(51) Int. Cl.
*G06F 15/16* (2006.01)
*G08G 1/017* (2006.01)
(Continued)

(52) U.S. Cl.
CPC ............ *G08G 1/0175* (2013.01); *H04N 5/77* (2013.01); *H04N 7/18* (2013.01);
(Continued)

(58) Field of Classification Search
CPC ................ H04L 15/16; H04L 11/3433; H04L 17/30781; H04L 17/30017; H04L 11/3442;
(Continued)

(56) References Cited

U.S. PATENT DOCUMENTS 5,668,948 A * 9/1997 Belknap .................. H04H 1/02
                                                                709/231
6,240,105 B1 * 5/2001 Zetts ............................ 370/503
(Continued)

OTHER PUBLICATIONS

Video Streaming Using a Location-based Bandwidth-Lookup Service for Bitrate Planning—Griwodz et al., Feb. 2011, ACM Transactions on Multimedia Computing, Communications and Application (TOMCCAP)—pp. 1-26.*

*Primary Examiner* — Anthony Mejia
(74) *Attorney, Agent, or Firm* — The PL Law Group, PLLC

(57) ABSTRACT

Integrated intelligent system adapted for any operating system and/or multi-OS computing environment seamlessly having sensory input/data acquisition cum recording server group and/or analytics server group enabling fail-safe integration and/or optimized utilization of various sensory inputs for various utility applications. Also disclosed as added advancements include intelligent method/system for cost-effective and efficient band adaptive transferring/recording sensory data from single or multiple data sources to network accessible storage devices, fail safe and self sufficient server group based method for sensory input recording and live streaming in a multi-server environment, intelligent and unified method of color coherent object analysis, face detection in video images and the like, resource allocation for analytical processing involving multi channel environment, multi channel join-split mechanism adapted for low and/or variable bandwidth network link, enhanced multi- (Continued)

color and/or mono-color object tracking and also an intelligent automated traffic enforcement system.

19 Claims, 40 Drawing Sheets

(51) Int. Cl.

| | | |
|---|---|---|
| H04N 7/18 | (2006.01) | |
| H04N 5/77 | (2006.01) | |
| H04N 21/2187 | (2011.01) | |
| H04N 21/231 | (2011.01) | |
| H04N 21/234 | (2011.01) | |
| G08B 13/196 | (2006.01) | |

(52) U.S. Cl.
CPC ... *H04N 21/2187* (2013.01); *H04N 21/23116* (2013.01); *H04N 21/23418* (2013.01); *G08B 13/19656* (2013.01)

(58) Field of Classification Search
CPC .......... H04L 2201/875; H04L 67/1029; H04L 12/10; H04L 43/08; H04L 67/1008; H04L 67/2847; H04L 47/724; H04N 7/181; H04N 9/7921; H04N 7/18; H04N 21/23418; H04N 21/2187; H04N 21/23116; H04N 5/77; G06F 17/30017; G06F 2003/0691; G08G 1/0175; G08B 13/19656
USPC ....... 709/201–201, 223, 219, 231, 232, 202; 714/47.1–47.3; 370/254; 725/90–98, 725/115, 105, 116, 118
See application file for complete search history.

(56) References Cited

U.S. PATENT DOCUMENTS

| | | | |
|---|---|---|---|
| 6,757,008 B1* | 6/2004 | Smith | H04N 5/225 348/143 |
| 7,143,433 B1* | 11/2006 | Duan et al. | 725/115 |
| 7,508,941 B1* | 3/2009 | O'Toole, Jr. et al. | 380/228 |
| 8,312,160 B2* | 11/2012 | Van Meerbergen | A61B 5/0002 709/230 |
| 8,923,186 B1* | 12/2014 | daCosta | H04W 84/18 370/312 |
| 2002/0049852 A1* | 4/2002 | Lee | H04L 12/58 709/231 |
| 2003/0033602 A1* | 2/2003 | Gibbs et al. | 725/46 |
| 2004/0010544 A1* | 1/2004 | Slater et al. | 709/203 |
| 2004/0010588 A1* | 1/2004 | Slater et al. | 709/224 |
| 2005/0039211 A1* | 2/2005 | Washino | 725/90 |
| 2006/0088092 A1* | 4/2006 | Chen et al. | 375/240.01 |
| 2006/0095199 A1* | 5/2006 | Lagassey | 701/117 |
| 2006/0136438 A1* | 6/2006 | McChrystal | 707/100 |
| 2006/0176369 A1* | 8/2006 | Meritt | 348/143 |
| 2006/0212603 A1* | 9/2006 | Satoh | H04L 67/1097 709/250 |
| 2007/0039030 A1* | 2/2007 | Romanowich | G08B 13/19608 725/105 |
| 2007/0206579 A1* | 9/2007 | Voith | H04L 29/06027 370/356 |
| 2008/0181507 A1* | 7/2008 | Gope et al. | 382/190 |
| 2008/0303903 A1* | 12/2008 | Bentley et al. | 348/143 |
| 2009/0070477 A1* | 3/2009 | Baum | H04N 21/2187 709/231 |
| 2010/0064337 A1* | 3/2010 | Dvir et al. | 725/115 |
| 2010/0082836 A1* | 4/2010 | Zhang | H04L 12/66 709/232 |
| 2010/0132010 A1* | 5/2010 | Chatterton et al. | 726/1 |
| 2012/0179833 A1* | 7/2012 | Kenrick et al. | 709/231 |
| 2014/0046967 A1* | 2/2014 | Nash-Walker et al. | 707/754 |
| 2014/0143851 A1* | 5/2014 | Baum | G08B 25/008 726/12 |

\* cited by examiner

INTEGRATED INTELLIGENT SERVER BASED SYSTEM AND METHOD/SYSTEMS ADAPTED TO FACILITATE FAIL-SAFE INTEGRATION AND/OR OPTIMIZED UTILIZATION OF VARIOUS SENSORY INPUTS

FIELD OF THE INVENTION

The present invention is directed to a system architecture and, in particular, an integrated Intelligent Machine Understanding and Analysis framework to automatically manage a distributed networked multi-sensory data acquisition and analysis system to integrate with the normal business flow of an organization with or without minimal human intervention. Importantly, the invention is directed to an integrated intelligent server based system having sensory input/data acquisition cum recording server group and/or analytics server group adapted to facilitate fail-safe integration and/or optimized utilization of various sensory inputs for various utility applications. The system of the invention can be deployed for various purposes including Security and Surveillance, Law enforcement, Automated traffic enforcement, Forensic evidence generation, Video data acquisition and analysis and other machine intelligence and content understanding system. The architecture and underlying implementation is independent of any operating system and can work in multi-OS computing environment seamlessly under various resource constraints. The invention is also directed to a method for cost-effective and efficient bandwidth adaptive transferring/recording sensory data from single or multiple data sources to network accessible storage devices, a fail safe and self sufficient server group based method for sensory input recording and live streaming in a multi-server environment, an intelligent and unified method of colour coherent object analysis framework and method, a modified, computationally efficient method of face detection in video images and the like, a method of resource allocation for analytical processing involving multi channel environment, a system for multi channel join-split mechanism adapted for low and/or variable bandwidth network link, a system for enhanced multi-colour and/or mono-colour object tracking and also an intelligent automated traffic enforcement system.

BACKGROUND OF THE INVENTION

Video Management Systems are used for video data acquisition and search processes using single or multiple servers. They are often loosely coupled with one or more separate systems for performing operations on the acquired video data such as analyzing the video content, etc. Servers can record different types of data in storage media, and the storage media can be directly attached to the servers or accessed over IP network. This demands a significant amount of network bandwidth to receive data from the sensors (e.g, Cameras) and to concurrently transfer or upload the data in the storage media. Due to high demand in bandwidth to perform such tasks, especially for video data, often separate high speed network are dedicated to transfer data to storage media. Dedicated high speed network is costly and often require costly storage devices as well. Often this is overkill for low or moderately priced installations.

It is also known that to back up against server failures, one or more dedicated fail-over (sometimes called mirror) servers are often deployed in prior art. Dedicated fail-over servers remain unused during normal operations and hence resulting in wastage of such costly resources. Also, a central server process either installed in the failover server or in a central server is required to initiate the back-up service, in case a server stops operating. This strategy does not avoid a single point of failure.

Moreover, when the servers and clients reside over different ends in an internet and the connectivity suffers from low or widely varying bandwidth, transmission of multi-channel data from one point to another becomes a challenge. Data aggregation techniques are often applied in such cases which are computationally intensive or suffer from inter-channel interference, particularly for video, audio or other types of multimedia data.

As regards analytic servers presently in use it is well known that there are many video analytics system in the prior art. Video content analysis is often done per frame basis which is mostly pre defined which make such systems lacking in desired efficiency of analytics but are also unnecessarily cost extensive with unwanted loss of valuable computing resources.

Added to the above, in case of presently available techniques of video analysis, cases of unacceptable number of false alarms are reported when the content analysis systems are deployed in a noisy environment for generating alerts in real time. This is because the traditional methods are not automatically adaptive to demography specific environmental conditions, varying illumination levels, varying behavioural and movement patterns of the moving objects in a scene, changes of appearance of colour in varying lighting conditions, changes of appearance of colours in global or regional illumination intensity and type of illumination, and similar other factors.

It has therefore been a challenge to identify the appearance of a non-moving foreign object (static object) in a scene in presence of other moving objects, where the moving objects occasionally occlude the static object. Detection accuracy suffers in various degrees under different demographic conditions.

Extraction of particular types of objects (e.g. face of a person, but not limited to) in images based on fiduciary points is a known technique. However, computational requirement is often too high for traditional classifier used for this purpose in the prior art, e.g., Haar classifier.

Also, in a distributed system where multiple sites with independent administrative controls are present, unification of those systems through a central monitoring station may be required at any later point of time. This necessitates hardware and OS independence in addition to the backward compatibility of the underlying computational infrastructure components, and the software architecture should accommodate such amalgamation as well.

It would be thus clearly apparent from the above state of the art that there is need for advancement in the art of sensory input/data such as video acquisition cum recording and/or analytics of such sensory inputs/data such as video feed adapted to facilitate fail-safe integration and/or optimized utilization of various sensory inputs for various utility applications including event/alert generation, recording and related aspects.

OBJECTS OF THE INVENTION

It is thus the basic object of the present invention to provide for desired efficient and cost-effective advancement in the art of sensory input/data such as video acquisition cum recording and/or analytics of such sensory inputs/data such as video feed and/or provide for an intelligent sensory data management system (ISMS) or intelligent Video Management System (IVMS) that can be mapped into distributed networked multiple servers and can also be seamlessly ported in a cloud computing environment involving fail-safe integration and/or optimized utilization of various sensory inputs for various utility applications including event/alert generation, recording and related aspects.

An object of the invention is directed to advancements in methods and/or systems enabling collection of sensory data from various images, video and other sensory sources, both on-line and off-line, archiving and indexing them to seamlessly map in any relational or networked database in a fail-safe way making optimal usage of computing, communication and storage resources, facilitate efficient search, transcoding, retransmission, authentication of data, rendering and viewing of archived data at any point of time.

Another object of the invention is directed to advancements in method and/or system for more efficient and cost-effective streaming data real time or on Demand including streaming video and other sensory content in multiple formats to multiple devices for purposes like live view in different matrix layout, relay of the content, local archiving, rendering of the sensory data in multiple forms and formats, etc. by a fail-safe mechanism without affecting speed and performance of on-going operations and services.

A further object of the present invention is directed to advancements in method and/or system adapted for intelligently analyzing the data, on-line or off-line, to extract the meaningful content of the data, identifying the activities of foreground human and other inanimate objects in the scene from the sensor generated data, establishing correlation among various objects (living or non-living and moving or static) in the scene, establishing correlation amongst multiple types of sensory data, identifying events of interests based on the detected activities, all either automatically or in an user interactive way under various demographic and natural real life situations.

A further object of the present invention is directed to advancements in method and/or system adapted for generating alerts, signals, video clips, other sensory data segments, and covering the events more efficiently and automatically.

Another object of the present invention is directed to advancements in method and/or system adapted for filtering and need based transmission of data at the right recipient at the right point of time automatically or on user interaction.

Yet further object of the present invention is directed to advancements in method and/or system adapted for directed distribution of alerts including distributing Event information in various digital forms (SMS, MMS, emails, audio alerts, animation video, Text, illustrations, etc. but not limited to) with or without received data segments (viz, video clips) to the right recipient at the right point of time automatically or on user interaction.

Another object of the present invention is directed to advancements in method and/or system adapted for providing a unified gateway for users to access systems for configuration, management and monitoring of system components.

Yet further object of the present invention is directed to advancements in method and/or system adapted for enabling user to view camera captured video in different matrix layouts, view other sensory data in a presentable form, recorded video and other data search and replay, event clips search and replay, providing easy navigation across camera views with help of sitemaps, PTZ control, and configuring the system as per intended use.

A further object of the present invention is directed to advancements in method and/or system adapted for intelligently sharing the computing resource, storage, rendering devices and communication bandwidth among different processes of the system to execute the above mentioned tasks with limited resources.

Another object of the present invention is directed to advancements in method and/or system adapted for creating a green computing environment and enabling executing the above mentioned tasks by optimal usage of the computing, storage and communication devices and thereby saving energy and extending lifetime of the said resources.

Yet another object of the present invention is directed to advancements in method and/or system adapted for providing distributed architecture support including providing a framework so that the system can be used in a centralized environment, or in a distributed architecture involving multiple computing, storage and communication devices or infrastructural facilities.

A further object of the present invention is directed to advancements in method and/or system adapted for providing framework for media management in real life situations wherein the overall systems architecture could be distributed in nature with integration mechanism for continuous management of network congestion and automated load balancing of the all the computing and other resources in order to ensure that the system is not vulnerable to any single point failure to avoid data loss due to failure of any resource in the distributed networked environment.

Another object of the present invention is directed to advancements in method and/or system discussed above by interconnecting a number of intelligent components consisting of hardware and software, and involving implementation techniques adapted to make the system efficient, scalable, cost effective, fail-safe, adaptive to various demographic conditions, adaptive to various computing and communication infrastructural facilities.

SUMMARY OF THE INVENTION

Thus according to the basic aspect of the present invention there is provided an integrated intelligent server based system having sensory input/data acquisition cum recording server group and/or analytics server group adapted to facilitate fail-safe integration and/or optimized utilization of various sensory inputs for various utility applications comprising at least one autonomous system having:
  I) A) said sensory input acquisition cum recording server group comprising plurality of acquisition cum recording servers which are operatively linked to assess respective server capacity and operate as a group to enable fail-safe support when any of the servers in the group fail to operate the remaining operative servers in the group are adapted to distribute and take over the sensory input load of the non-operative server/s to render the system fail safe and self sufficient; and/or B) said analytics server group comprising plurality of analytics server for intelligent analysis including resource dependent analytical accuracy control including means adapted for computing complexity of scenes and dynamically reconfigure the analytical processing steps for optimal analysis and/or availability of computational and other resources for on-line and real-time and/or on demand for efficient and user friendly streaming/analysis/detection/alert generation of events and/or follow up actions; and II) an intelligent interface for operative connection to said sensory input acquisition cum recording server group; and/or said analytics server group.

In the above integrated intelligent server based system each said acquisition cum recording servers are adapted for bandwidth optimized fail-safe recording and/or join-split mechanism for multi channel sensory data/video streaming.

In the above integrated intelligent server based system each said analytics server is adapted for anyone or more of (a) intelligent colour object analysis framework and colour coherent background estimation, (b) identifying moving, static, quasi-static objects, (c) enhanced object tracking, (d) content aware resource scheduling, (e) join split mechanism for multi channel video streaming, and (f) resource dependent accuracy control.

In the above integrated intelligent server based system said intelligent interface is operatively connected to anyone or more (a) user management and client access controller (b) event controller and handler and (c) event and/or selected segments of sensory data distributor.

In the above integrated intelligent server based system comprising operative client modules comprises selectively standalone surveillance client, internet browser, web client, any hand held devices including mobile device client, and remote event and/or notification receiver.

In the above integrated intelligent server based system wherein said acquisition cum recording server is adapted to (i) collect inputs from various sensory sources, archiving, tagging, and indexing to seamlessly map in a database or data warehousing system involving any one or more of optimal usage of computing, communication and storage resources, facilitate efficient search, transcoding, retransmission, authentication of data, rendering and viewing of archived data at any point of time, and (ii) Streaming input sensory data real time or on Demand including streaming video and other sensory content in multiple formats to multiple devices for purposes including live view in different matrix layout, relay of the content, local archiving, rendering of the sensory data in multiple forms and formats, by a fail-safe mechanism without affecting speed and performance of on-going operations and services.

In the above integrated intelligent server based system comprising means for auto registration of servers involving unique identification number, configuration data of the relevant server, means for recording sensory inputs in local storage and streaming the data to client modules and means for bandwidth adaptive uploading to central storage systems.

In the above integrated intelligent server based system wherein said analytics server comprises:
  (a) sensory input analytics engine; and
  (b) analytics engine controller.

In the above integrated intelligent server based system wherein said intelligent interface is adapted for anyone or more of (i) filtering and need based transmission of sensory inputs, (ii) directing distribution of alerts, (iii) providing a common gateway for heterogeneous entities.

In the above integrated intelligent server based system wherein said client module comprises means enabling user to receive, view, analyze, search sensory inputs and include standalone surveillance clients, internet browsers, handheld devices, cell phones, PCs, Tablet PCs and the like.

In the above integrated intelligent server based system comprising remote event receiver adapted to receive and display messages and ALERTs from various components of the system which can further be multicast or broadcasted.

In the above integrated intelligent server based system comprising central server adapted to serve as a gateway to plurality of said autonomous system and integrate the system into a single unified system.

In the above integrated intelligent server based system wherein each said acquisition cum recording server is adapted to accept requests through the intelligent interface and/or receive inputs from various other input sources, recording sensory inputs in local storage, intelligently uploading of the sensory input in a cluster of storage devices wherein said cluster comprises one or more network accessible storages in an efficient manner with fair share to individual sources utilizing optimal bandwidth in a cooperative manner, enabling searching of input and analytical sensory inputs and streaming of the sensory inputs in original or transcoded format to various other devices including surveillance clients.

In the above integrated intelligent server based system comprising means for recording sensory inputs in local storage and intelligent streaming of stored inputs continuously or on trigger from any external or internal services wherein the data stream is first segmented into small granular clips or segments of programmable and variable length sizes and said clips stored in the said local storage of the server, the clip metadata being stored in the local database.

In the above integrated intelligent server based system comprising bandwidth adaptive data uploading from channels to central storage system via said local storage comprises allocating a data source to a server group with multiple servers in the group, said servers comprising the server group adapted to exchange their respective capacity information such that in case of a breakdown of anyone or more of the servers in a group the remaining operative servers in the group share the load of the failed server/servers, each server also adapted to monitor the available bandwidth and also the data inflow rate for each channel into the server and accordingly adjust the upload rate for an input channel, means to segment the data stream into various sized clips and the rate of uploading the clips to the central storage adjusted depending upon the network bandwidth and data inflow rate for that particular channel.

In the above integrated intelligent server based system wherein said sensory input analytic engine comprises of (a) scene analyzer, (b) rule engine, and (c) event decider.

In the above integrated intelligent server based system wherein said scene analyzer comprises means for intelligent scene adaptive colour coherent object analysis framework and method adaptive to the availability of computational bandwidth and memory enabling processing steps to be dynamically reconfigured.

In the above integrated intelligent server based system wherein said scene analyzer comprises means to generate meta-data against each frame for analysis and computing the complexity of the scene such as to dynamically reconfigure the processing steps based thereon for optimal analysis results depending upon the availability of the computational and other resources for on-line and real-time detection of events and follow up actions and further feeding the meta-data along with the scene complexity measure to a controller adapted to decide the rate at which the frames of said channel should be decoded and sent to the analytic engine for processing;

said rule engine adapted to maintain history of the metadata and correlate the data across multiple frames to thereby decide the behavioural patterns of the objects in the scene for further determinations; and said event decider is adapted to receive the behavioural patterns as detected by the rule engine and also analyze the same to thereby detect various events in parallel and also to control user defined application of any external device for better decision making/study of the event identified.

In the above integrated intelligent server based system wherein said analytical engine controller comprises:
A) means to receive multiple sensory channel inputs and feed decoded frames of the multiple channels to the analytical engine wherein the said decoding and feeding of the decoded frames to the analytical engine is optimally controlled such that the number of frames decoded and sent per second for each channel is individually and automatically controlled depending on the requirement of the analytics engine and also on the computational bandwidth available in the system at any point of time; and means adapted to stream sensory data along with analytical inputs either as individual streams for each channel or as joined single stream data for all or user requested channels involving joining the channels and transmitting resulting combined single channel over IP network adapted to varying and low bandwidth network connectivity, Or
B) means adapted to directly generate events without feeding any decoded frames to the analytical engine.

In the above integrated intelligent server based system wherein said intelligent interface is adapted to (i) auto register itself to the system, (ii) accept request from surveillance clients and relay the same to corresponding recording server and analytic server, (iii) receive configuration data from the surveillance clients and feed to the intended components of the system, (iv) receive event information from analytic server on-line and transmit to various recipients including remote event receiver, fetch outstanding event clips from analytical engine controller, if any, (v) periodically receive heartbeat signals along with status information from all active devices and relay that to other devices in same or other networks, (vi) stream live video, recorded video or event alerts at appropriate time, (vii) join multiple channel sensory inputs into a single combined stream to adapt to variable and low bandwidth network, (viii) enable search based on various criteria including data, time, event types, channels, signal features, and other system input, and (ix) enable user to perform an user-interactive smart search to filter out desired segment of the sensory input from the database.

In the above integrated intelligent server based system wherein said acquisition cum recording server group comprise plurality of sensory data recording server adapted to: record inputs from single/multiple data sources in at least one local storage space with the URL of the files stored in database;
transfer the thus stored files from said local storage to a network based central storage provided for accessing the files for end use/applications,
said transfer of sensory data from source to the central storage via said local storage being carried out taking into consideration the data download speed (inflow rate) from data source to server along with the availability of network bandwidth at any given point of time for efficient network bandwidth sharing amongst multiple data sources to said storage device in the network.

In the above integrated intelligent server based system wherein said sensory data recording server is adapted to monitor available total network bandwidth and per channel inflow rate and based thereon decide rate of per channel video transfer from the server local storage to said central storage.

In the above integrated intelligent server based system wherein said sensory data from the source are recorded in the form of variable length clips wherein the clip duration is set by the user or set by the server itself.

In the above integrated intelligent server based system wherein said sensory data recording server is adapted for determining the optimal bit rate for uploading sensory inputs involving:
(a) average bit rate for each channel separately in periodic intervals wherein the sensory input streaming rate ($D_i$) of a particular source/camera ($C_i$) camera to the server is estimated and (b) identifying the available network bandwidth (B) at that instant from the system; and finally (c) calculating the frequency of Clip upload for channel, based on:

$$U_i = [B \times k \div \Sigma D_i] \times D_i,$$

where $0<k<1$, depending on how much of the remaining bandwidth is to be allocated for video uploading task.

In the above integrated intelligent server based system wherein the capacity of the respective servers in a server group is based on the memory, network bandwidth and current processor utilization within the server.

In the above integrated intelligent server based system wherein a server group is adapted to allocate any one of the operative servers in said group as the group master server and continuously monitor the servers in the group and their respective capacities and decide on the allocation and release of the input sensory source from any server within the Group.

In the above integrated intelligent server based system the said group master server is adapted to release or add a sensory input source based on required (a) addition of an input source (b) deletion of an existing input source (c) addition of a new recording server to the system or when a failed server again re-operates and (d) when a running server stops functioning.

In the above integrated intelligent server based system wherein each said analytical server is adapted for multiple component colour object analysis in a scene favouring scene analytic applications comprising:
multiple component colour coherent background estimation involving colour correlation of neighbouring pixels and inter-frame multiple component colour correlation using said multiple components as a composite data and using the relative values of these components to maintain accurate colour information and appearance of the true colour in the estimated background frame.

In the above integrated intelligent server based system wherein said analytical server is adapted for colour object analysis involving said unified colour coherent background estimation involving statistical pixel processing comprises using R,G,B components as a composite single structure in a unified manner to thereby preserve the mutual relationship of theses colour components in each individual pixel in order to maintain true colour appearances in the estimative colour background frame;
continuously readjusting modelled or predicted values for each colour pixel in a frame with all sequential forthcoming frames of the colour video;
correlate the spatial distribution of the colour values in a local region to model the pixel background colour value.

In the above integrated intelligent server based system wherein said analytical server is adapted for colour object analysis involving said colour analysis of each pixel comprising accumulating the colours in the above window in different colour clusters k consisting of a mean representative colour pixel value $(\mu_R, \mu_G, \mu_B)_k$ with span of colour $(\sigma_R,$ $\sigma_G$, $\sigma_B$)$_k$ and a number of appearance ($v_k$) of a colour pixel in this cluster and based thereon
  i) Matching the colour pixel (R,G,B) with colour cluster k to confirm if the same is within the span of colour deviation;
  ii) If the colour of the pixel does not match with any cluster then create a new colour cluster with mean value (R,G,B) and default chosen allowed threshold for deviation ($\sigma_{Th}$, $\sigma_{Th}$, $\sigma_{Th}$) and number of occurrence $v=1$
  iii) Split the colour cluster (p) which have a large ($\sigma_R$, $\sigma_G$, $\sigma_B$), value and merge all the colour cluster which have very close mean representative value, the probability of occurrence then adjusted in the same ratio of the estimated colour clusters for that population, to thereby achieve finer granular colour matching.

In the above integrated intelligent server based system wherein said analytical server is adapted for efficient face detection in video images and the like by limiting the search space involving motion detection technique and controlled computational requirements based on desired accuracy by carrying out prediction of number iterations and temporal parameter "t".

In the above integrated intelligent server based system wherein said analytical server for said face detection is adapted for:
  i) involving the grey image of cropped motion rectangular area from current frame to calculate said temporal parameter "t" and updating "t" with history and calculating possible number of iterations "nIterations"
  ii) calculating scale factor, no. of iterations and other parameter from look up table;
  iii) using convolution on different scaled images to get probable face rectangles;
  iv) grouping the probable faces with spatial information; and
  v) obtaining therefrom the confirmed faces.

In the above integrated intelligent server based system comprising resource allocation for analytical servers involving:
estimating scene complexity relevant for frequency of frame processing;
spawning of processor threads based on physical CPU cores involving a controller;
allocation of threads to video channels for analytical processing based on requirements; and
feeding the frames for processing to a video analytics engine at an fps F, where F is calculated dynamically by the analytics engine itself depending upon its processing requirements based on scene complexity to thereby favour optimal sharing of resources eliminating unnecessary computing.

An integrated intelligent server based system as above wherein said scene complexity is determined based on (a) inter class difference of foreground and background (b) number of objects present and (c) extent of processing based on the particular processing task.

In the above integrated intelligent server based system comprising a Controller module for spawning a number of processing threads depending on the number of CPU cores present as available from the system hardware information and a task scheduler module for generating the sequence indicating the order in which the individual channels are to be served for analytics tasks.

In the above integrated intelligent server based system comprising multi channel join-split mechanism adapted for low and/or variable bandwidth network link comprising:

a sender unit adapted to receive multi channel inputs from a particular site to join and compress into a single channel and a receiver unit at the client site to receive the inputs and extract the individual channels for the purposes of end use said sender unit adapted to combine while transmitting multi channel inputs into a single channel, frame by frame, and controlling the transmission bit rate to avoid jittery out puts and/or any interference between individual channels and/or starvation for any single channel.

In the above integrated intelligent server based system comprising means for encoding the stream with variable bit rate depending upon the available bandwidth from server to the client, a frame header is transmitted with each frame of the combined stream, said frame header containing meta data about the constituent streams, said receiver unit adapted to split the combined stream into constituent streams based on said frame header.

In the above integrated intelligent server based system wherein the sender unit is adapted to receive raw inputs or decode the inputs to raw input and store in a memory allocated for inputs from a defined channel and generate an initial fps on request from a client, on request of a subset of channel from the client, a sample module is adapted to take the current frame from the channel specific memory area at a fixed rate for those channels and combines to a single frame along with generation of a look-up table to store the channel ID and its boundary within the combined frame and finally compressed and checked to identify all motion vectors which cross the allocated inter-frame boundary and forcibly set all such motion vectors to null to ensure that the video content of one constituent frame within the combined frame does not interfere with the content of another constituent frame, a frame header composed with meta data information about the position of the individual channels frames within the combined frame, the resolution of the individual frames and the time stamp;

said receiver unit is adapted to open a TCP connection with the sender and request for all or selected channels including selectively specifying the format for compression, additional commands to get the existing channel information, resolution of the channels, the fps of the individual channels at the senders end and other inputs directed to specifying the channels of interest and specifying other parameters as the transmitting fps (f), initial bit rate etc.

In the above integrated intelligent server based system wherein said event decider means comprises an enhanced object tracking system comprising:
object tracking means in conjunction and one or more PTZ cameras wherein when an object is first detected in a fixed camera view of the said object tracking means the same is adapted to track the object and also generate and transmit the positional values along with a velocity prediction data to the PTZ camera controller;
said PTZ camera controller adapted to receive the positional information of the object in the PTZ camera view periodically involving scene registration and coordinate transformation technique.

In the above integrated intelligent server based system adapted to carry out said coordinate transformation following:
  a. identifying a set of points in the static camera as A, B, . . . and also corresponding points A', B', . . . in the PTZ camera by the user;

b. mapping any arbitrary point C in the static camera to the corresponding point C' in the PTZ camera view dynamically wherein:

$a_x$, $b_x$, $c_x$ are x-coordinates of points A, B and C respectively in the static Camera view and similarly $a'_x$, $b'_x$ and $c'_x$ are for the corresponding points in PTZ view where C is interpolated with the help of points A and B, with a confidence factor $W_{AB}$, where $W_{AB} = (A_x - B_x) \div [\text{Minimum of } (C_x - B_x, C_x - A_x)]$ is determined to be $$C'_{xAB} = B_x' + [(A_x' - B_x') \times (C_x - B_x) \div (A_x - B_x)]$$

and wherein similarly, an estimate of x-coordinate of the same point $C'_y$ is generated for all pair of points (A, B) in the Static camera view based on:

$$C'_x = \Sigma[C'_{xAB} \times W_{AB}] \div \Sigma W_{AB}$$

and similarly generating also the y-coordinate $C'_y$ for the point C.

In the above integrated intelligent server based system wherein said acquisition cum recording servers and said analytical server are adapted to carry out intelligent automated traffic enforcement involving a video surveillance system with video analytic servers adapted for carrying out sequential analytical process (a) configuration means (b) incident detection means (c) incident audit means (d) reporting generation means (e) synchronization means and (f) user management means.

In the above integrated intelligent server based system comprising a site map server installed within each autonomous system and also within the centralized server gateway to the entire system which is adapted to receive request from any authorised components of the system and respond with positional data corresponding to any component linked, said site layer preferably multilayered and components linked to any spatial position of the map in any layer.

According to yet another aspect of the present invention there is provided a computer readable medium adapted for enabling and operating an integrated intelligent sensory input/data acquisition cum recording server group and/or analytics server group adapted to facilitate fail-safe integration and/or optimized utilization of various sensory inputs for various utility applications comprising at least one autonomous system having:

I) A) said sensory input acquisition cum recording server group comprising plurality of acquisition cum recording servers which are operatively linked to assess respective server capacity and operate as a group to enable fail-safe support when any of the servers in the group fail to operate the remaining operative servers in the group are adapted to distribute and take over the sensory input load of the non-operative server/s to render the system fail safe and self sufficient; and/or B) said analytics server group comprising plurality of analytics server for intelligent analysis including resource dependent analytical accuracy control including means adapted for computing complexity of scenes and dynamically reconfigure the analytical processing steps for optimal analysis and/or availability of computational and other resources for on-line and real-time and/or on demand for efficient and user friendly streaming/analysis/detection/alert generation of events and/or follow up actions; and II) an intelligent interface for operative connection to said sensory input acquisition cum recording server group; and/or said analytics server group.

According to another aspect of the invention there is provided a method for cost-effective and efficient transferring/recording sensory data from single or multiple data sources to network accessible storage devices comprising: at least one sensory data recording server adapted to record inputs from single/multiple data sources in at least one local storage space with the URL of the files stored in database; transferring the thus stored files from said local storage to a network based central storage provided for accessing the files for end use/applications, said transfer of sensory data from source to the central storage via said local storage being carried out taking into consideration the data download speed (inflow rate) from data source to server along with the availability of network bandwidth at any given point of time for efficient network bandwidth sharing amongst multiple data sources to said storage device in the network.

In the above method wherein said sensory data recording server is adapted to monitor available total network bandwidth and per channel inflow rate and based thereon decide rate of per channel video transfer from the server local storage to said central storage.

In the above method wherein sensory data from the source are recorded in the form of variable length clips wherein the clip duration is set by the user or set by the server itself.

In the above method comprising the step of determining the optimal bit rate for uploading sensory inputs comprising the following steps:

(a) calculating the average bit rate for each channel separately in periodic intervals wherein the sensory input streaming rate ($D_i$) of a particular source/camera ($C_i$) camera to the server is estimated and (b) identifying the available network bandwidth (B) at that instant from the system; and finally (c) calculating the frequency of Clip upload for channel, based on:

$$U_i = [B \times k \div \Sigma D_i] \times D_i,$$

where $0 < k < 1$, depending on how much of the remaining bandwidth is to be allocated for video uploading task.

According to another aspect of the invention there is provided a method for sensory input recording and live streaming in a multi-server environment comprising: a fail-safe server group Each said server group comprising plurality of acquisition cum recording servers said multiple recording servers adapted to exchange information amongst one another and left over capacity of each server is known along with the channel information of every other server such that in case of any server failure in said server group the remaining active servers in the server group automatically distribute the required operative load amongst the remaining operative servers for a fail safe recording and streaming of the sensory data, without any external control.

In the above method wherein each recording server auto registers in the system and a database entry is created with the server ID whereby the said recording server gets listed in the database and is then ready for recording data from one or more sources.

In the above method wherein the recording is done by breaking the data streams into chunks or clips of small duration and the clips are initially stored in a local server storage space and periodically uploaded to one or more network attached storage in a round robin fashion.

In the above method comprising plurality of server groups which are operatively connected to network storage and as soon as a server is registered in a Group it generates a message describing its IP address, group ID and remaining capacity to handle more data source/cameras.

In the above method wherein the capacity of the respective servers in a server group is based on the memory, bandwidth and current processor utilization within the server.

In the above method comprising assigning the server operatively connected to the input sensory devices and the capacity of the server determined accordingly with continuous monitoring of required decrement or increment of capacity based on addition or removal of sensory input sources.

In the above method wherein a server group is adapted to allocate any one of the operative servers in said group as the group master server and continuously monitor the servers in the group and their respective capacities and decide on the allocation and release of the input sensory source from any server within the Group.

In the above method wherein the said group master server is adapted to release or add a sensory input source to any other server within the group based on required (a) addition of an input source (b) deletion of an existing input source (c) addition of anew recording server to the system or when a failed server again re-operates and (d) when a running server stops functioning.

According to another aspect of the present invention there is provided an intelligent and unified method of multiple component colour object analysis in a scene favouring scene analytic applications comprising:

multiple component colour coherent background estimation involving colour correlation of neighbouring pixels and inter-frame multiple component colour correlation using said multiple components as a composite data and using the relative values of these components to maintain accurate colour information and appearance of the true colour in the estimated background frame.

An intelligent and unified method as above wherein said multiple components comprise multi-spectral signals including human visible spectra Red (R), Green (G), Blue (B) signals and similar.

An intelligent and unified method of colour object analysis as above comprising (A) unified colour coherent background estimation involving statistical pixel processing; (B) removal of shadow and glare from the scene along with removal of electronics induced different types of noises in sensors and vibrations of sensors; (C) characterization of pixels in the foreground regions and extract moving and/or static objects.

An intelligent and unified method of colour object analysis as above comprising tracking variety of objects individually and generating related information for rule-engine based intelligent analytical applications.

An intelligent and unified method of colour object analysis as above wherein said unified colour coherent background estimation involving statistical pixel processing comprises using R,G,B components as a composite single structure in a unified manner to thereby preserve the mutual relationship of theses colours components in each individual pixel in order to maintain true colour appearances in the estimative colour background frame;
continuously readjusting estimated or predicted values for each colour pixel in a frame with all sequential forthcoming frames of the colour video;
correlate the spatial distribution of the colour values in a local region to model the pixel background colour value.

An intelligent and unified method of colour object analysis as above wherein for each pixel (x,y) in the input colour frame there is carried out (i) local window estimation, (ii) colour analysis of each pixel, and (iii) background frame construction based thereon.

An intelligent and unified method of colour object analysis as above wherein if the pixel location in a current frame belongs to an object pixel in the previous frame, estimation of colour background at that pixel location is skipped since the colour pixel is not representative of the background estimation, otherwise, compute an adaptive size (k*h, k*w) local window centering around this pixel for computation of the background estimation using the colour pixel values within this window, where $$k = \frac{Avg(h, w)}{255}$$

representing normalized average intensity of all the pixels in window size (h, w). for all $0<k<1$, with the processing window size reduces with the reduction of intensity in the region surrounding the pixel.

An intelligent and unified method of colour object analysis as above wherein said colour analysis of each pixel comprises accumulating the colours in the above window in different colour clusters k consisting of a mean representative colour pixel value $(\mu_R, \mu_G, \mu_B)_k$ with span of colour deviation $(\sigma_R, \sigma_G, \sigma_B)_k$ and a number of appearance $(v_k)$ of a colour pixel in this cluster and based thereon
  i) Matching the colour pixel (R,G,B) with colour cluster k to confirm if the same is within the span of colour deviation;
  ii) If the colour of the pixel does not match with any cluster then create a new colour cluster with mean value (R,G,B) and default chosen allowed threshold for deviation $(\sigma_{Th}, \sigma_{Th}, \sigma_n)$ and number of occurrence $v=1$
  iii) Split the colour cluster (p) which have a large $(\sigma_R, \sigma_G, \sigma_R)_p$ value and merge all the colour cluster which have very close mean representative value, the probability of occurrence then adjusted in the same ratio of the estimated colour clusters for that population, to thereby achieve finer granular colour matching.

An intelligent and unified method of colour object analysis as above wherein background frame construction comprises constructing colour background reference frame from representative colour values of the generated clusters, if matched colour cluster has significantly high occurrence relative to the overall population occurrence then the representative colour of the colour cluster is used as the value of the colour pixel in the colour background reference frame.

In the above intelligent and unified method of colour object analysis wherein the removal of the shadow, glare and sensor generated noises comprises removal of shadow and glare in background and/or foreground segmentation process for dynamic scenes involving image characteristics parameters.

In the above intelligent and unified method of colour object analysis wherein said image characteristic parameters comprise
(1) median intensity (I) of the image, (2) a sharpness parameter (S) of the image.

In the above intelligent and unified method of colour object analysis wherein said sharpness parameter of the image is obtained based on every row of the input frame is filtered with a high pass filter. The average of the filtered values of the overall image is considered as horizontal sharpness parameter $S_H$.

every column of the input frame is filtered with the same high pass filter. The average of the filtered values of the overall filtered image is considered as vertical sharpness parameter $S_V$. maximum of $S_H$ and $S_V$ is the sharpness parameter (S) of the image In the above intelligent and unified method of colour object analysis wherein ratio V=I/S is used to characterize the scene.

In the above intelligent and unified method of colour object analysis comprising (a) adaptive threshold value calculation based on the value V in every frame of each said parameter (b) measurement of change in pixel's characteristics and (c) identification and removal of shadow and glare with or without sensor generated noises based on the comparative details under (a) and (b) above.

In the above intelligent and unified method of colour object analysis comprising static foreground formation involving multi level hierarchical estimation of the static foreground pixel.

In the above intelligent and unified method of colour object comprising segmenting the detected foreground regions using suitable image processing based object clustering methods and morphological techniques.

In accordance with yet another aspect of the invention there is provided a method of face detection in video images and the like comprising the step of limiting the search space involving motion detection technique and controlled computational requirements based on desired accuracy by carrying out prediction of number iterations and temporal parameter "t".

A method of face detection in video images as above comprising the steps of:
i) involving the grey image of cropped motion rectangular area from current frame to calculate said temporal parameter "t" and updating "t" with history and calculating possible number of iterations "nIterations"
ii) calculating scale factor, no. of iterations and other parameter from look up table;
iii) using convolution on different scaled images to get probable face rectangles;
iv) grouping the probable faces with spatial information; and
v) obtaining therefrom the confirmed faces.

A method of face detection in video images as above comprising using the convolution on probable face regions with Haar feature set to confirm faces and publishing the confirmed faces based thereon.

A method of face detection in video images as above comprising step of carrying out said temporal estimation "t", prediction of possible number of iterations "nIterations" following:
i. Generating time taken to detect face for Image with size M×N based on $$T_{MN} \approx t^*[(M-m)^*(N-n)]/[pixelShift^*pixelShift]$$

where, pixelShift is the window shift size and the time taken to process a single window area (fixed window size m×n) with standard feature set=t.
ii. For multi-scale processing ScaleFactor=f(M, N, m, n, nIteration)
iii. Total time taken to detect faces, $$T = \sum_{i=0}^{nIteration} X_{M'N'}$$

Where, M'=M/(ScaleFactor$^i$)
N'=N/(ScaleFactor$^i$)

iv. T=f(M, N, t, pixelShift, nIteration), for a fixed size window.
v. Calculating average t in host machine and tune the parameters pixelShift, nIteration accordingly using generated lookup table to suite the bandwidth; and
vi. Optionally, to increase the accuracy, enable a second pass upon the probable face regions detected by first pass.

In accordance with yet another aspect of the invention there is provided a method of resource allocation for analytical processing involving multi channel environment comprising:
estimating scene complexity relevant for frequency of frame processing;
spawning of processor threads based on physical CPU cores involving a controller;
allocation of threads to video channels for analytical processing based on requirements; and
decoding and feeding the frames for processing to a video analytics engine at an fps F, where F is calculated dynamically by the analytics engine itself depending upon its processing requirements based on scene complexity to thereby favour optimal sharing of resources eliminating unnecessary computing.

A method as above wherein the scene complexity is calculated based on (a) inter class difference of foreground and background (b) number of objects present and (c) extent of processing based on the particular processing task.

A method as above wherein a Controller module spawns a number of processing threads depending on the number of CPU cores present as available from the system hardware information and a task scheduler module generates the sequence indicating the order in which the individual channels are to be served for analytics tasks.

According to yet another aspect of the invention there is provided a system for multi channel join-split mechanism adapted for low and/or variable bandwidth network link comprising:
a sender unit adapted to receive multi channel inputs from a particular site to join and compress into a single channel and a receiver unit at the client site to receive the inputs and extract the individual channels for the purposes of end use said sender unit adapted to combine while transmitting multi channel inputs into a single channel, frame by frame, and controlling the transmission bit rate to avoid jittery outputs and/or any interference between individual channels and/or starvation for any single channel.

A system as above adapted for intelligent data compression without affecting the decoding process.

A system as above wherein said compression is intelligently controlled such that no motion vector crosses over the inter-frame boundary in the combined frame.

A system as above comprising means for encoding the stream with variable bit rate depending upon the available bandwidth from server to the client, a frame header is transmitted with each frame of the combined stream, said frame header containing meta data about the constituent streams, said receiver unit adapted to split the combined stream into constituent streams based on said frame header.

A system as above wherein the sender unit is adapted to receive raw inputs or decode the inputs to raw input and store in memory allocated for inputs from a defined channel and generate an initial fps on request from a client, on request of a subset of channel from the client, a sample module is adapted to take the current frame from the channel specific memory area at a fixed rate for those channels and combines to a single frame along with generation of a look-up table to store the channel ID and its boundary within the combined frame and finally compressed and checked to identify all motion vectors which cross the allocated inter-frame boundary and forcibly set all such motion vectors to null to ensure that the video content of one constituent frame within the combined frame does not interfere with the content of another constituent frame, a frame header composed with meta data information about the position of the individual channels frames within the combined frame, the resolution of the individual frames and the time stamp;

said receiver unit is adapted to open a TCP connection with the sender and request for all or selected channels including selectively specifying the format for compression, additional commands to get the existing channel information, resolution of the channels, the fps of the individual channels at the senders end and other inputs directed to specifying the channels of interest and specifying other parameters as the transmitting fps (f), initial bit rate etc.

A system as above wherein said receiving unit is further adapted to calculate receiving bit rates based on averages and request target bit rate to the sender unit, a bit rate controller at the server end adapted to prepare the encoder for new bit rate, flushing the transmission queue and respond to the client with the new bit rate as set.

In accordance with yet another aspect of the invention there is provided a system for enhanced object tracking comprising:

object tracking means in conjunction with one or more PTZ cameras wherein when an object is first detected in a fixed camera view of the said object tracking means the same is adapted to track the object and also generate and transmit the positional values along with a velocity prediction data to the PTZ camera controller;

said PTZ camera controller adapted to receive the positional information of the object in the PTZ camera view periodically involving scene registration and coordinate transformation technique.

A system for enhanced object tracking as above wherein more than one object is tracked involving multiple PTZ cameras such as to cover a wider range in the scene and to enhance multiple object tracking over a single framework.

A system for enhanced object tracking as above wherein said means of coordinate transformation from fixed camera view to PTZ camera view involves coordinate transformation technique comprising weighted interpolation method.

A system for enhanced object tracking as above which is adapted to carry out said coordinate transformation following:
  a. identifying a set of points in the static camera as A, B, etc and also corresponding points A',B', etc respectively in the PTZ camera by the user;
  b. mapping any arbitrary point C in the static camera to the corresponding point C' in the PTZ camera view dynamically wherein:
  $a_x$, $b_x$, $c_x$ are x-coordinates of points A, B and C respectively in the static Camera view and similarly $a'_x$, $b'_x$ and $c'_x$ are for the corresponding points in PTZ view where C is interpolated with the help of points A and B, with a confidence factor $W_{AB}$, where $W_{AB}=(A_x-B_x) \div$ [Minimum of $(C_x-B_x, C_x-A_x)$] is determined to be $$C'_{xAB}=B_x'+(A_x'-B_x')\times(C_x-B_x)\div(A_x-B_x)]$$

and wherein similarly, an estimate of x-coordinate of the same point C is generated for all pair of points (A, B) in the Static camera view based on:

$$C'_x=\Sigma[C'_{xAB}\times W_{AB}]\div\Sigma W_{AB}$$

and similarly generating also the y-coordinate $C'_y$ for the point C.

A system for enhanced object tracking as above wherein for a bounding rectangle to be mapped from the static view to the PTZ view, the system is adapted to apply said coordinate transformation technique for all the four corner points of the rectangle.

A system for enhanced object tracking as above wherein the bounding rectangle corresponding to an object in the static camera view is associated with a velocity prediction information, the system is adapted to apply that velocity prediction information to map the rectangle in the PTZ camera view.

In accordance with yet another aspect of the invention there is provided an intelligent automated traffic enforcement system comprising:

a video surveillance system adapted to localize one or more number plates/License Plates of vehicles stationary or in motion in the field of view of at least one camera without requiring to fix the number plate in a fixed location of the car, the license plate can be reflective or non-reflective, independent of font and language, and using normal security camera, and filtering out other texts from the field of view not related to the number-plate, enabling to process the localized number plate region with any Optical Character Recognition, and generate localized information of the number plate with or without in other relevant composite information of car (type, possible driver snapshot, shape and contour of the vehicle) in parallel to monitor traffic and an intelligent video analytical application for event detection based on the video feeds An intelligent traffic enforcement system as above wherein the process depends localizes possible license plate in the field of view of the camera by (a) analysing statistically correlation and relative contrast between the number plate content region and the background region surrounding this content, (b) unique signature of number plate content based on pixel intensity and vertical and horizontal distribution, (c) color features of the content and surrounded background.

An intelligent automated traffic enforcement system as above wherein said video analytic process is carried out in the sequence involving (a) configuration means, (b) incident detection means, (c) incident audit means, (d) reporting generation means, (e) synchronization means, and (f) user management means.

An intelligent automated traffic enforcement system as above wherein said configuration means adapted to configure parameters for incident detection and management comprises (i) camera configuration means, (ii) means for providing for virtual loops in regions where monitoring is required, (iii) means for setting time limits for the monitoring activity, (iv) means providing feed indicative of regular traffic moving directions for each camera, (v) means providing for setting speed limits to detect over speeding vehicles, (vi) means for setting the sensitivity and duration determining traffic abnormality and congestion.

An intelligent automated traffic enforcement system as above wherein said incident detection means is adapted to detect deviations from set parameters, analyze appropriate video feed and check for offence involving (a) recording by way of saving video feeds from various traffic locations of interest, (b) generating alarm including alerts and/or notifications visual and/or sound based on any incident detection involving traffic violation, and (c) registering the incident against the extracted corresponding license plate number of the violating vehicle.

An intelligent automated traffic enforcement system as above wherein said incident audit means comprises:

filter means adapted to reach to the incident if incident is an archived incident and in case of live incident means for viewing the details;

means for generating details of the incident, a link to incident video and a link to license plate image of the vehicle;

means for verification of the incident by playing the video and vehicle's registration number by viewing the license plate image and If the license plate number is incorrect means to enter the correct vehicle number of the incident image;

means for updating incident status changed from "Pending"/ "Acknowledged" to "Audit" and saving into the database.

means to enter remark about the action taken while auditing the incident and finally the remark is saved in the database with possible re-verification for future reference.

An intelligent automated traffic enforcement system as above wherein said incident reporting means comprises means for automatized generation of incident detail reports and incident summary report and generation of offence report.

An intelligent automated traffic enforcement system as above wherein said synchronization means includes means adapted for synchronization with handheld device applications.

An intelligent automated traffic enforcement system as above wherein said user management means includes interface for administrative functions including (a) user creation and management (b) privilege assignment and (c) master data Management.

The above disclosed invention thus includes advancement based on bandwidth adaptive data transfer with predicted optimal bandwidth sharing among multiple data transfer processes for low or moderately priced systems. During data upload to central storage system, each server not only monitors the available bandwidth but also in-flow rate for each channel into the server separately. It is done without compromising subjective fidelity of the data, and accordingly adjusts the upload rate for any particular channel without affecting the speed and performance of other channels being processed by multiple networked servers let alone the single server. The data stream is segmented into variable sized smaller chunks or clips and the rate of uploading the clips to the central storage is adjusted depending on the available network bandwidth and data inflow rate for that particular channel which is dependent on the scene activity or content characteristics. Calculation of data upload rate as a function of both system capacity and incoming data accumulation rate is novel and unique. This utilizes the system resources in an optimal way. Moreover, the whole architecture is protected from any single point failure of any component in the network (server, storage, and others) explained below.

An advancement is proposed under the present invention wherein the fail-safe mechanism is designed without a central server and support from any dedicated failover or mirror server. Instead of allocating a particular data source (e.g., a camera and other sensors) to a particular server for recording of data (e.g, video or other data types), it is allocated to a 'Server group' with multiple servers in the group. The members of the group continuously and mutually exchange their capacity information amongst themselves and automatically share the load according to their capacity. In case of breakdown of one or more servers, the team members automatically detect it and share the load of the failed server(s), without any central control or without support from any fail-over or mirror server. This eliminates the need for costly failover or mirror server and the load is always evenly distributed as per the capacity of the individual server hardware. This advancement is unique serve as an example of cooperative social networking implemented in machine level.

Also disclosed is an enhanced multi channel data aggregation technique for data transmission over low and variable bandwidth communication network has been proposed which also avoids inter-channel interferences. While transmitting multi-channel video over low and variable bandwidth network link, they are combined into a single channel video, frame by frame, and then transmission bit rate is controlled to avoid jittery video at the other end or interference between individual channels. It also avoids starvation for any single channel. In this process, the underlying data compression algorithm is intelligently handled without affecting the decoding process with a standard equivalent decoder. For example in case of video, the motion vector generation step in the underlying MPEG type compression is intelligently controlled, so that no motion vector crossesover the intra-frame boundary in the combined frame. This eliminates interference between any two channel data frames in the combined frame. This technique of bandwidth adaptive multi-channel data transfer without inter-channel interference is also a clear advancement in the related art achieved by the present invention.

The invention also propose a monolithic architecture by integrating video analytics functionalities as integral part of the proposed Video Management System architecture with same architectural and design philosophy. That's why the overall architecture is called a truly Intelligent Video Management System architecture. In this architecture Controller module controls the rate at which video frames are supplied to different analytics engines. The Controller uses a novel technique to control the rate of decoding the video frames and sending them to the Analytics engine for content analysis based on computational bandwidth available and also on the current scene complexity measure as received from the Analytics engines themselves. Hence, number of frames decoded and sent per second for each video channel is individually and automatically controlled depending on the requirement of the Analytics engine and also on the computational bandwidth available in the system at any given point of time. This adaptive frame rate control mechanism for analytics processing based on scene complexity is unique and a clear advancement in the related art.

The present invention further discloses advancement in process for analyzing moving image sequences, which comprises applying automatic adaptive unified framework for accurate predictive colour background estimation using neighbouring coherent colour and inter-frame colour appearance correlation under severe natural condition such as shadow, glare, colour changes due to varying illumination, and effect of lighting condition on colour appearance, electronics generated induced noises (e.g. shot noise, but not limited to) obtain more accurate object shape, contour & spatial position. With the present invention, the object detection and analysis process can be accelerated and the foreground selection accuracy can be improved. Using this advanced method detected objects can be characterized, classified, tracked and correlated to identify different events in any natural video sequence under various demographic and environmental conditions.

The invention further enables advancements in Static Foreground Pixel estimation technique using multi-layer hierarchical estimation to identify static objects in a video by aggregation of static pixels in parallel to other moving colour objects in the scene. The process involves background scene estimation, foreground background segmentation, short time still background estimation, static foreground pixel estimation and then static object generation. The proposed technique is thus an advancement in the related art and it gives much more control over the process of distinguishing foreground pixels (of the static object) from the background pixels.

The present invention is also on method to enhance the efficiency of extracting face regions from a sequence of video frames. Also, depending on the availability of computational bandwidth, the number of iterations and pixel shifts as required in the proposed technique is controlled with the help of a look up table. This helps in striking a balance between the computational requirement and the accuracy of face detection. In a multi-channel, multiple analysis process system, this advanced technique can be used as a cooperative process coexisting with other compute intensive processes. In the proposed technique, the search space is reduced by considering the motion vector and sliding the window only in the blob regions where motion is detected. First, the average time t to analyze an image in host machine is calculated, and for subsequent frames pixel-shifts and number of iterations are calculated based on two lookup tables, to suite the computational bandwidth. To increase the accuracy, a second pass upon the probable face regions detected by first pass is performed. This concept of increasing the accuracy of data analysis automatically depending on available computational bandwidth is novel and unique.

The framework disclosed herein can be used for such situations, and also for integrating multiple heterogeneous systems in a distributed environment. The proposed architecture is versatile enough to interface and scale it to many other management systems. By way of a non-limiting example the disclosure made herein illustrates how the systems architectural advancement can be advantageously involved for Intelligent Automated Traffic Enforcement System.

The details of the invention and its objects and advantages are explained hereunder in greater detail in relation to the following non-limiting exemplary illustrations as per the following accompanying figures:

DETAILED DESCRIPTION OF THE INVENTION

Figure 1:
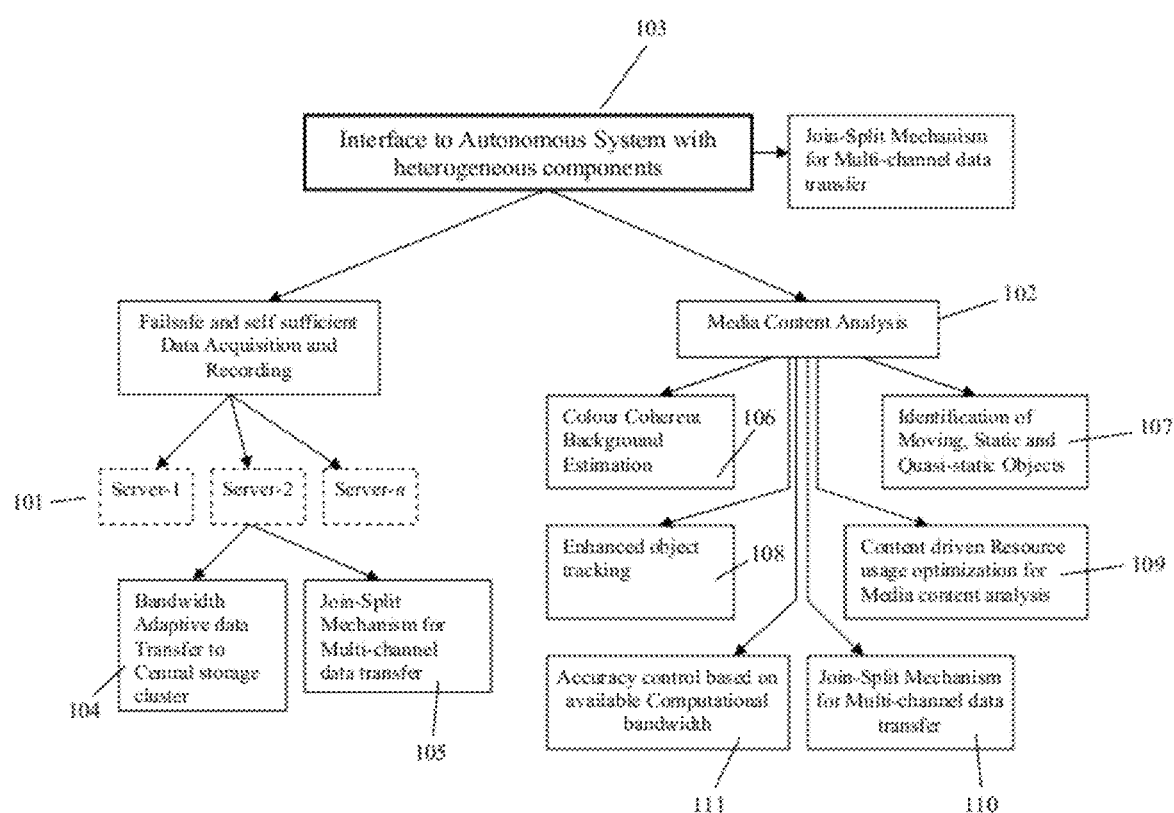
FIG. 1: is a schematic layout of an illustrative embodiment showing an integrated intelligent server based system of the invention having sensory input/data acquisition cum recording server group and/or analytics server group adapted to facilitate fail-safe integration and/or optimized utilization of various sensory inputs for various utility applications.

Reference is first invited to accompanying FIG. 1 which shows the broad overview of an illustrative embodiment showing an integrated intelligent server based system of the invention having sensory input/data acquisition cum recording server group and/or analytics server group adapted to facilitate fail-safe integration and/or optimized utilization of various sensory inputs for various utility applications.

As would be apparent from the figure the system basically involves the self-reliant group of recording servers (101), the group of analytical servers (102) and an intelligent interface (103). Importantly, said recording servers apart from being mutually cooperative and self-reliant to continuously monitor and distribute the operative load based on the number of active servers in the group are also adapted for bandwidth optimized fail-safe recording ((104) and join-split mechanism for multi channel video streaming (105).

The analytical servers (102) are also adapted to cater to at least one of more of background estimation (106), identifying moving, static, quasi static objects (107), enhanced object tracking (108), content aware resource scheduling (109), join-split mechanism for sensory date streaming (110) and resource dependent accuracy control (111).

Figure 2:
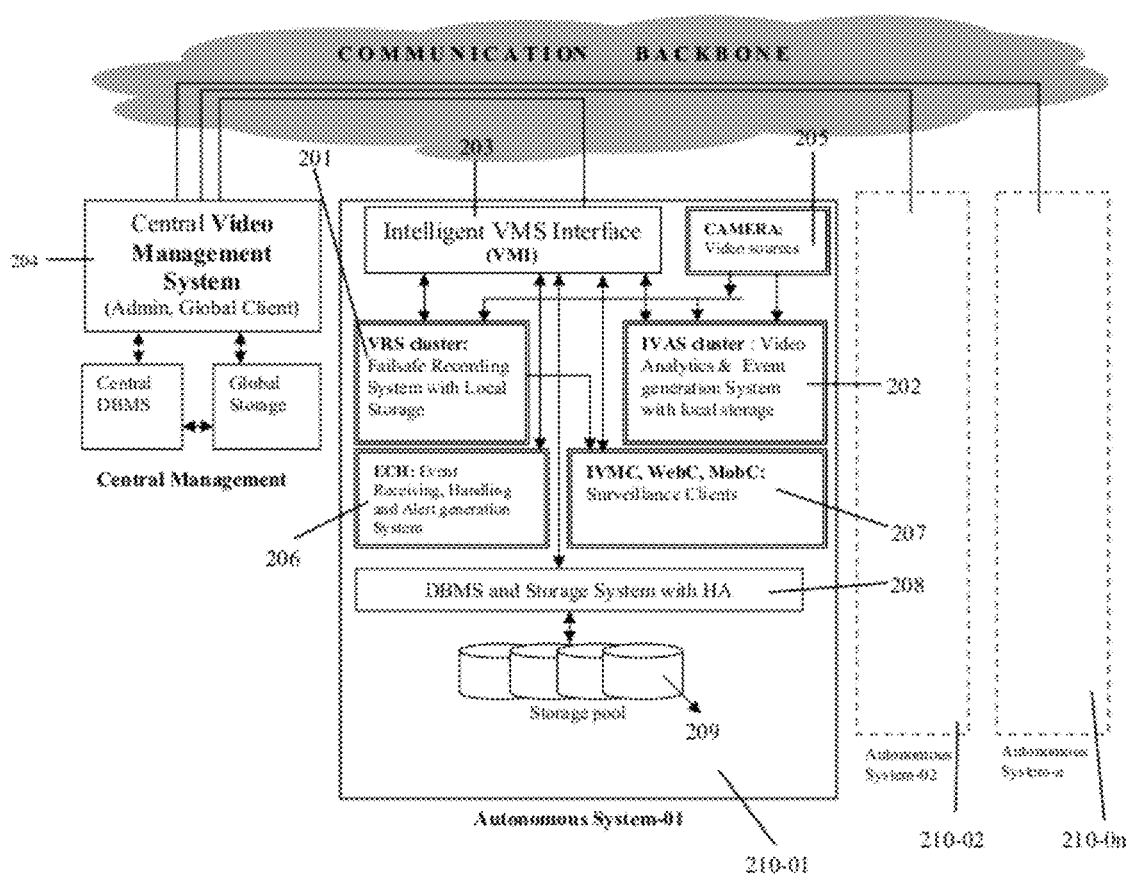
FIG. 2: is an illustrative top level view of intelligent video management system with framework for multiple autonomous system integration.

The various components of the above system adapted to carry out the above advanced functionalities in accordance with the present invention is further outlined and schematically described in FIG. 2:
1. Intelligent Video Management System (204)
   1.1 Video Recording Server (201)
   1.2 Video Management Interface (203)
      1.2.1 User management and Client access controller
      1.2.2 Event concentrator and Handler (206)
      1.2.3 Event distributor
2. Intelligent Video Analytics Server (202)
3. Surveillance Client (207)
4. Web client (207)
5. Mobile device Client (207)
6. Remote Event Receiver (206)

As is clearly apparent from FIG. 2, the present system would enable seamless and intelligent Interconnection of multiple Autonomous Systems (210-01; 210-02 . . . 210-0n). Thus at the same time, multiple such Autonomous Systems can be used as building blocks for a distributed system spanning across wide geographical regions under different local administrative control, with a Centralized view of the whole system from a single point. An Autonomous system (210-01)) is considered as a system capable to implement the functionalities and services involving sensory data and/or its analysis.

Also, the system is capable of handling any sensory data/input and it is only by way of an illustration but not by way of any limitations of the present system that the various exemplary illustrations hereunder are discussed with reference to video sensory data. The underlying system architecture/methodology is applicable in other sensory data types for a true Intelligent Sensor Management System.

A number of machine vision products spanning the domain of Security and surveillance, Law enforcement, Data acquisition and Analysis, Transmission of multimedia contents, etc can be adapted to one or more or the whole of the system components of the present invention.

Figure 3:
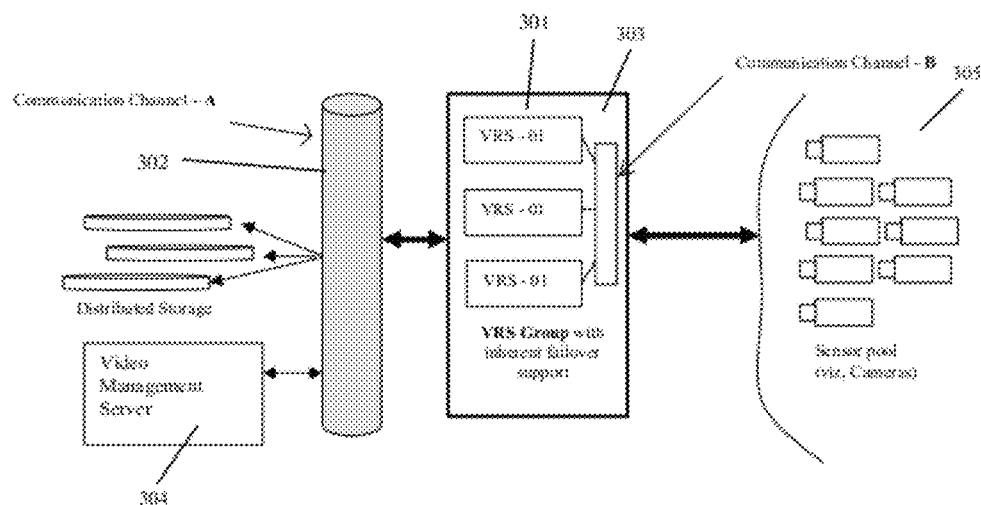
FIG. 3: is an illustration of fail-safe bandwidth optimized recording without any supporting failover support server in accordance with the present invention.

Reference is now invited to accompanying FIG. 3 which shows by way of an embodiment a fail-safe bandwidth optimized recording without any failover support server. As apparent from said figure, for the purpose the input from the pool of sensors (305) are fed not to any single server but to a group of servers (301). Importantly, communication channel (303) is provided to carry inter-VRS communication forming a team towards failover support without any central management and failover server while the communications channel (302) is provided to carry data to central storage involving intelligent bandwidth sharing technique of the invention.

The Implementation of the Recording System:

The Recording system essentially implements the functionalities and services as hereunder:
1. Collecting Data real time: Collect data from various images, video and other sensory sources, both on-line and off-line, archiving and indexing them to seamlessly map in any relational or networked database in a fail-safe way making optimal usage of computing, communication and storage resources, facilitate efficient search, transcoding, retransmission, authentication of data, rendering and viewing of archived data at any point of time.
2. Streaming data real time or on Demand: Streaming video and other sensory content in multiple formats to multiple devices for purposes like live view in different matrix layout, relay of the content, local archiving, rendering of the sensory data in multiple forms and formats, etc. by a fail-safe mechanism without affecting speed and performance of on-going operations and services.

The Video Recording system is implemented using hardware and software, where the hardware can be any standard computing platform operated under control of various operating systems like Windows, Linux, MacOS, Unix, etc. Dependence on hardware computing platform and operating system has been avoided and no dedicated hardware and communication protocol has been used to implement the system.

Recording server implements an open interface both for input and output, (including standard initiatives by various industry consortium such as ONVIF, PSIA, etc.), and can input video feed from multiple and different types of video sources in parallel, with varying formats including MPEG4, H.264, MJPEG, etc. OEM specific SDKs to receive video can also be used. Internal operating principle of the Recording server is outline below:

Recording Server operating principle is adapted for the following:
1. Auto register itself to the IVMS system so that other components like VMS, Surveillance Clients, other VRSes can automatically find and connect it even when its IP-address changes automatically or manually.
2. Form a group with other VRS in the system to implement a failover support without any central control and without support from any dedicated failover server.
3. Accept request from VMI to add and delete data sources including video sources like cameras, receive data from those input sources over IP-network or USB or other connectivity, wired or wireless, using open protocols or SDKs as applicable for a particular data source
4. Record the video and other sensory data in local storage either continuously or on trigger from external devices including the data source itself or on trigger from other components of the Video management system or on user request or on combination of some of the above cases
5. Intelligently upload the video or other sensory data in a cluster of storage devices, where a cluster contains of one or more network accessible storages, in an efficient way giving fair share to individual data sources, utilizing optimal bandwidth and in a cooperative way.
6. Insert information in database so that the data including video data can be searched easily by any component in the system.
7. Stream the video or other sensory data in their original format or in some other transcoded format to other devices including the Surveillance clients when the surveillance client connects it using defined protocol.

Auto Registration of Servers:

All the servers in the system, including the Recording servers, auto register themselves by requesting and then getting a unique Identification number (ID) from the VMI. All the configuration data related to the server including the identification of data sources including the video sources it caters to, the storage devices it uses, etc are stored in the database against this ID. This scheme has the advantage that with only one Static IP address (that of the VMI), one can access any component of the Autonomous System (AS), and the IP addresses of the individual hardware components may be kept varying.

Recording Video or other sensory data in local storage and streaming the data to Client machine The cameras, other video sources or sources generating streaming data (henceforth called Channels) can be auto detected or manually added to the VRS. The details of the channels are stored in the Central Database. Once done, one or more channels can be added to the Recording System. The Recording system thus comprises of one or more Recording servers (VRS) and the Central Database Management System. VRS-es consults the database, know about details of the system, and records the channel streaming data either continuously, or on trigger from any external or internal services, as configured by the user.

The data stream is first segmented into small granular clips or segments of programmable and variable length sizes (usually of 2 to 10 minutes duration) and the clips are stored in the Local storage of the server, the clip metadata being stored in local database.

Figure 4:
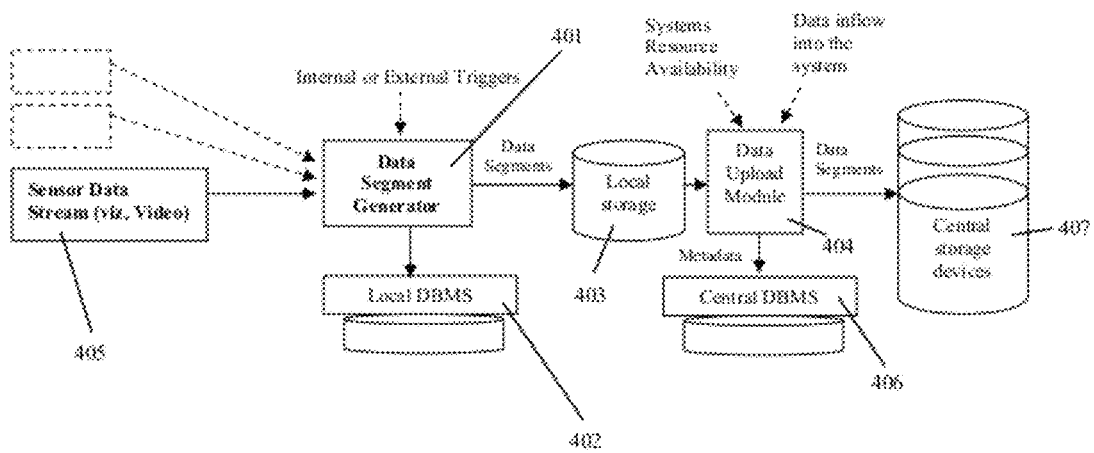
FIG. 4: is an illustration of the dataflow diagram from a single video source through the recording server.

Reference is invited to accompanying FIG. 4 which shows the dataflow mechanism in accordance with the invention from a single video service through the recording server. As apparent from FIG. 4, the sensory data stream viz. video (405) is feed to a data segment generator (401) which is next stored in segments in local storage (403/402) and thereafter uploaded through data upload module (404) to a central storage (406)/407).

Any external component of the system can enquire the VRS to know about the details of the channels it is using and get the data streams for purposes like live view, Relaying to other devices etc using a networked mutual client-server communication protocol Bandwidth Adaptive Data Uploading to Central Storage System In the system of the invention, an efficient technique has been designed to transfer video or other sensory data received from the channels to the central storage system via the local storage. Instead of allocating a particular data source (e.g., a camera) to a particular server (dedicated point to point) for recording of data (e.g, video), it is allocated to a 'Server group' with multiple servers in the group [FIG. 3]. The members of the group exchange their capacity information amongst themselves and share the load according to their capacity. In case of breakdown of one or more servers, the team members share the load of the failed server(s), without any central control or without support from any dedicated fail-over server. For data uploading, each server not only monitors the available bandwidth but also the data inflow rate for each channel into the server, and accordingly adjusts the upload rate for an individual channel. For the purpose the data stream is segmented into variable sized clips and the rate of uploading the clips to the central storage is adjusted depending on the available network bandwidth and data inflow rate for that particular channel [FIG. 4]. As shown in the figure, the sensor data stream (405) is segmented in data segment generator (401) which is next stored in local storage ((402,403) and thereafter involving a data upload module (404) the same is sent to the central storages (406/407).

Implementing Fail-Over Support without any Dedicated Failover Server and Mirror Central Control The system of the invention is further adapted for back up support in case of server failure without the involvement of any special independent stand by support server. Traditionally (prior art), dedicated fail-over servers are used which senses the heartbeat signals broadcasted by the regular servers. Once the heart beat is found missing, the failover server takes up the task of the failed server. This technique is inefficient as it not only blocks the resources as dedicated failover servers, but cannot utilize the remaining capacity of the existing servers for back up support. Also, failure of the failover server itself jeopardizes the overall failover support system.

In the proposed system the recording servers exchange information amongst themselves so that each server knows the leftover capacity and the channel information of every other server. In case of server failure, the remaining active servers distributes the load amongst themselves.

The Implementation of the Video Analytics System

The Video Analytics System essentially implements the functionalities as hereunder:
1. Data Content Analysis: Intelligently analysing the data, on-line or off-line, to extract the meaningful content of the data, identifying the activities of foreground human and other inanimate objects in the scene from the sensor generated data, establishing correlation among various objects (living or non-living) in the scene, establishing correlation amongst multiple types of sensory data, identifying events of interests based on the detected activities—all either automatically or in an user interactive way under various demographic and natural real life situations. Several novelties have described in the relevant sections describing the details of the data content analysis techniques.
2. Automatic Alert Generation: Generating Alerts, signals, video clips, other sensory data segments, covering the events automatically as and when detected.

The Video Analytics system comprises hardware and software, where the hardware can be any standard computing platform operated under control of various operating systems like Microsoft Windows, Linux, MacOS, Unix, RTOS for embedded hardware, etc.

Dependence on hardware computing platforms and operating systems has been avoided and no dedicated closed hardware needs to be used to implement the system. At the same time, part or whole of the system can be embedded into other products with some existing services, without affecting those services.

An example is provided in the form of "Intelligent Home Security" box shown in FIGS. 4A to 4J where a specially built hardware is used to provide several services viz, Digital Photo-frame, Perimeter security, Mobile camera FOV recording & relay, Live view of cameras, etc.

Figure 4A:
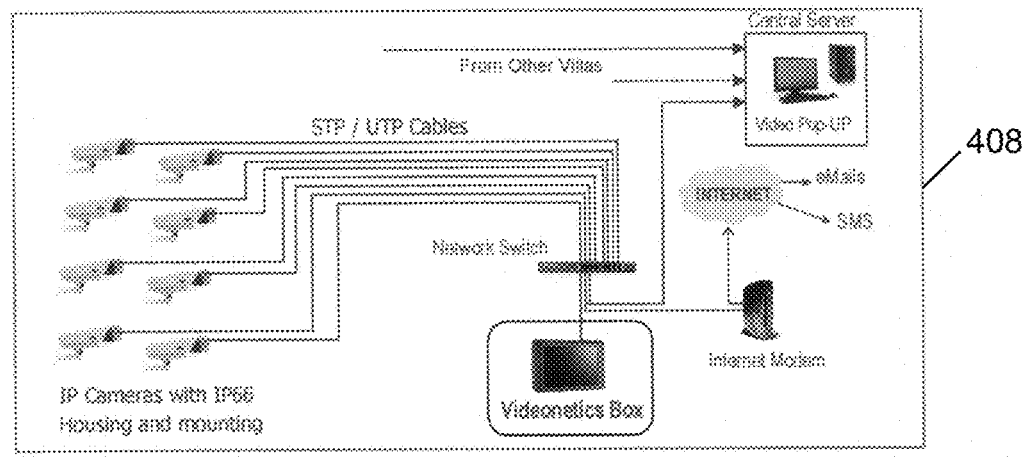
FIG. 4A to 4J: illustrate an exemplary Intelligent Home Security" box involving the system of the invention.
Figure 4B:
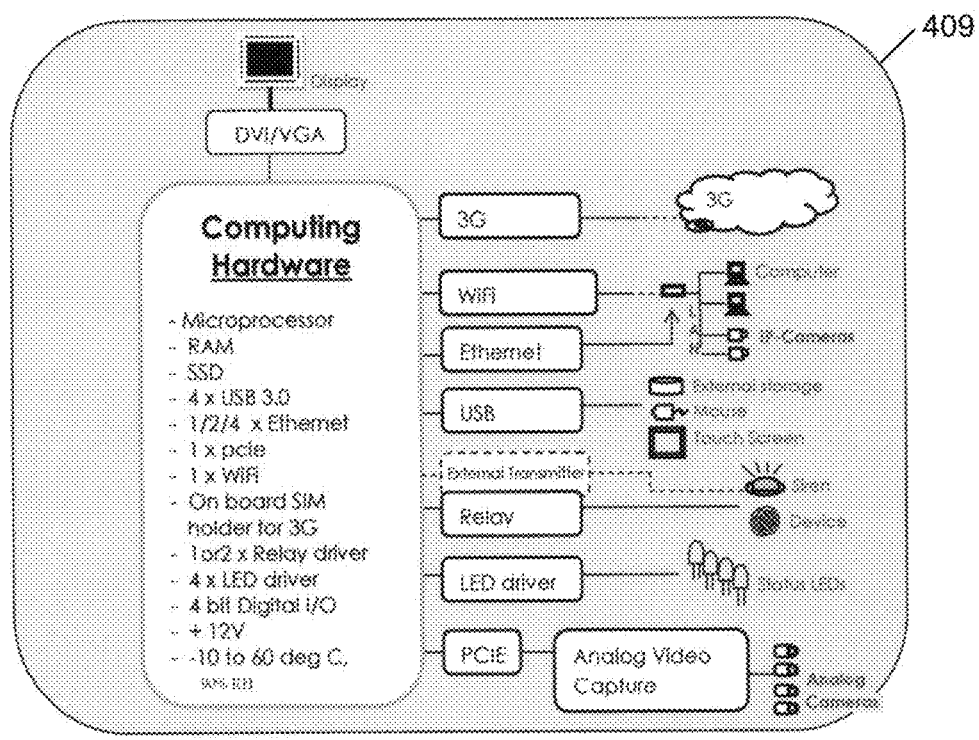
Figure 4C:
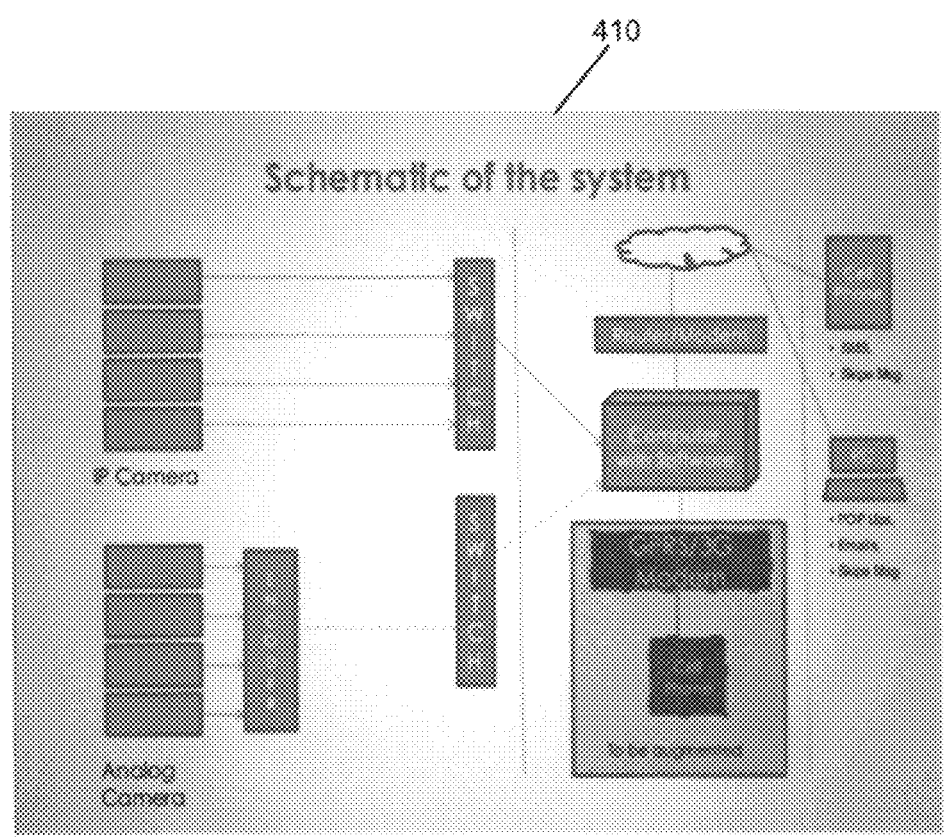
Figure 4D:
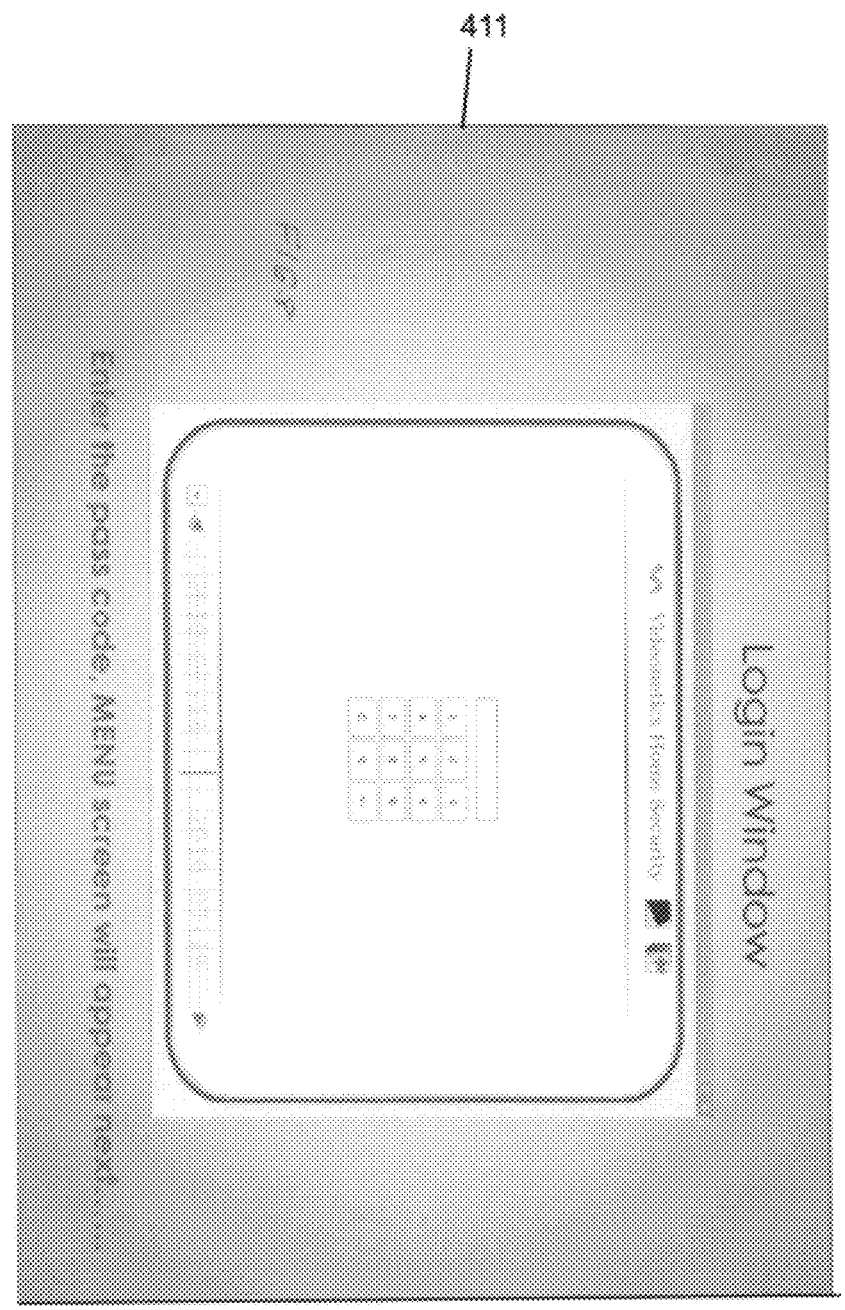
Figure 4E:
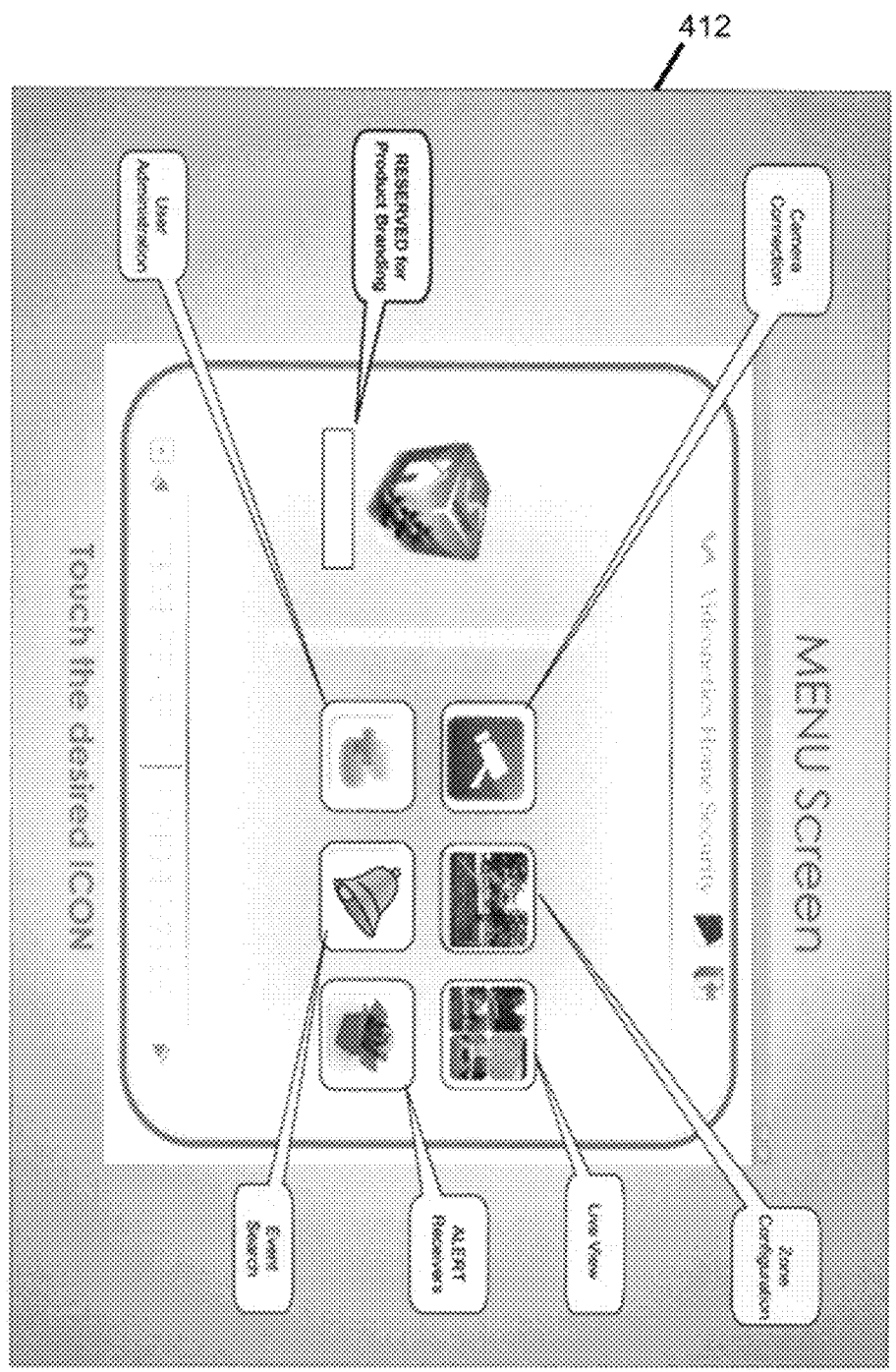
Figure 4F:
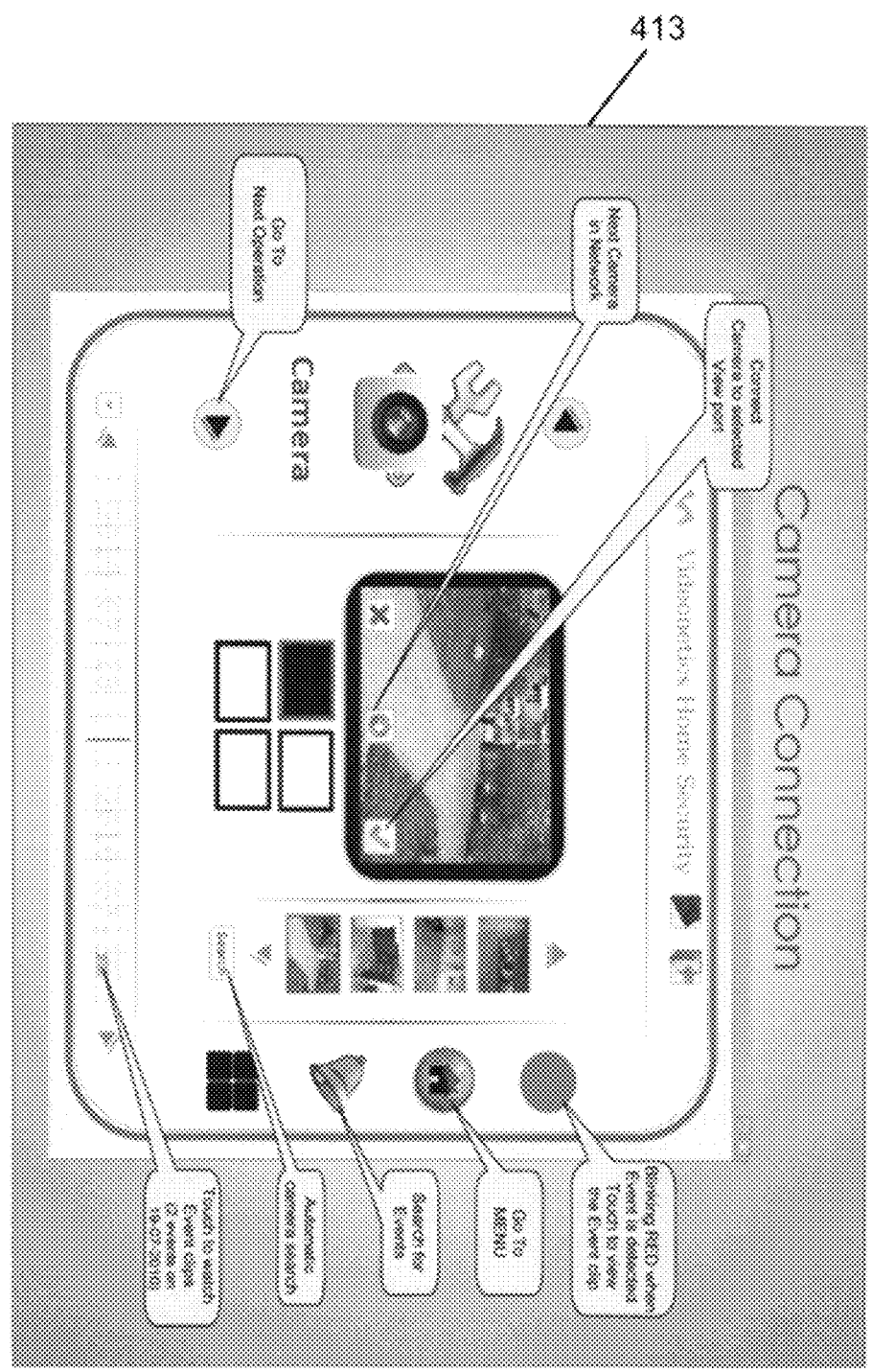
Figure 4G:
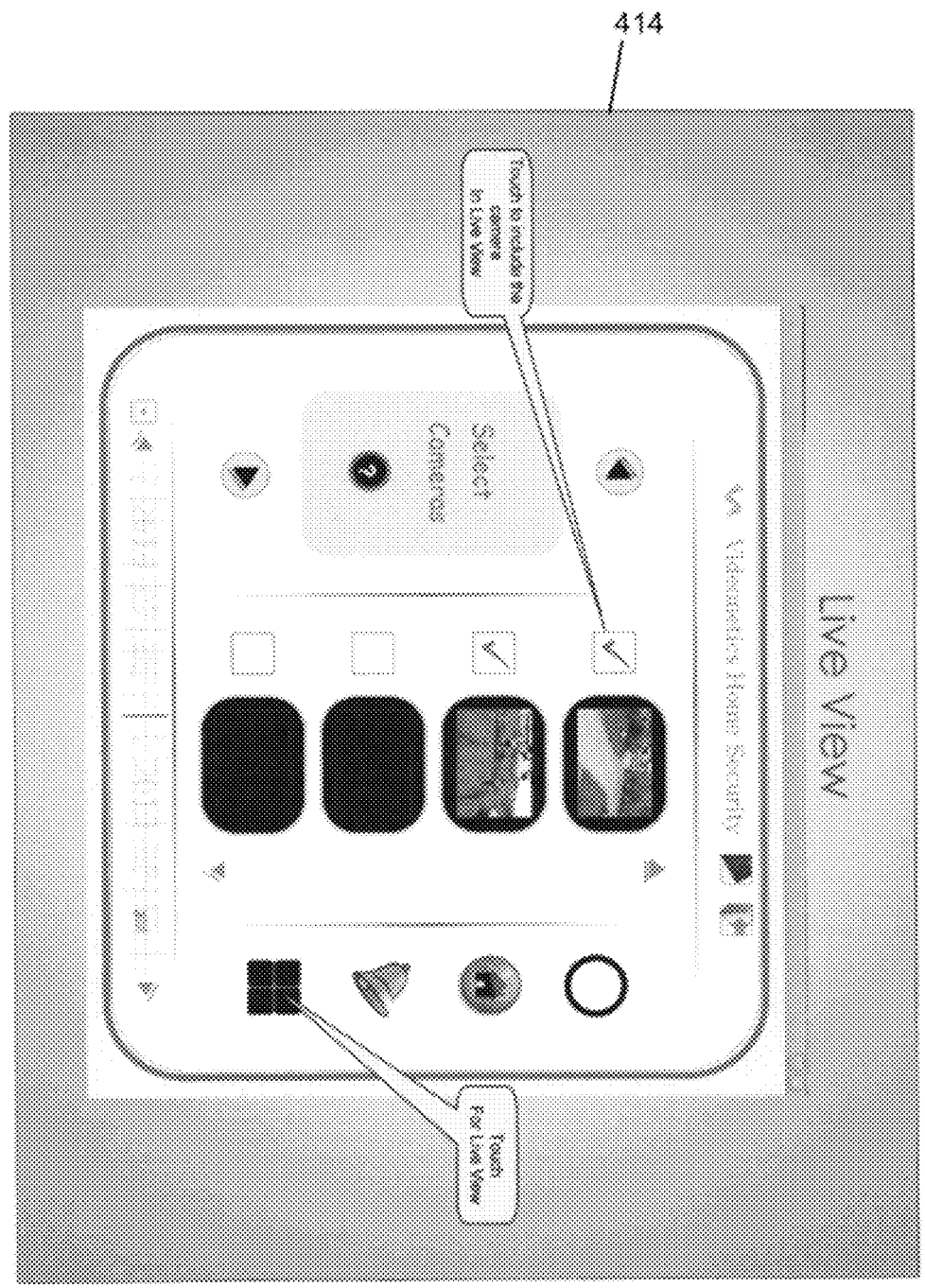
Figure 4H:
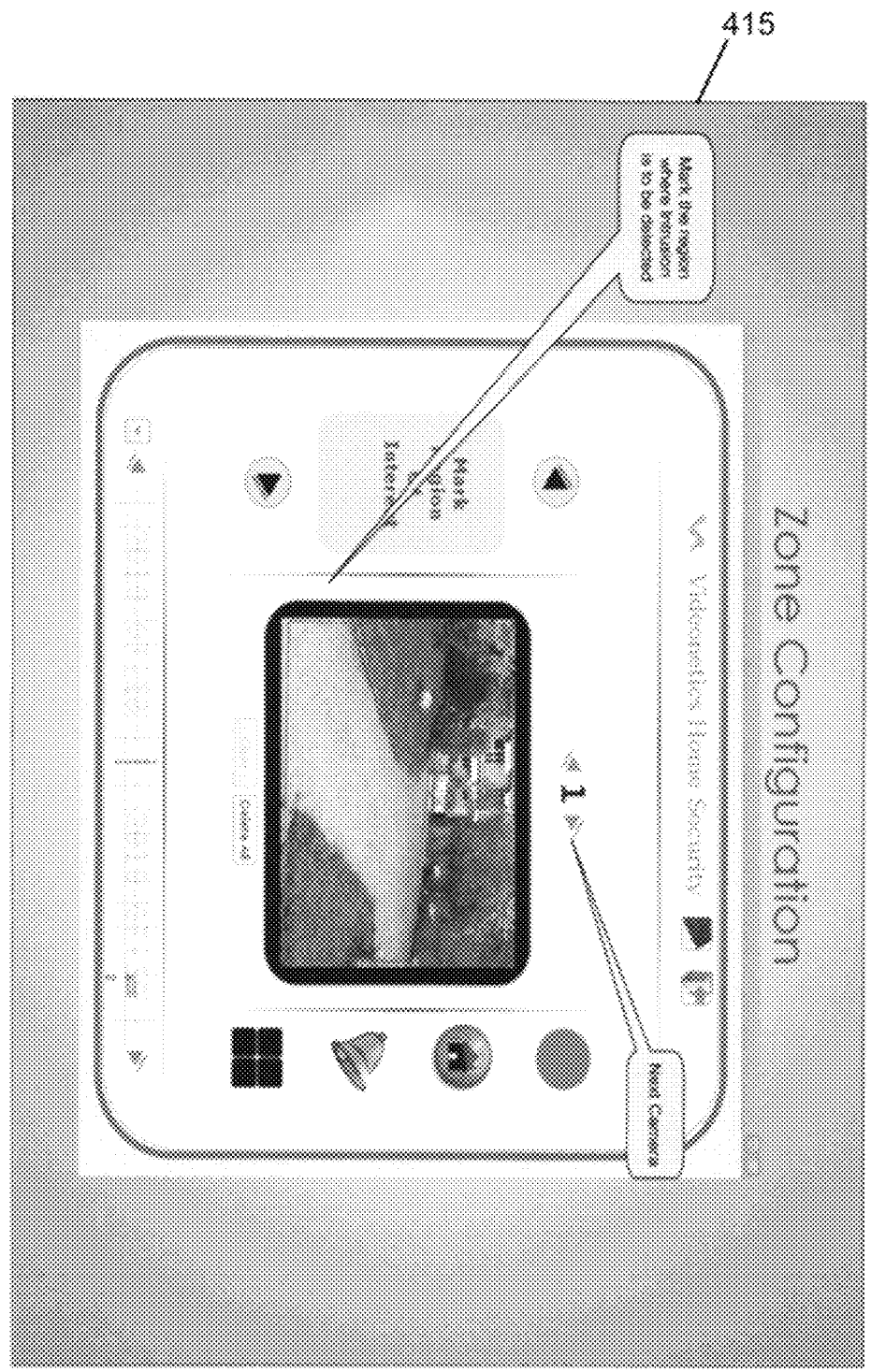
Figure 4I:
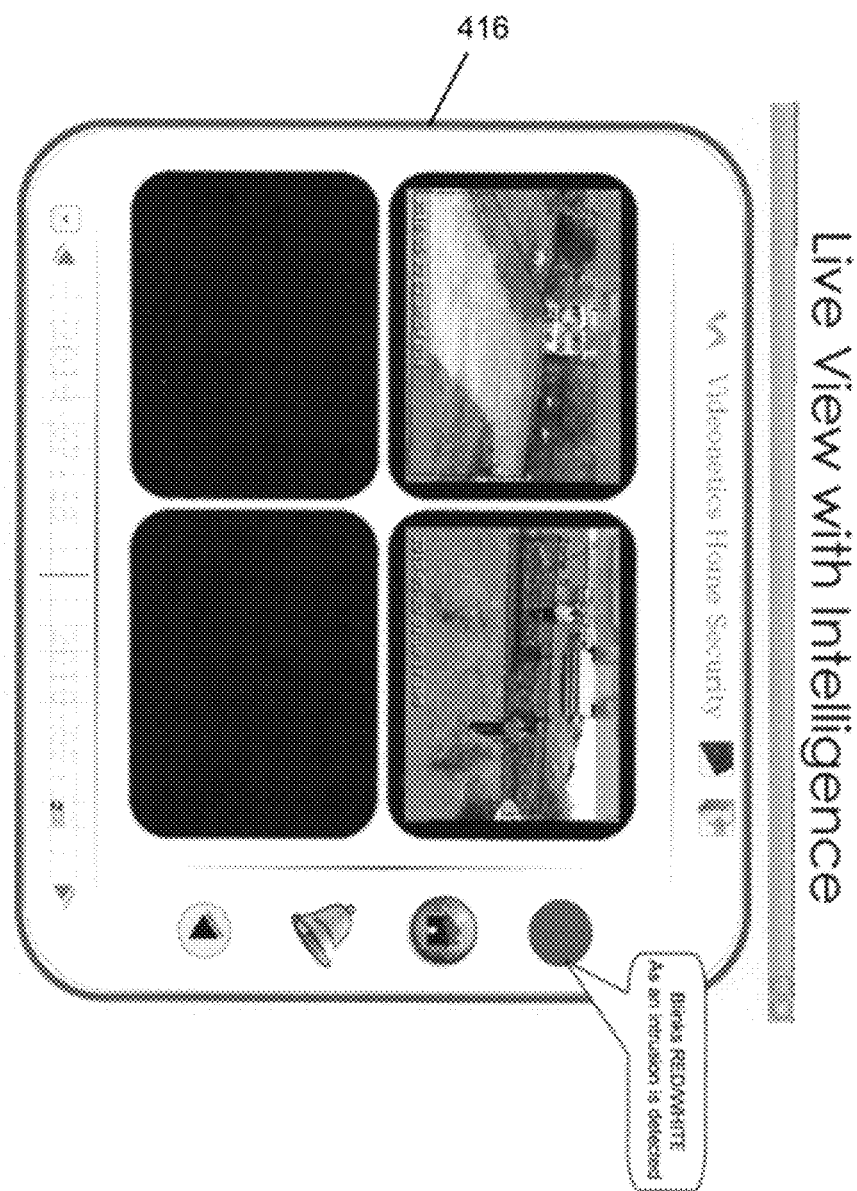
Figure 4J:
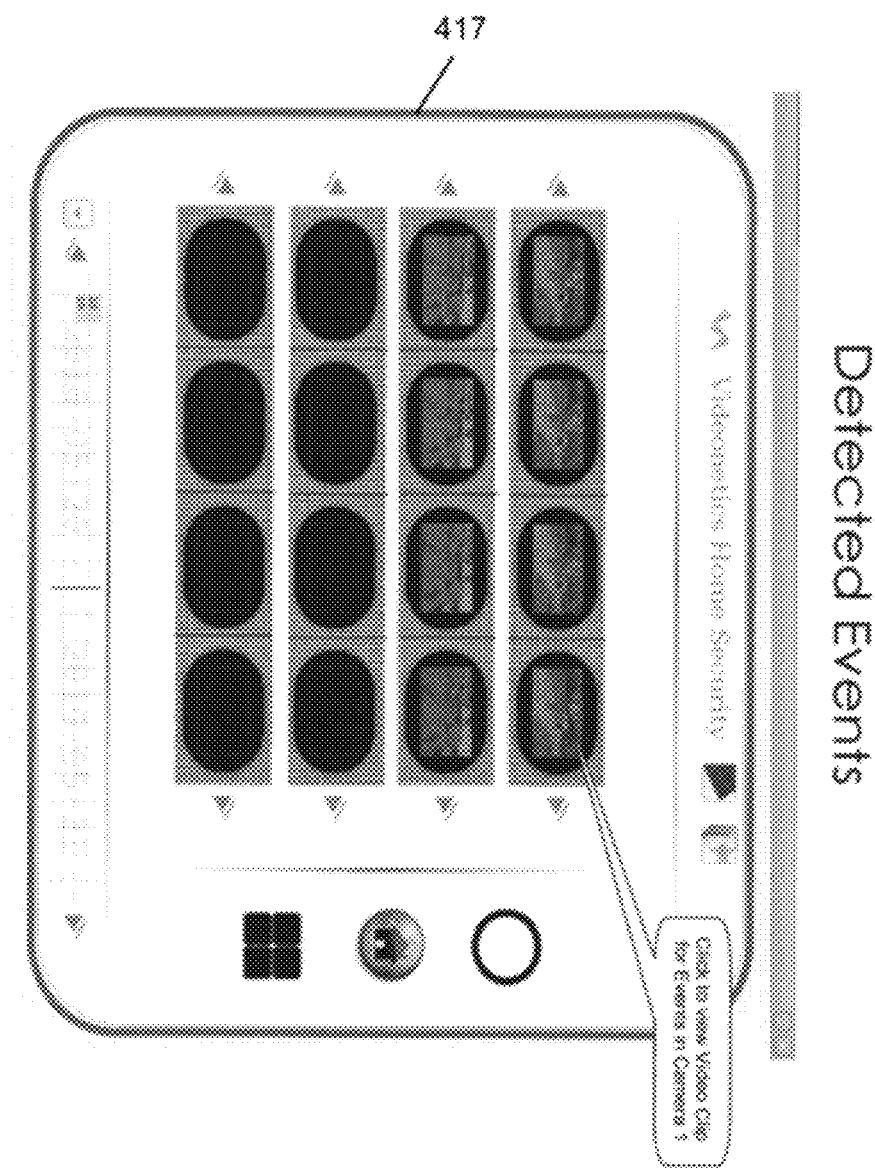

Referring to FIG. 4A, a schematic diagram of a Networked Intelligent Villa/Home/Property Monitoring System is shown. All of the intelligent video management server and intelligent monitoring applications that are described in previous sections have been embedded into the Videonetics Box. The Box has an easy to use GUI using touch-screen so that any home/villa/property owner can easily operate it with minimum button pressing using visual display based instructions only. The top level systems architecture for the embedded hardware and details of the components in the hardware system is shown in FIG. 4B.

The following is a micro-architectural components summary for an example of a multi-channel IP-camera solution. Video from IP-Cameras is directly fed to the computer without the requirement of any encoder. There are three options: One, no network switch is required. The Motherboard should have multiple Ethernet ports; two, the Motherboard has only one Ethernet port assuming all the cameras are wireless IP-Cameras. The Motherboard should have 1× Ethernet port and 1× Wifi interface; and three, the Motherboard has only one Ethernet port, the cameras are wired, but a Network switch is required as an external hardware.

On detection of events the following tasks are performed:
a siren blows;
an SMS/MMS is sent;
event clip is archived; and
the event clip is also streamed to any designated device over the Internet.

The following Interfaces are required to handle the above tasks: at least one RELAY O/P for siren drive or DIO for Transmitter interface; and a 3G interface for SMS/MMS or sending event clip to Cell Phone. Other usual hardware includes:
a) USB;
b) Touch Screen Interface;
c) external storage;
d) 3G dongle, if 3G is not embedded into motherboard;
e) keyboard, if touch screen is not attached; and
f) DVI port for display.

The following is a micro-architectural components summary for an example of a multi-channel analog camera solution. Video from analog camera is received by an encoder hardware. The encoded RAW image is fed to the computer for processing. System Hardware should be capable to handle the following activities:
1. multi channel encoding, each at 15-30 fps for D1 size, but not limited to, higher frame rate and higher resolution as long as computing bandwidth supports this frame rate and resolution video data
  a. Input to encoder: Analog video in NTSC or PAL
  b. Output from encoder: YUV or RGB
  There are two options:
  a. The encoder could be a separate module connected to motherboard through PCIE
  b. The encoder circuitry may be embedded in the motherboard
2. On detection of events following tasks are performed:
  a. A siren blows
  b. An SMS/MMS is sent
  c. Event clip is archived
  d. Event clip is also streamed to any designated device over Internet The following hardware Interfaces are required to handle the above tasks:
  a. At least one RELAY O/P for siren drive or External Transmitter interface (DIO)
  b. 3G interface for SMS/MMS or sending event clip to Cell Phone.
  c. Ethernet for remote access to the system
3. Other usual hardware:
  1. USB:
    a. Touch Screen Interface
    b. External Storage
    c. 3G dongle, if 3G is not embedded into motherboard
    d. keyboard if touch screen is not attached
    e. DVI port: for Display Referring to FIG. 4C, a top level heterogeneous system architecture (both IP and analog cameras) is illustrated. Referring additionally to FIGS. 4D-4J an operational flow by a user and representative GUI using a touch panel display of the intelligent monitoring system is detailed in a step-by-step flow.

Thus, a new and improved intelligent video surveillance system is illustrated and described. The improved intelligent video surveillance system is highly adaptable and can be used in a large variety of applications can be conveniently adapted to a variety of customer-specific requirements. Also, the intelligent video surveillance system is automated, intelligent, and requires a minimum or no human intervention.

Various changes and modifications to the embodiment herein chosen for purposes of illustration will readily occur to those skilled in the art. To the extent that such modifications and variations do not depart from the spirit of the invention, they are intended to be included within the scope thereof.

The Analytics Engine

Various rule sets for inferencing the dynamics of the data (interpretation of Events) are defined inherently in the system or they can be defined by the users. An Analytics engine detects various activities in the video or other sensory data stream and on detection of said activities conforming to one or more Events, sends notification messages with relevant details to the recipients. The recipients can be the VMI, the central VMS or Surveillance Clients or any other registered devices. To perform the above tasks, the scene is analyzed and the type of analysis depends on the type of events to be detected.

Figure 5:
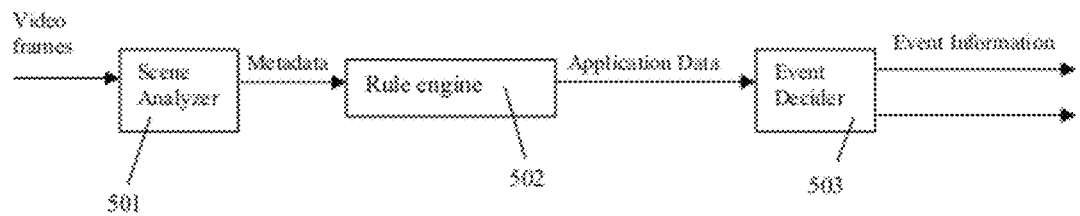
FIG. 5: is an illustration of the single channel data flow in video analytical engine in accordance with the present invention.

The data flow within the Analytics Engine for a single channel, taking video stream as the channel data, is as schematized below [FIG. 5]. The functionalities of various internal modules of the Analytics Engine and other components are described below, taking Video channel as an example for Sensory data source.

(A) Scene Analyzer (501): The Scene analyzer is the primary module of the Analytics engine and that of the IVAS as well. Depending on the Events to be detected, various techniques have been developed to analyze the video and sensory data content and extract the objects of interests in the scene or the multi-sensory acquired data. Importantly, the scene analyzer is adapted to analyze the media content (e.g., video) based on intelligent scene adaptive colour coherent object analysis framework and method. Implementation of the same has been done so that it is adaptive to the availability of computational bandwidth and memory and the processing steps are dynamically reconfigured. As for example, as described further in detail hereunder a trade-off is done automatically by the Analytics engine to strike a balance between the accuracy of face capture and the CPU clock cycles available for processing.

The Scene Analyzer generates meta-data against each frame supplied to it for analyzing. It also computes the complexity of the scene using a novel technique and dynamically reconfigure the processing steps in order to achieve optimal analysis result depending upon the availability of the computational and other resources for on-line and real-time detection of events and follow up actions. It feeds the metadata along with the scene complexity measure to the Controller, so that the Controller can decide the optimal rate at which the frames of that particular video channel should be sent to the Analytics engine for processing. This technique is unique and saves computational and memory bandwidth for decoding and analysis of the video frames.

(B) Rule Engine (502): The Rule Engine keeps history of the metadata and correlates the data across multiple frames to decide behavioural patterns of the objects in the scene. Based on the rules, various applications can be defined. As for example it is possible to detect whether a person in jumping a fence or whether there is a formation of crowd or whether a vehicle is exceeding the speed limit, etc.

(C) Event Decider (503): The behavioural patterns, as detected by the Rule Engine is analyzed by this module to detect various events in parallel. The Events can be inherently defined or it may be configured by the user. As for example, if there is a crowd formation only in a specific zone whereas other areas are not crowded, that may be defined to be an event. Once an Event is detected, a message is generated describing the type of event, time of occurrence of the Event, the location of occurrence of the Event, the Video clip URL, etc.

The Event decider can also control any external device including a PTZ camera controller which can focus a region where the event has taken place for better viewing of the activities around that region or recording the scene in a close up view. One such advanced framework is detailed hereunder as enhanced object tracking where the utility of an Object tracking system is enhanced using a novel technique using a PTZ camera along with the Object tracking system.

The Analytics Engine Controller

Figure 6:
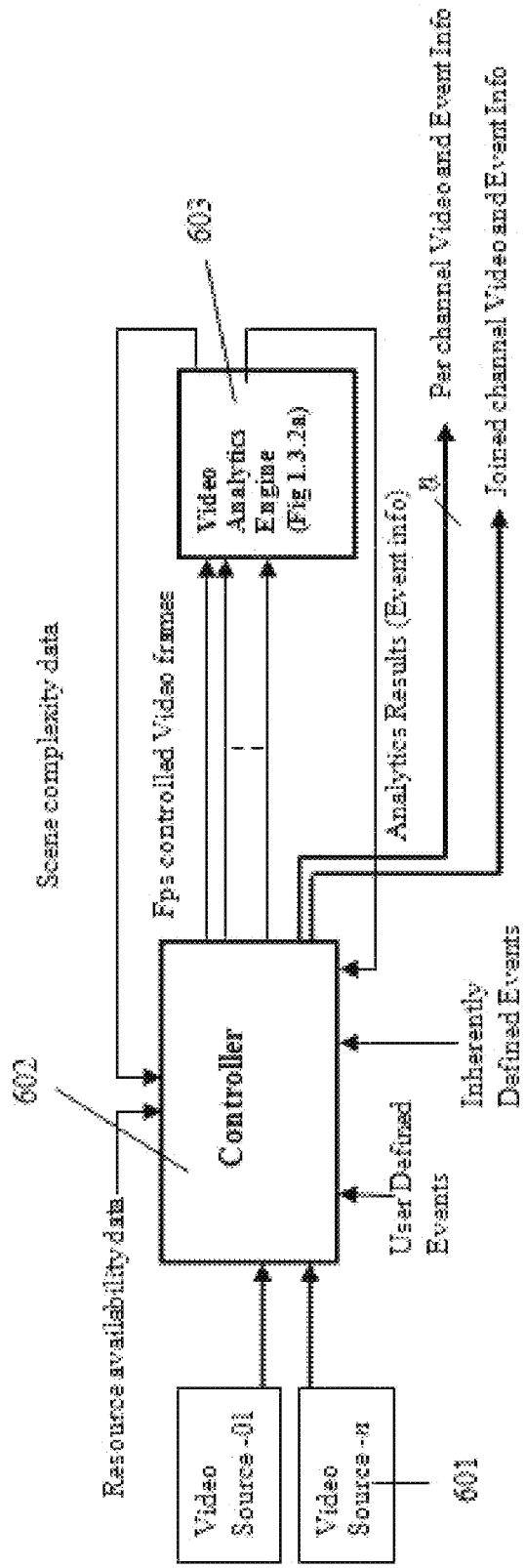
FIG. 6: is an illustration of intelligent video analytics server in accordance with the present invention.

A Controller module (602) as shown in FIG. 6 has been designed which can receive multiple video channels, possibly in some compressed form (e.g, MJPEG, Motion JPEG2000, MPEG, H.264, etc. for video and relevant format for other sensory data such as MP4 for audio, for example but not limited to), and feeds the decoded video frames to the Analytic engine. The Controller uses an advanced technique to decide the rate of decoding of the frames and to feed the decoded video frames of multiple channels to the Analytics engine in an optimal way, so that the number of frames sent per second for each video channel is individually and automatically controlled depending on the requirement of the Analytics engine and also on the computational bandwidth available in the system at any point of time. The technique has been described in detail in relation to video content driven resource allocation for analytical processing.

The Controller also streams the video along with all the Video Analytics data (existing configuration for Events, Event Information, video clip URL etc), either as individual streams for each channel, or as a joined single stream of video data for all or user requested channels. A novel technique for joining the video channels and transmitting the resulting combined single channel over IP network has been deployed to adapt to varying and low bandwidth network connectivity. The technique is described in detail in relation to video channel join-split mechanism for low bandwidth communications.

The Controller can generate Events on its own for the cases where Events can be generated without the help of Video Analytics engine (eg, Loss of Video, Camera Tampering as triggered by Camera itself, Motion detection as intimated by the Camera itself, as so on).

The Implementation of Video Management Interface (VMI)

Figure 7:
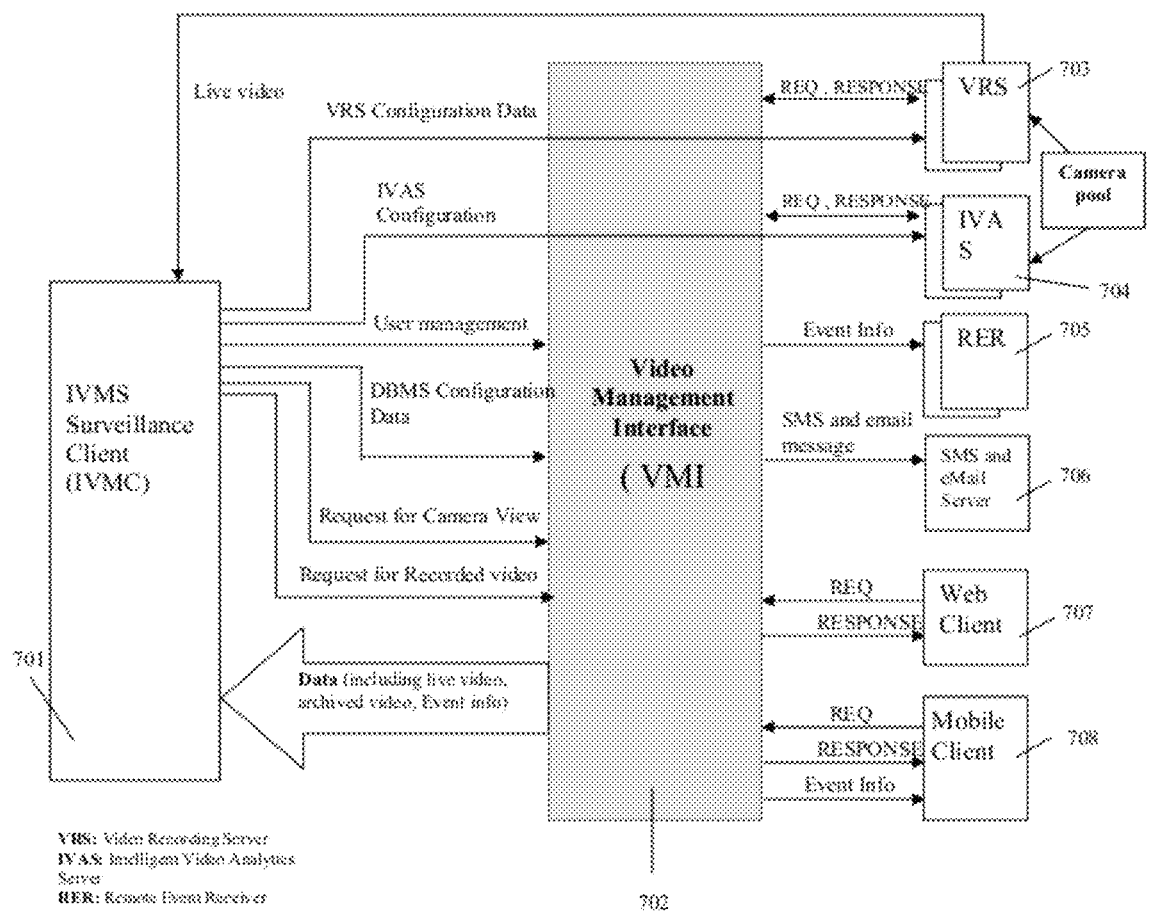
FIG. 7: is an illustration of video management interface functionalities in accordance with the present invention.

The Video Management Interface (702) is shown in FIG. 7 which interfaces between an individual Autonomous System and rest of the world. It also acts as the coordinator among various other components within a single Autonomous system, viz, Video Recording System (703), Intelligent Video Analytical Server (704), Surveillance Clients (701), Remote Event Receiver (705), etc. [It essentially implements the functionalities including:

1. Filtering and need based transmission of data: Distribution of whole or part of the collected sensory data, including the video and other sensory data segments generated as a result of detection of an event by the analytical engine above, at the right recipient at the right point of time automatically or on user interaction.
2. Directed distribution of Alerts: Distributing Event information in various digital forms (SMS, MMS, emails, Audio alerts, animation video, Text, illustrations, etc. but not limited to) with or without received data segments (viz, video clips) to the right recipient at the right point of time automatically or on user interaction.
3. Providing a common gateway for heterogeneous entities: Providing a unified gateway for users to access the rest of the system for configuration, management and monitoring of system components.

The Interface operating principle involved in the system is discussed hereunder:

1. Auto register itself to the IVMS system so that other components like Surveillance Clients (including Web Clients and Mobile Clients), Remote Event Receivers, can find and connect it even when its IP-address changes;
2. Accept request from Surveillance clients to add and delete data sources like cameras to the VRSes and IVASes and relay the same to the corresponding VRSes and IVASes.
3. Receive configuration data from the Surveillance clients and feed them to the intended components (viz, VRS, IVAS, DBMS, Camera etc) of the system. For VRS, the configuration data includes Recording parameters, Database paths, Retention period of recording, etc. For IVAS, it is the Event and Application settings, Event clip prologue-, after event- and lifetime-duration, etc.
4. Receives Event information from IVAS on-line and transmit it to various recipients including Remote Event Receivers. Fetch outstanding Event clips, if any, from IVAS. Outstanding clips may have been there inside IVAS, in case there was a temporary network connectivity failure to IVAS.
5. Periodically receive heartbeat signals along with status information from all the active devices, and relay that to other devices in the same or in other networks.
6. Serve the Web clients and Mobile embedded clients by streaming Live video, Recorded Video or Event Alerts at the right time.
7. Join multiple channel video into a single combined stream to adapt to variable and low bandwidth network. A novel technique for joining the video channels and transmitting the resulting combined single channel over IP network has been deployed to adapt to varying and low bandwidth network connectivity. The technique is described in relation to video channel join-split mechanism for low bandwidth communication.

8. Enable the user to search for the recorded video and the Event clips based on various criteria, including Data, Time, Event types, Video Channels.
9. Enable the user to perform an User-interactive Smart search to filter out desired segment of video from video database In essence, once the Interface (702) is installed the VRS (703), IVAS (704) and other components of the system can be configured, and the user can connect to the System. However, at run time all the VRS and IVAS can operate on their own, and do not require any service from the VMI, unless and otherwise some System configuration data has been changed.

Independence for of the servers from any Central controller for their routine operation gives unprecedented scalability with respect to increase in number of servers. This is because, it does not add any extra load to any other component than the server itself. This is a unique advancement where the Video Management Server Interface acts only as a unified gateway to the services being executed in other hardware devices, only for configuration and status updating tasks. This opens up the possibility of keeping the User interface software unchanged while integrating new type of devices. The devices themselves can supply their configuration pages when the VMI connects to them for configuration. Similarly, the messages generated by the servers can also be shown in the VMI panel seamlessly.

The Video Management Client(701), Web Client(707), Mobile Device Embedded Client(708)

All the above client modules in essence implement the functionalities including:

Providing Live view or recorded view of the data stream: Enabling user to view camera captured video in different matrix layouts, view other sensory data in a presentable form, recorded video and other data search and replay, Event clips search and replay, providing easy navigation across camera views with help of sitemaps, PTZ control, and configuring the system as per intended use.

The VMS system can be accessed through the standalone surveillance client or any standard Internet browser can be used to access the system. Handheld devices like Android enabled cell phone or tablet PCs can also be used as a Client to the system for the purposes (wholly or partially) as mentioned above.

The Remote Event Receiver (705)

RER (705) shown in FIG. 7 is the software module which can be integrated to any other modules of the IVMS. The Remote Event Receiver is meant to receive and display messages and ALERTs from other components, which are multicast or broadcasted. Those messages include Event ALERTS, ERROR status from VRS or IVAS, operator generated messages, etc. The Messages can be in the Video as well as Audio form, or any other form as transmitted by the Video management system components and the resulting response from by the RER depends on the capability and configuration of the hardware where the RER is installed. When integrated with the Surveillance clients (IVMC), the IVMC can operate can be switched to RER mode and thus will respond to ALERTs and messages only.

The Central VMS System

Central VMS System (204 in FIG. 2) is adapted to serve as a gateway to any Autonomous System (210-01 . . . 210-0n) components. It also stores the configuration data for all ASes in its Centralized database. It is possible to integrate otherwise running independent VMS systems into a single unified system by including Central VMS in a Server and configure that accordingly.

The Sitemap Server

A Sitemap server is included within each Autonomous System (210-01 . . . 210-0n) and also within the Centralized VMS (204 in FIG. 2). The Sitemap server listens to requests from any authorized components of the System and responds with positional data corresponding to any component (Camera, server, user etc.) which is linked to the Site map. The Site map is multilayered and components can be linked to any spatial position of the map in any layer.

The above describe the framework, architecture and system level components of the Intelligent system of the invention. The technology involved in the development of the system can be used to integrate various other types of components not shown or discussed above. As for example, an Access Control System or a Fire Detection System can be integrated similar to VRS or IVAS, configured using IVMC and VMI, and their responses or messages can be received, shown or displayed and responded to by IVMC or RER, stored as done for Event clips or Video segments and searched on various criteria.

The system of the invention detailed above is further versatile enough to interface and scale to many other management systems such as the involvement in intelligent automated traffic enforcement system also discussed in later sections.

Figure 8:
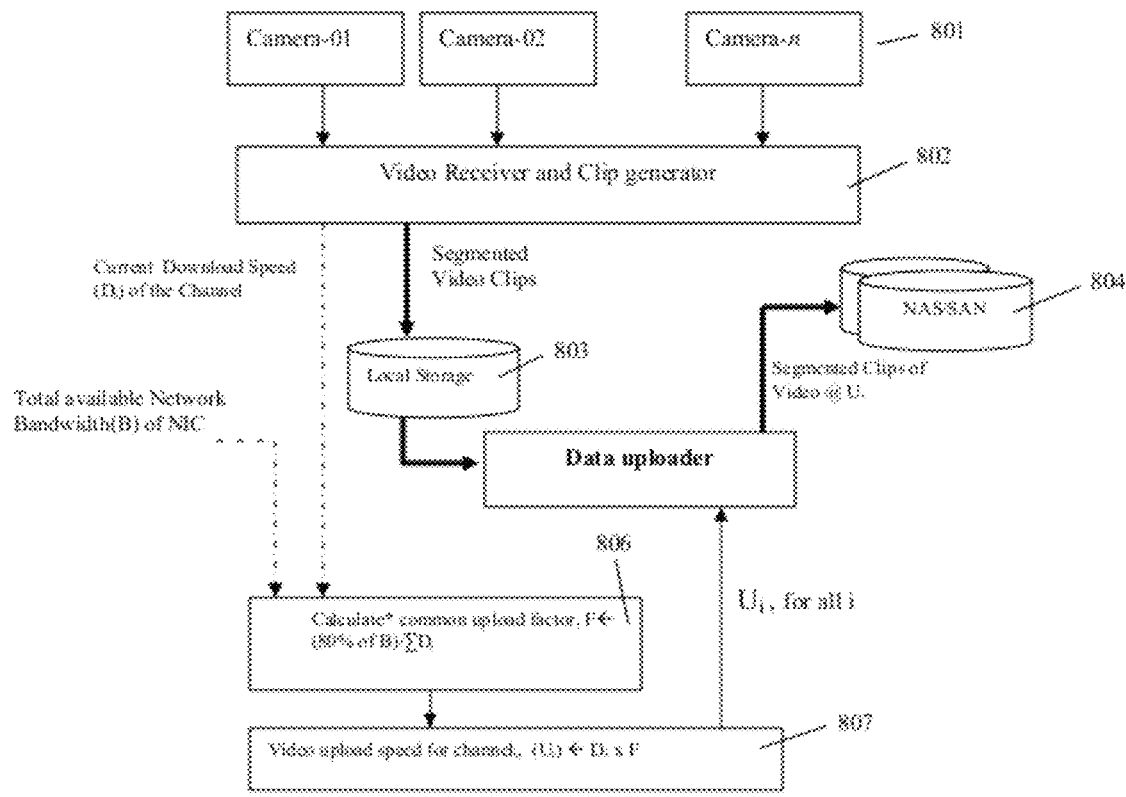
FIG. 8: is an illustration of intelligent data upload process in accordance with the present invention.

Reference is now invited to accompanying FIG. 8 which illustrates the manner of segmented data system based stagewise data uploading from local storage to a central storage. As shown in said figure the various stages/components are illustrated therein under references 801 to 807.

What is disclosed is a fault tolerant and efficient method for recording sensory data (e.g video) as received from a single or multiple number of data sources like Cameras to network accessible storage devices, estimation of optimal required bandwidth for individual data channels taking into consideration the data download speed (inflow rate) from data source to server along with the availability of network bandwidth at any given point of time, efficient network bandwidth sharing amongst the data channels for uploading data to storage devices over network. The framework and technique is disclosed and described below taking example for Video receiving and storing, though the same framework can be used for other type of data also.

In a system where the a server hardware performs the task for video capture, video recording as well as video streaming concurrently to client machines for a set of cameras, this method is more effective to provide a demand based network bandwidth to all the services and also to maintain the QOS for client machines, especially when the client machine is used for live viewing of the camera FOVs.

Video Management System using IP enabled video capturing devices (Cameras etc) has become an integral part of Surveillance industry today. A basic requirement of this type of systems is to input compressed video streams from multiple cameras and record the video in storage devices. In the earlier days when DVR and then NVR were predominant components, the complexity and hence the challenges for efficient deployment of the system were less. This is because each DVR or NVR was a standalone system taking feed from a handful of cameras (typically 16 or 32), and used their dedicated local storage devices to record the video. However, when the number of cameras started to increase beyond 100, and typically to a few hundreds, and the users demanded a unified system to record, view and search video from these hundreds of cameras efficiently, Video Management System emerged as a solution. In a typical Video Management System there are multiple servers, each catering a set of Video Capture devices (e.g., Cameras), one or more network accessible RAID configured storage devices, and multiple workstations. Each server now needs to handle 64 or more cameras, stream the video from the cameras to the client machines.

In a Video Management Server system, there is a requirement for an efficient Network bandwidth management, so that all the network bandwidth hungry tasks assigned to the servers, viz, grabbing video from IP-cameras, uploading video to Network accessible storage devices and streaming the video channels to the Clients on demand, are executed in an optimal way. Also, the system must be fault tolerant so that intermittent failure of the Network connectivity from the Server to the Network accessible storage devices does not result loss of video in the storage. All these activities should happen automatically without any user interaction. Due to high demand in bandwidth to perform such tasks, especially for video data, often separate high speed network are dedicated to transfer data to storage media. Dedicated high speed network is costly and often require costly storage devices as well. Often this is a overkill for low or moderately priced installations. However there has hardly been any choice because no effective strategy for network bandwidth sharing among multiple concurrent processes in a single server could be devised in traditional systems, particularly in a situation when the data sources stream data at variable bit rates, with prior art.

The challenge here is to make the system efficient with respect to all the tasks mentioned above. Traditionally, systems are proposed where redundancy in terms of multiple network paths from storage devices to servers, very high speed storage network and redundant recording and streaming servers are used to cater to such problems. This incurs high cost and non-optimal use of the resources, as a sizable portion of the resource is underutilized or non-utilized under normal scenario. The proposed system is unique as it handles all the above tasks in an efficient way, with optimal use of the resources (Network, Storage space), even using a decent server having only one Network interface card.

In the proposed system shown in FIG. 8, the video from the cameras are not directly recorded to the Central Storage (NAS/SAN). Instead, the Video Recording Server first stores the video in a local storage space and then transfers the video to NAS/SAN periodically with the URL of the video files stored in the database. Intermittent loss of connectivity from the server to the network accessible NAS/SAN and/or that to the Database Management System does not result in loss of recorded video, as during this period the data is recorded in the Local storage space within the server hardware. As soon as the Central storage is available for accessing, the video from the local storage is transferred to the Central storage automatically without any user interaction. However, while transferring video to NAS/SAN, a good amount of network bandwidth is consumed if the number of video channels (camera etc) is high. Therefore, the video transfer to NAS/SAN introduces a peak bandwidth requirement which may not be available in the network interface of the server, and therefore, may affect the QOS desired by the Surveillance clients for live view, as the Video Recording Server also serves as the Video Streamer to the Video Surveillance Clients. Further, this activity of uploading video to NAS/SAN may also disrupt the activity of grabbing the video from the cameras due to bandwidth throttling, which is not permissible at all.

An intelligent way of transferring video data from the Server to the NAS/SAN is therefore proposed. The server monitors the available total network bandwidth and per channel video inflow rate, and decides the rate of per channel video transfer from the server (local storage) to the NAS/SAN. For this purpose the Video from the cameras are recorded in the form of variable length (typically 2 to 5 minutes) video clips. The clip duration may be set by the user or it can be decided by the server itself. The video clips are then uploaded to the Central storage (NAS/SAN).

Thus the advancement is directed to use optimal bit rate for uploading video. The average bit rate for each channel is calculated separately in periodic intervals. For that, the video streaming rate ($D_i$) of a particular camera ($C_i$) camera to the server is estimated. Also the available network bandwidth (B) at that instant is known from the System. The frequency of Clip upload for channel, $C_i$ is then calculated as:

$$U_i = [B \times k \div \Sigma D_i] \times D_i,$$

where 0<k<1, depending on how much of the remaining bandwidth is to be allocated for video uploading task.

Hence, the rate of uploading the clips to the NAS/SAN is varied dynamically so that the effective average bit rate of video upload to the Central Storage for a particular channel is controlled based on the availability of Network Bandwidth and the actual optimal rate so that the requirement of local storage space stays within acceptable limits and the system comes to equilibrium.

Reference is now invited to accompanying FIGS. 9 to 12 which illustrate the fail safe mechanism for sensory data such as video recording and live view streaming in a multi-server, multi-camera system in accordance with the present invention.

Figure 9:
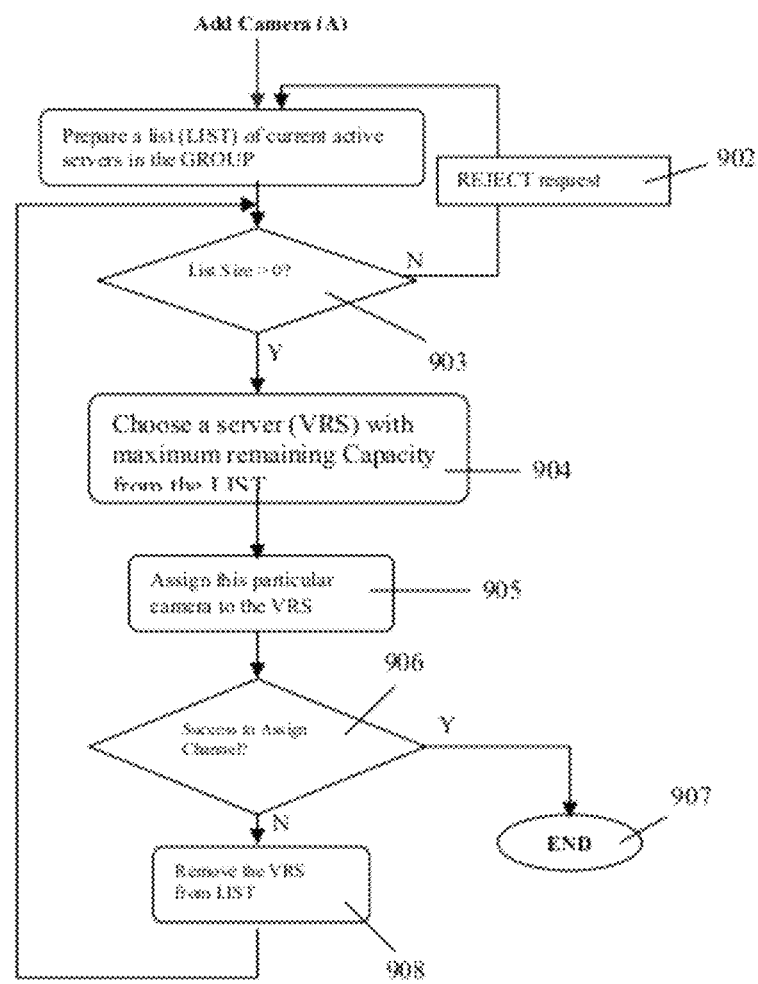
FIG. 9. Is an illustration exemplifying the manner of adding a camera (ALLOCATE) to a GROUP of recording servers in accordance with the present invention.

In FIG. 9 the manner of adding a camera (ALLOCATE) to a GROUP of recording servers is shown by way of components/features 901 to 908.

Figure 10:
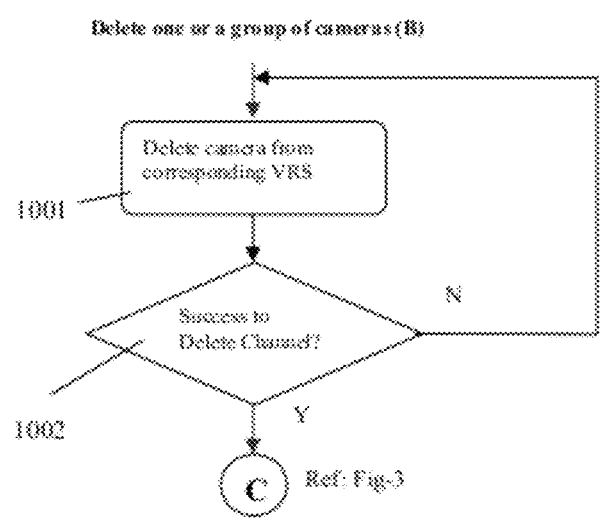
FIG. 10: is an illustration of load balancing when an existing camera is deleted from a GROUP in accordance with the present invention.

In FIG. 10 the manner of load balancing when an existing camera is deleted from a GROUP is shown by way of components/features 1001 to 1002.

Figure 11:
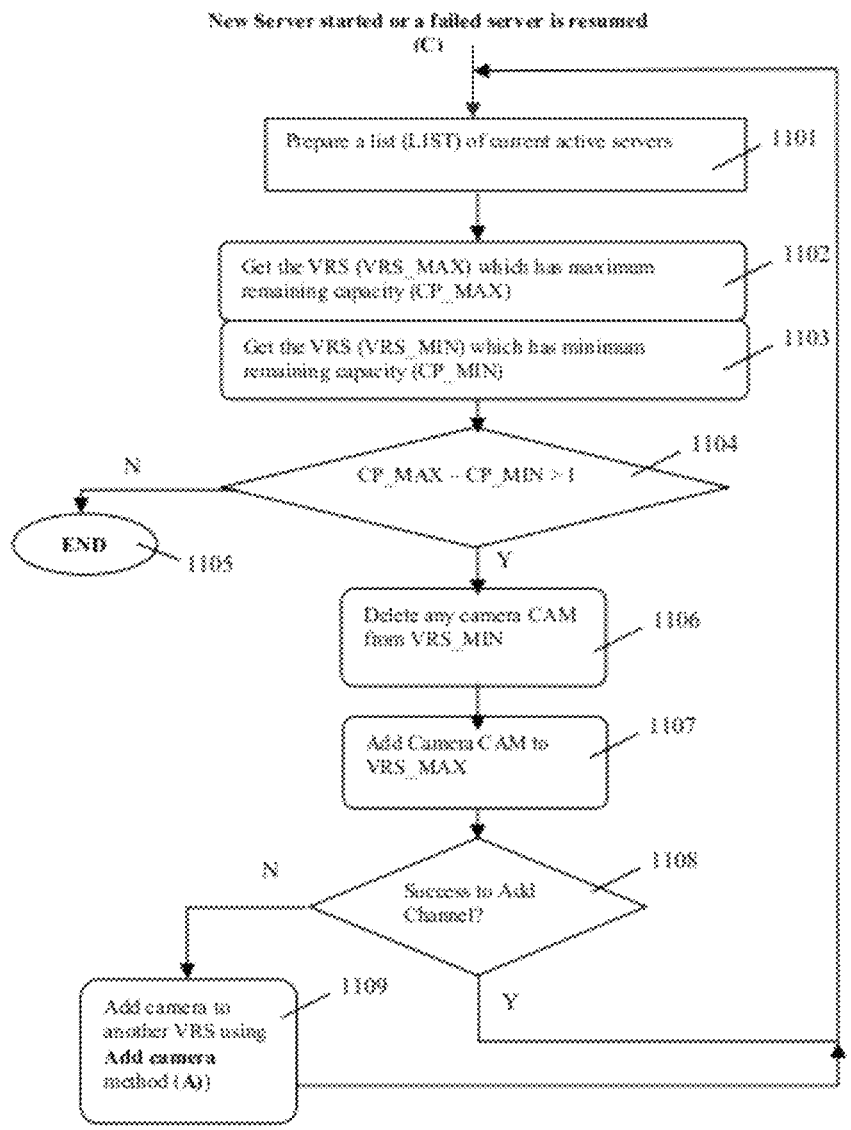
FIG. 11: is an illustration of the load balancing when a new recording server is added in accordance with the present invention.

In FIG. 11 the manner of load balancing when a new recording server is added is illustrated by way of components/features 1101 to 1109.

Figure 12:
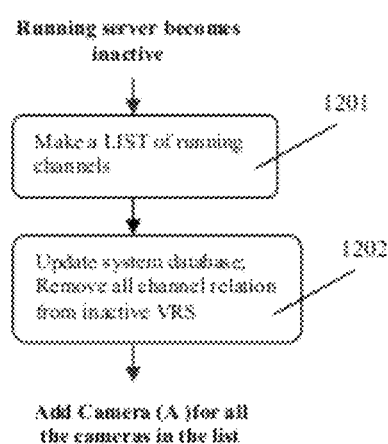
FIG. 12: is an illustration of the method of ALLOCATION when a running server stops operation.

In FIG. 12 the manner of ALLOCATE method when a running server stops operation is shown by way of components/features 1201 to 1202.

What is disclosed is a fail-safe architecture for recording video in a multi-camera Video Management system, a novel technique for estimating server capability for load balancing, automatic uniform distribution of video recording load across all the active servers, auto-registration of recording servers when they are active in the network, use of multiple distributed NAS/SAN storage devices, automatic back up of recorded video in the server local storage space in case of failure of the central storage, automatic upload of the video files to the central storage once the storage system is recovered from failure, video streaming to the clients without passing the video through any central hardware and thus avoiding single point of failure, automatic camera add and release operation on new server addition in the system and in case of server failure, without any manual intervention. The recording system thus constituted using multiple servers is highly scalable with respect to increase or decrease in the number of cameras, tolerant to intermittent or permanent failure of one or more servers or one or more storage devices.

Video Management System using IP enabled video capturing devices (Cameras, etc) has become an integral part of Surveillance industry today. A basic requirement of this type of systems is to input compressed video streams from multiple cameras and record the video in storage devices. In the earlier days when DVR and then NVR were predominant components, the complexity and hence the challenges for efficient deployment of the system were less. This is because each DVR or NVR was a standalone system taking feed from a handful of cameras (typically 16 or 32), and used their dedicated local storage devices to record the video. However, when the number of cameras started to increase beyond 100, and typically to a few hundreds, and the users demanded a unified system to record, view and search video from these hundreds of cameras efficiently, Video Management System emerged as a solution. In a typical Video Management System there are multiple servers, each catering a set of Video Capture devices (e.g., Cameras), one or more network accessible RAID configured storage devices, and multiple workstations. Each server now needs to handle 64 or more cameras, stream the video from the cameras to the client machines. Traditionally, the servers are grouped into one or more clusters and one or more redundant servers are kept as standby per cluster so that they can back up the functionalities of the failed server(s). This has the disadvantage of non-optimal use of the server resources, both under normal scenario as well as when one or more servers fail. To back up against server failures, one or more dedicated fail-over (sometimes called mirror) servers are often deployed in prior art. Dedicated fail-over servers remain unused during normal operations and hence resulting in wastage of such costly resources. Also, a central server process either installed in the failover server or in a central server is required to initiate the back-up service, in case a server stops operating. This strategy does not avoid a single point of failure.

A present invention thus proposes a fail-safe mechanism without a central server and support from any dedicated failover or mirror server. Instead of allocating a particular data source (e.g., a camera and other sensors) to a particular server for recording of data (e.g, video or other data types), it is allocated to a 'Server group' with multiple servers in the group. The members of the group continuously and mutually exchange their capacity information amongst themselves and automatically share the load according to their capacity. In case of breakdown of one or more servers, the team members automatically detect it and share the load of the failed server(s), without any central control or without support from any fail-over or mirror server. This eliminates the need for costly failover or mirror server and the load is always evenly distributed as per the capacity of the individual server hardware. This is a clear advancement in the related art. This can be implemented as an example of cooperative social networking implemented in machine level.

Detailed description: A recording server, when introduced in the system, announces its presence and auto-registers itself to the Video Management Server. A database entry is created with the Server ID. The server gets the list of network accessible storage devices (typically NAS or SAN) from the database and is thus prepared to record data once one or more data sources (viz, cameras) are added to the server. The recording is done by breaking up the video stream into chunks or clips of small duration (typically 2 to 5 minutes), and the clips are initially stored in the local server storage space. Periodically, the clips are uploaded to the NAS/SAN using all the NAS/SAN in a round robin fashion.

The administrator of the system can form several "Server groups" by first forming a GROUP and then assigning any server to that GROUP. Otherwise, all servers are assigned to the DEFAULT group. As soon a server registers itself, it starts multicasting a message describing its IP-address, group-ID and remaining capacity to handle more cameras. The capacity is represented with a number. The number is calculated based on the memory, bandwidth and current processor utilization within the server, or it can be set by the administrator to be equal to the number of cameras the server should handle, and the number is decremented or incremented when a camera is added or removed from the server, respectively.

The Video Management Server and all other recording servers within the GROUP listens to all such messages and maintains a list (LIST), as described below [taking example for 4 Video Recording Servers (VRSes)]

| VRS | IP | Remaining Capacity |
|---|---|---|
| 1 | 192.168.1.42 | 10 |
| 2 | 192.168.1.43 | 8 |
| 3 | 192.168.1.44 | 9 |
| 4 | 192.168.1.41 | 25 |

Whenever a new server is introduced in a GROUP and starts announcing its capacity, other servers enter into a contention avoidance session to decide who will be the GROUP MASTER. Once the GROUP MASTER is elected, it consults the table above, and balance the load amongst the servers by RELEASE and ALLOCATE operations. RELEASE takes a camera away from the server, while ALLOCATE assigns a camera to the server. This task of RELEASE and ALLOCATE is taken up by the GROUP MASTER for the following cases which are discussed in relation to FIGS. 9 to 12:
 1. When a new camera is added to the system (FIG. 9)
 2. When an existing camera is deleted from the system (FIG. 10)
 3. When a new recording Server is added to the system, or a failed server has started operation again (FIG. 11)
 4. When a running server has gone down (FIG. 12)

Reference is now invited to accompanying FIGS. 13 to 16 which detail the intelligent scene adaptive colour coherent object analysis framework and method.

Figure 13:
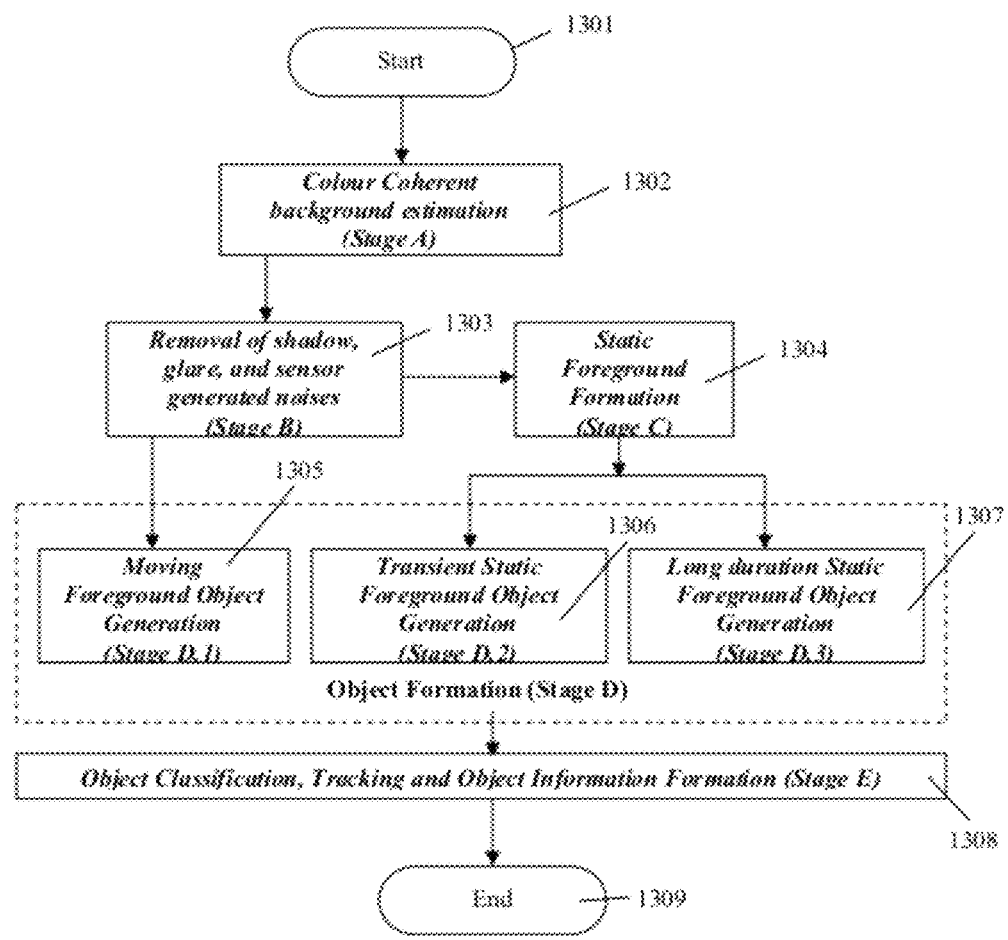
FIG. 13: is an illustration of a top level flow diagram of the intelligent colour object (moving, static, transient) analysis in accordance with the present invention.

In FIG. 13 a top level flow diagram of the intelligent colour object (moving, static, transient) analysis is shown by way of components/features 1301 to 1309.

Figure 14:
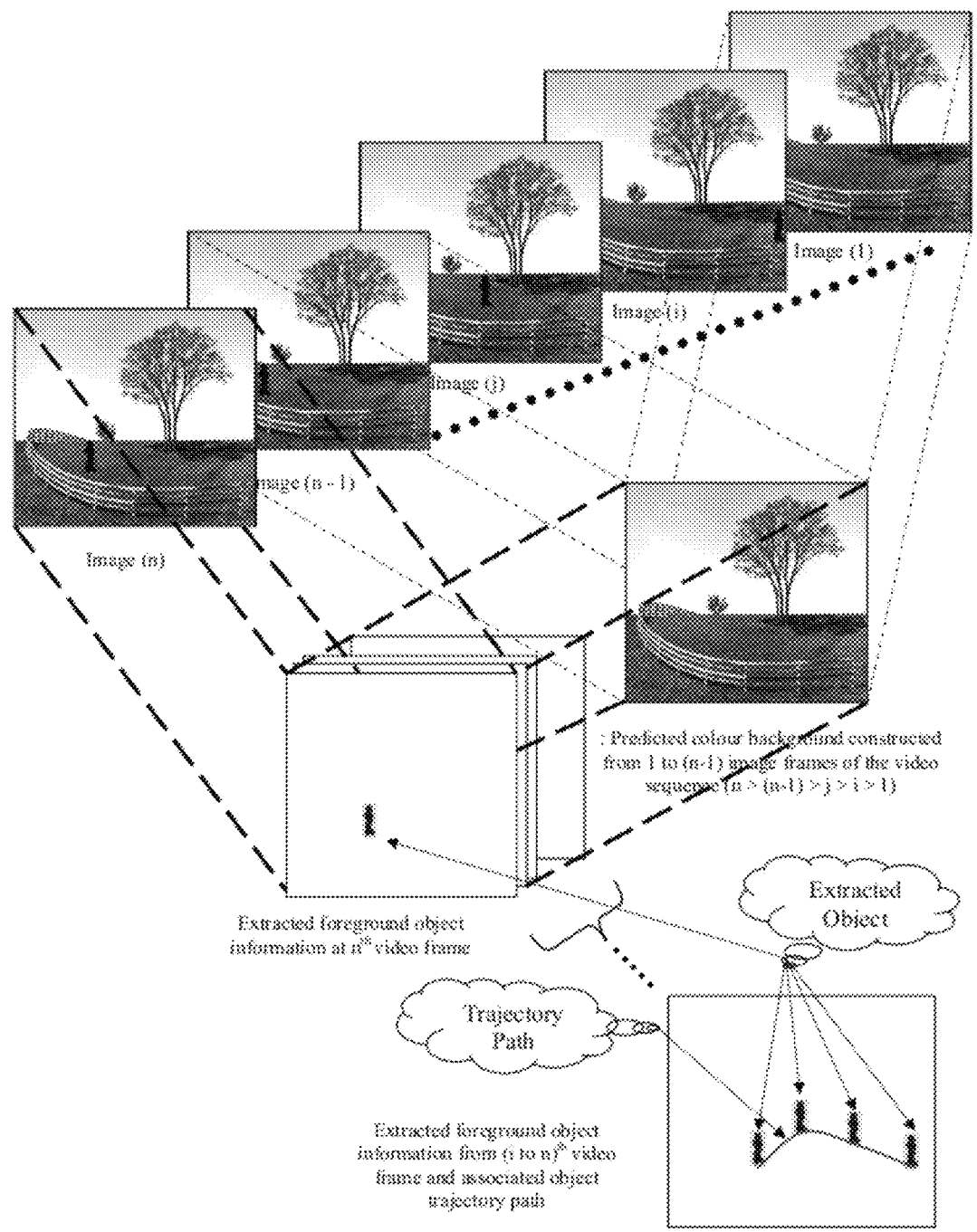
FIG. 14: is an exemplary illustration of the object analysis stages with pictorial description in accordance with the present invention.

In FIG. 14 an example of the object analysis stages with pictorial; description is illustrated.

Figure 15:
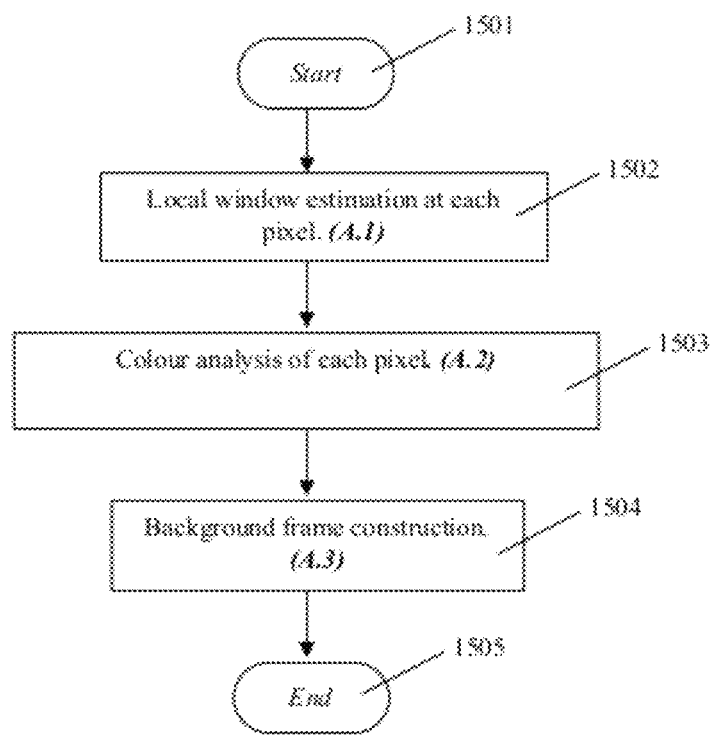
FIG. 15: is an illustration of a process flow diagram for unified computationally adaptive colour appearance correlation based predictive background estimation in accordance with the present invention.

In FIG. 15 there is illustrated a process flow diagram for unified computationally adaptive colour appearance correlation based predictive background estimation by way of components/features/stages 1501 to 1505.

Figure 16:
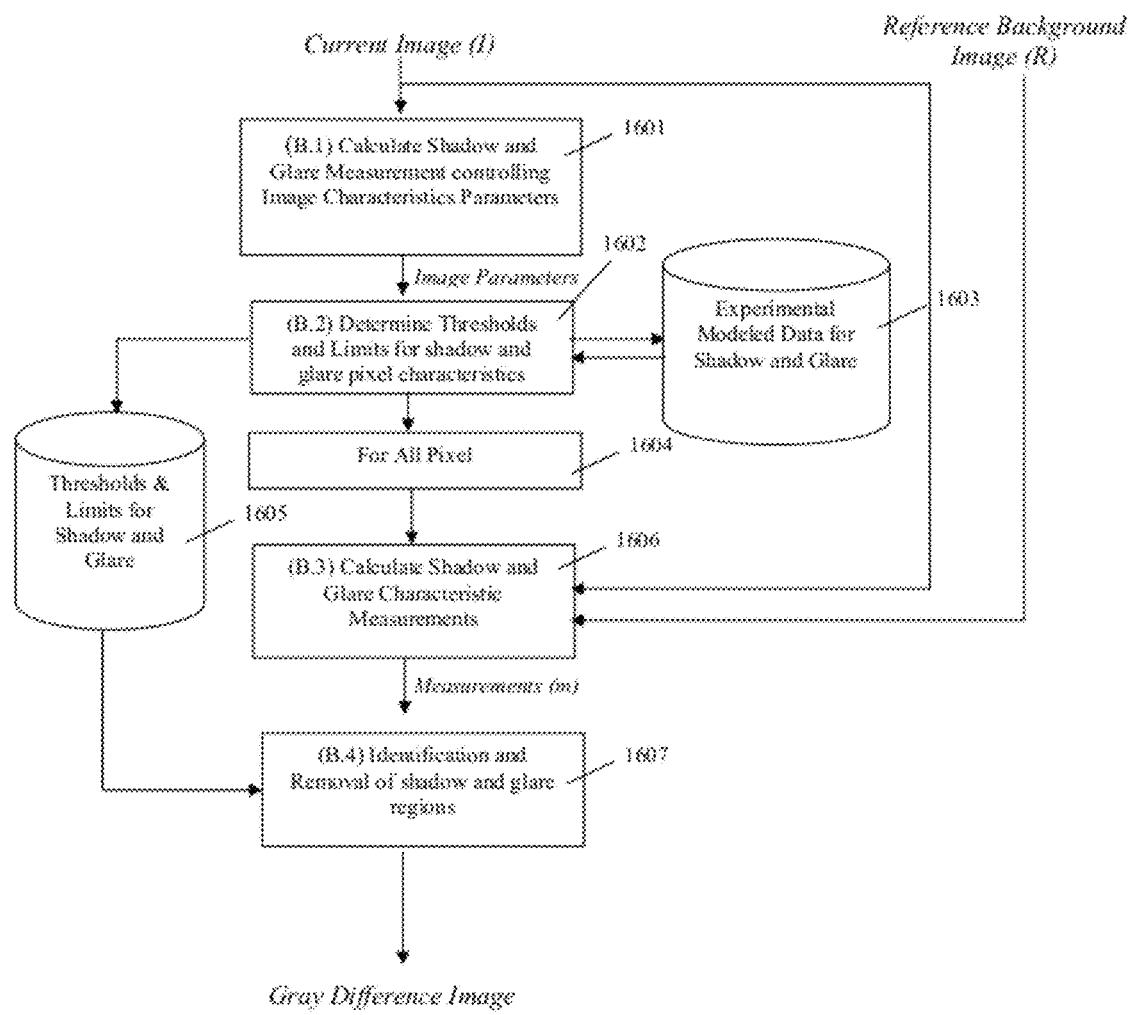
FIG. 16: is an illustration of the manner of identification and removal of shadow and glare regions in accordance with the present invention.

In FIG. 16 there is illustrated the manner of removal of shadow and glare regions by way of components/features/stages 1601 to 1607.

Automatic separation of foreground moving objects from the static background in an image sequence (video) is the primary task for subsequent analysis of video. These separated moving objects are the keys for any development on video analytics application. Efficient execution of this task using colour video data that represents a dynamic scene is challenging and is of immense interest to the experts in the domain of intelligent machine vision technology and related applications.

Foreground object extraction in a video is a primary requirement and several basic technologies are adopted by the experts in image processing and computer vision. Foreground object extraction can be treated as a background subtraction problem. That is in a video, foreground objects can be detected simply by subtracting the current image from a background image of the scene. This background image needs to be determined beforehand. Several approaches have been proposed to estimate the background from a video sequence in literatures. However, if the background is consistently affected by shadow, glare, time varying noises, effect of lighting variation on colour, background estimation becomes a very challenging task especially in outdoor environment when different seasonal environment is always a concern. The goal of foreground object extraction is to divide an image into its constituent regions which are sets of connected pixels or objects, so that each region itself will be homogeneous with respect to the different physical objects whereas different regions will be heterogeneous with each other. The foreground object extraction accuracy may determine the eventual success or failure of many sub-sequent techniques for video analytics and object recognition, and object based different event-detection. All the techniques in the prior art did not consider the colour components in a pixel as a single unit of metrics, rather each colour component has been considered in isolation without considering their correlation both in spatial and temporal direction. As a result, the prior art suffered from imperfect generation of blobs incoherent with the actual size, shape, feature of the original object distinguishable by human eyes.

In addition to estimation of proper background scene, another key challenge is to handle the shadows and glares during foreground extraction process so that the objects can be detected accurately. Due to obvious presence of the natural phenomenon such as shadow and glare, appearance of the objects in the scene becomes distorted. As a result, the extracted foreground objects associated with the shadow and glare do not give the proper information about object features like position, size, shape, contour etc. and any sub-sequent techniques dependent on these object features bound to fail.

In a real scenario, nature of the shadow and glare can be static, moving or both. Static or very slowly moving shadow and glare can be modelled by some background estimation techniques. But moving shadows and glares that are associated with moving objects are hard to model and eliminate from being detected. Hence effective identification of shadow and glare regions and elimination of those regions from actual foreground objects remain to be challenging and important for any video analytic applications.

Traditionally, shadow and glare are detected using fixed thresholding methods where a set of fixed and trained thresholds are used to detect the shadow and glare regions. Mostly these fixed thresholds are derived by observing the variation of pixel intensity over video frames due to presence of shadow and glare in a specific type of scene, so their applicability is limited to that type of scene only. Some techniques improve the fixed thresholding approach by introducing an estimation of shadow and glare thresholds to make them adaptive, but till either they are very specific to type of the scene or they require a lot of computations. Another type of shadow detection approaches applies scene knowledge based object-wise shadow regions identification. These approaches use a scene knowledge (e.g. difference of shape, size, colour etc. between objects associated with shadow and without any shadow) about the appearance of shadows in the scene and apply that knowledge to identify and distinguish the shadow regions from the associated objects. However, accuracy of the said techniques is low when applied in real-life scenario where one scene varies widely with respect to other scene, and also with respect to time.

Detection of static objects in a scene and distinguishing the objects from the background is a challenging task. The features of static object pixels tend to be similar to those of background pixels and likely to be part of background. Hence any single traditional background estimation technique is unable to distinguish the static foreground pixels from the background pixels. Instead of pixels, another approach tracks position of the objects to detect the possible static objects in a scene. In a noisy scene where position and shape of the objects vary a lot, it becomes very hard to find the static objects properly. The problem becomes even worse when temporary occlusion of the objects happen in the scene. Therefore, this object tracking based approach is very error prone in real environment.

After the moving objects are detected in the scene, they are tracked to link in image sequence and to predict the next movement. The tracking is usually done in each of the image data. By tracking and analysing the tracked results using an error minimising prediction mechanism different types of event of interest can be detected. This is what is called video analytics applications in general.

In the present method as reflecting from the accompanying FIGS. 13 to 16 the following are addressed:
  i. To provide an intelligent and adaptive framework for improved colour object detection method which can eliminate the defects encountered in the prior state-of-art irrespective of any video noises like shadow, glare, colour changes due to varying illumination, and effect of lighting condition on colour appearance, electronics generated induced noises (e.g. shot noise, but not limited to) and other type of noises sensitive to human vision system.
  ii. More specifically, it is a sequence of processes of the presented method which provides more accurate information of colour objects in an image taken from any video sequence by low cost cameras. Any sequential video images can be processed with this method to locate all possible detectable colour objects and their related information which can be further be processed to analyze the scene dynamics with respect to the object itself and in association with other foreground objects. The extracted information can be used to measure any statistical information regarding the object or association of the colour object with any other animate or inanimate colour objects in the scene.
  iii. The proposed method provides improved colour background information by eliminating the defects encountered in the prior state-of-art in presence of video noises like spatial movement of non-meaningful objects, change of appearance of colour due to presence of shadow, change of appearance of the colour in the object when it moves to a low intensity (darker) region from a higher intensity (brighter) region and vice versa.
  iv. The technique is also adaptive when the colour appearance of the foreground objects and background of the scene changes frame to frame due to change in global intensity or other phenomena such flickering, sensitivity of the sensor in the camera, etc.

The proposed object analysis technique is also capable of detecting and characterizing static objects along side with colour moving objects in the same scene by a novel unified framework based on multi-layer estimation technique. Instead of tracking the position of the objects to locate the static objects, it estimates the possible foreground object pixels that may belong to any static object in the scene and then generates static objects from detected static pixels.

The proposed multi-layer static foreground pixel estimation technique overcomes the inability of any traditional background estimation technique to distinguish the background pixels from the foreground pixels that remain static for a long duration. The multi-layer approach also gives much more control over the process of distinguishing the static foreground pixels from the background.

The present invention thus also discloses advancement in the process and an intelligent unified framework for colour object analysis in a scene in order to develop efficient video analytics applications and other intelligent machine vision technologies. The overall framework comprises of several novel approaches to develop underlying tasks to accomplish this.

One such task is an adaptive process for accurate and predictive technique for colour coherent background estimation. The technique relies on colour correlation of neighboring pixels and inter-frame colour correlation under severe natural conditions such as shadow, glare, colour changes due to varying illumination, and effect of lighting condition on colour appearance, electronics generated induced noises (e.g. shot noise, but not limited to). The developed technique is adaptive to the content in the scene and their features such as colour variation, complexity of the scene, motion activity, as well as naturally induced noise in the scene.

Because of the adaptive nature of the proposed technique, it can handle minor vibration in the scene because of vibration of the camera.

As a result, it was possible to extract more accurate object shape, contour, and other features to accurately characterize, classify, track the detected objects and correlate the objects to identify different events in a scene.

Rather than analyzing each primary colour component (red, green, or blue) independently without considering the ratio of these components in a colour pixel and their effect in colour formation and appearance, the underlying philosophy of the proposed method is to use the red, green, and blue components as a composite data and use the relative values of these components to maintain accurate colour information and appearance of the true colour in the estimated background frame. It should be noted that we have exemplified the present invention in terms of Red-Green-Blue colour space. But the underlying philosophy is not restricted to this particular colour space only. Variation of the concept can be adopted in other colour spaces as well.

The present invention also disclose a method of distinguishing and eliminating shadow and glare regions from video frames to minimize erroneous foreground estimation in order to reduce unnecessary false alerts due to wrongly interpreted events using wrongly detected objects in a video analytic application. It is achieved using image characteristics driven adaptive and dynamic threshold generation technique. The technique requires very low computation due to use of a look up table that characterizes shadow and glare in various environments. The outcome of this technique is a set of accurate foreground pixels that are grouped together to construct foreground objects in the scene. These objects are further characterized, classified, and tracked to detect meaningful events in the scene.

In addition to the moving colour objects in the scene, we also detect and characterize static objects in the same scene by this novel unified framework based on multi-layer estimation technique. Here, definition of "Static" pertains to an object's spatio-temporal relationship during a certain period of time. The proposed technique gives much more control over the process of distinguishing the static object pixels from the background pixels.

The two-level (multi-level) hierarchical estimation technique described in this document is novel and gives the benefit of detection and analysis of not only moving objects in the scene, it also detects the static objects for small duration as well as static objects for long duration. As a result, it is possible to achieve more accurate object extraction result without consuming a static object in the scene to become part of the background for a long duration of time.

The present invention enable characterize, classify and generate some basic information of these detected static and moving objects such as their position, size, type, temporal information such as when it first appeared in the scene, duration of appearance in the scene, whether it is occluded, and if so the duration of occlusion, etc. Using this information, we can infer certain activities or events in the scene using a rule-engine applying different logic depending upon desired video analytics applications.

In the framework described in FIG. 13, first estimate the background of the scene using a unified colour coherent statistical pixel processing technique (Stage A). A novel technique for removal of shadow and glare from the scene (Stage B) is proposed. In addition to removal of shadow and glare, the proposed method also removes electronics induced different type of noises prevalent in any electronic sensor based camera, as well as handles small vibration of cameras. Then characterize the pixels in the foreground regions and extract both moving and static objects (Stages C and D). Static objects can be of two types—(1) a new static object appeared in the scene and remained static for long duration of time so that it does not become part of the background due to non-movement for a while, (2) objects nearly static with very small movement but not part of the background either. These three types of objects are characterized, classified in terms of type object such as human, inanimate non-human, vehicle, artifacts, etc. The objects are then tracked individually and certain information is generated to be used by a rule-engine for intelligent video analytics applications (Stage E).

A representative example of the stages of above intelligent colour object analysis framework is shown with a pictorial description in FIG. 14

Stage A (Colour Coherent Background Estimation):

The invention involves a unique method for stage A by adapting the computational steps based on the variation of light intensity and its effect in colour appearance in each image region or image pixel rather than using same computation blindly in all the pixels across the scene as in prior art. In the prior art, each colour plane is processed independently without keeping into consideration of the relation between three primary colour components red (R), green (G) and blue (B). We used R,G,B components as a composite single structure in a unified manner to preserve the mutual relationship of these colour components in each individual pixel in order to maintain true colour appearance in the estimated colour background frame. The framework continuously readjusts its modelled or predicted values for each colour pixel in a frame with all sequential forthcoming frames of the colour video. During the background estimation, it also correlates spatial distribution of the colour values in a local region to model the pixel background colour value more accurately. For each pixel (x, y) in the input colour frame below given steps are followed, if that pixel doesn't belongs to the any detected object region in the previous colour frame of the video sequence. Flow-chart of stage A is shown below.

FIG. 15: Process Flow diagram for unified computationally adaptive colour appearance correlation based predictive background estimation If the pixel location in the current frame belongs to a object pixel in the previous frame, the present process skip estimation of the colour background in that pixel location since this pixel colour does not contribute to the background. Otherwise, we compute an adaptive size (k*h, k*w) local window centering around this pixel for computation of the background estimation using the colour pixel values within this window, where $$k = \frac{Avg(h, w)}{255}$$

representing normalized average intensity of all the pixels in window size (h, w). for all 0<k<1, the processing window size reduces with the reduction of intensity in the region surrounding the pixel.

It should be noted that the number of distinct colour appearance reduces with the reduction of image intensity in a region. Hence above adaptive window selection technique minimizes propagation of the error in the possible prediction and estimation of colour appearance in the pixel. It also requires significant low computation in low light level image regions as opposed to non-adaptive nature of the prior art. This is new and novel.

All the colours in above window are accumulated in different colour clusters depending on their distinguishability criteria of colour appearance as follows so that each colour cluster k consist of a mean representative colour pixel value $(\mu_R, \mu_G, \mu_B)_k$ with span of colour deviation $(\sigma_R, \sigma_G, \sigma_B)_k$ and a number of appearance $(v_k)$ of a colour pixel in this cluster.

A colour pixel (R,G,B) is matched with the colour cluster k, if the difference between each colour component in pixel (R,G,B) with the corresponding representative colour component $(\mu_R, \mu_G, \mu_B)_k$ of cluster k, i.e. $|\mu_R-R|<\sigma_R$, $|\mu_G-G|<\sigma_G$, and $|\mu_B-B|<\sigma_B$.

If colour of any pixel in frame $F_m$ matches with a cluster derived up to the previous frame $F_{m-1}$, then readjust the span of the deviation of the colour cluster $(\sigma_R, \sigma_G, \sigma_B)_k$ and the mean representative colour value $(\mu_R, \mu_G, \mu_B)_k$ as $\sigma_R^m = C*\sigma_R^{m-1}+(1-C)*|\mu_R^{m-1}-R|$, $\sigma_G^m = C*\sigma_G^{m-1}+(1-C)*|\mu_G^{m-1}-R|$ and $\sigma_B^m = C*\sigma_B^{m-1}+(1-C)*|\mu_B^{m-1}-R|$ $\mu_R^m = D*\mu_R^{m-1}+(1-D)*R$, $\mu_G^m = D*\mu_G^{m-1}+(1-D)*G$ and $\mu_B^m = D*\mu_B^{m-1}+(1-D)*B$ Where C and D are experimentally driven fractions for the recurrence relation. The total number of occurrence of the pixel in cluster k is also adjusted as $v_k^m = v_k^{m-1}+1$.

If the colour of the pixel is not matched with any cluster with above criteria, then we create a new colour cluster with mean value (R,G,B) and default chosen allowed threshold for deviation $(\sigma_{Th}, \sigma_{Th}, \sigma_{Th})$ and number of occurrence $v=1$ Split the colour cluster (p) which have a large $(\sigma_R, \sigma_G, \sigma_B)_p$ value and Merge all the colour cluster which have very close mean representative value. The probability of occurrence then adjusted in the same ratio of the estimated colour clusters for that population.

This colour coherent splitting and merger of clusters for finer granular colour matching is an advancement under the present invention. It should be noted that the number of distinct colour clusters increases with increase of global illumination in the scene. With the proposed intuitive approach according to the invention it is possible to accurately compute the mean colour value of any cluster consuming very less computation opposed to any known prior state-of-art.

The colour background reference frame is constructed from representative colour values of the generated clusters. If matched colour cluster has significantly high occurrence relative to the overall population occurrence then the representative colour of the colour cluster is used as the value of the colour pixel in the colour background reference frame.

Stage B (Removal of Shadow, Glare, and Sensor Generated Noises):

Change of intensity of pixels due to presence of shadow, glare, sensor generated noise (such as shot noise, etc.) in natural scenes have been studied and we found they follow interesting patterns. We have taken some intensity measurements which are very useful to measure such changes in pixel intensity because of shadow and glare. These measurements include measuring amount of maximum flickering and minimum flickering, total amount of flicking, ratio of each colour plane, maximum ratio, maximum differences of all ratios etc. By thorough observation and experimentation, it has found that these intensity measurements vary within some limits. It is also found that these measures are very much dependent on region of focus, sharpness of the image, colour content, activity in the scene, and scene dynamics. We modelled the shadow and glare characteristics by observing changes in these measures. These thresholds need to be adaptive and dynamically also need to be generated depending on scene environment. A way to model the scene environment is to express the scene environment in terms of some image characteristics parameters and then model those parameters. These image characteristics parameters are like illumination, sharpness etc. as shown in FIG. 16.

An advanced approach has been presented here to remove shadow and glare in background and foreground segmentation process for dynamic scenes using image characteristics based adaptive thresholds. It has been observed that it removes various sensor generated noises as a by-product of the approach that we adopted.

Image Characteristics Parameters Calculation:

As mentioned earlier, the change of intensity of pixels due to presence of shadow and glare is dependent on region of focus, sharpness of the image, colour content, activity in the scene, and scene dynamics. We compute two image parameters (1) median intensity (I) of the image, (2) a sharpness parameter (S) of the image, the ratio V=I/S, to represent the characteristic of the scene. The sharpness parameter of the image is computed as follows:

Every row of the input frame is filtered with a high pass filter. The average of the filtered values of the overall image is considered as horizontal sharpness parameter $S_H$.

Every column of the input frame is filtered with the same high pass filter. The average of the filtered values of the overall filtered image is considered as vertical sharpness parameter $S_V$.

Maximum of $S_H$ and $S_V$ is the sharpness parameter (S) of the image

The ratio V=I/S is used to characterize the scene.

Adaptive threshold calculation from Image Parameters (p) using LUT

We have experimentally computed a LUT to define the thresholds of various shadow and glare parameters as shown in Table—1. Depending upon the value of computed V in every frame, we enumerate threshold value (Th) for each of these parameters using a LUT. For example, the threshold is selected from the LUT using a linear equation as $$Th = \frac{Th_1 - Th_2}{V_1 - V_2}(V - V_1) + Th_1$$

However, we can use a non-linear equation as well depending upon scene content.

Measurement of Change of Pixel's Characteristics:

For each pixel in every colour channel of the image, we compute the following measurements $$dI(x, y) = I(x, y) - R(x, y),$$

$$\text{ratio}(x, y) = \frac{I(x, y)}{R(x, y)},$$

$$f(x, y) = \frac{dI(x, y)}{I(x, y) + R(x, y)},$$

where I(x,y) and R(x,y) are the input pixel value and reference background pixel value in a colour plane. Using these values for each channel, we compute the image characteristic measurements as mentioned in Table 1 (e.g. maximum intensity difference, maximum ratio, maximum and minimum flickering, total flickering (f), etc.) for all colour channels.

B.1. Identification and Removal of Shadow and Glare:

As image characteristic measurements (from B.2) and their thresholds (from B.1) for shadow and glare are available, the shadow and glare pixels are identified by comparing these measurements with the corresponding thresholds for each pixel of the image. Once shadow and glare pixels are identified, any contribution of those pixels in the final gray difference image is nullified by setting zero to those pixels in gray difference image. For rest of the image pixels in the image (i.e. other than shadow and glare pixels), maximum intensity difference value is put in gray difference image for respective position.

The fringe benefit of application of stage B is it also handles and filters out sensor generated noises inherent in any electronic circuit system, shot noise due to rise of temperature of the sensor, as an example.

Another fringe benefit of application Stage B is that it also handles small natural vibration of the scene due to vibration of the camera.

TABLE 1

| Measurement Name | $V_1$ | $V_2$ | $Th_1$ | $Th_2$ |
|---|---|---|---|---|
| FOR SHADOW | | | | |
| (1) Minimum Flickering | 0.45 | 0.20 | −0.5 | −0.25 |
| (2) Maximum Flickering | x | x | 0 | 0 |
| (3) Maximum Ratio Difference | x | x | 0.1 | 0.1 |
| FOR GLARE | | | | |
| (1) Minimum Flickering | 0.45 | 0.20 | −0.2 | −0.15 |
| (2) Maximum Flickering | 0.45 | 0.20 | 0.2 | 0.15 |
| (3a) Total Flickering Condition: (V < 0.2 and I > 85) | x | x | 0.1 | 0.1 |
| (3b) Total Flickering Otherwise | x | x | 1.0 | 1.0 |
| (4) Maximum Ratio | 0.45 | 0.20 | 0.1 | 0.8 |
| (5) Maximum Ratio Difference | x | x | 0.25 | 0.25 |
| (6) Total Ratio Difference | x | x | 0.5 | 0.5 |

[NOTE:
'x': indicates thresholds (Th) are independent of the calculated values (V) and possess a fixed quantity which may be a single value or a range.

Stage C (Static Foreground Formation):

The proposed estimation process is computed to estimate static foreground pixels. By 'static foreground pixel" we mean the pixels which has been found not belonging to the background of the scene, but the characteristics show they possibly belong to a foreground object which has no meaningful motion during last few frames, e.g. an inanimate static object which has been introduced to the scene in last few frames. Here a new concept of "foreground modeling" technique has been applied. and its readjust procedure is done by a selective method. Working principle of this "foreground modeling" technique is similar to the previously described "colour background estimation technique" that has been computed and described in stage A. However the occurrence parameter (v) of the modelled colour clusters is continuously reduced forcefully in the estimation process for all the pixels belonging to regions where no foreground has been formed for a certain interval of time (i.e., in last few frames). First we identify the pixel-regions where no foreground is formed for a short interval by analyzing the history of occurrence of foreground regions in last few frames within certain duration. These regions represent constantly visible background in the scene for a short interval, i.e, there is no movement of the foreground object pixels during last few frame forming a static object.

This two-level (multi-level) hierarchical estimation technique is novel and gives the benefit of detection and analysis of not only moving objects in the scene, it also detects the static objects for small duration as well as static objects for long duration. As a result, we achieve more accurate object extraction result without consuming a static object in the scene to become part of the background for a long duration of time.

Stage D and E

Detected foreground regions (as described in the above stages) are now segmented using suitable image processing based object clustering methods and morphological techniques. Each captured foreground component then individually analyzed for their classification purpose. Using typical object shape, silhouette, colour feature, they are categorized into different predefined modelled object(s) for any typical scene. In particular scene like indoor house or building, detected objects are categorized into human and non-human sets; scenes like road segment in any road junction or free highway detected objects are categorized into vehicle, pedestrian; this detected objects were finally associated with previously detected object set of the scene using inter frame overlapping and colour feature based analysis for more generalized information of those objects in the video. The generated object information then transferred to different rule engines for their comparison with different application based pre-determined rules to identify occurrences of any predefined event (s).

Figure 17:
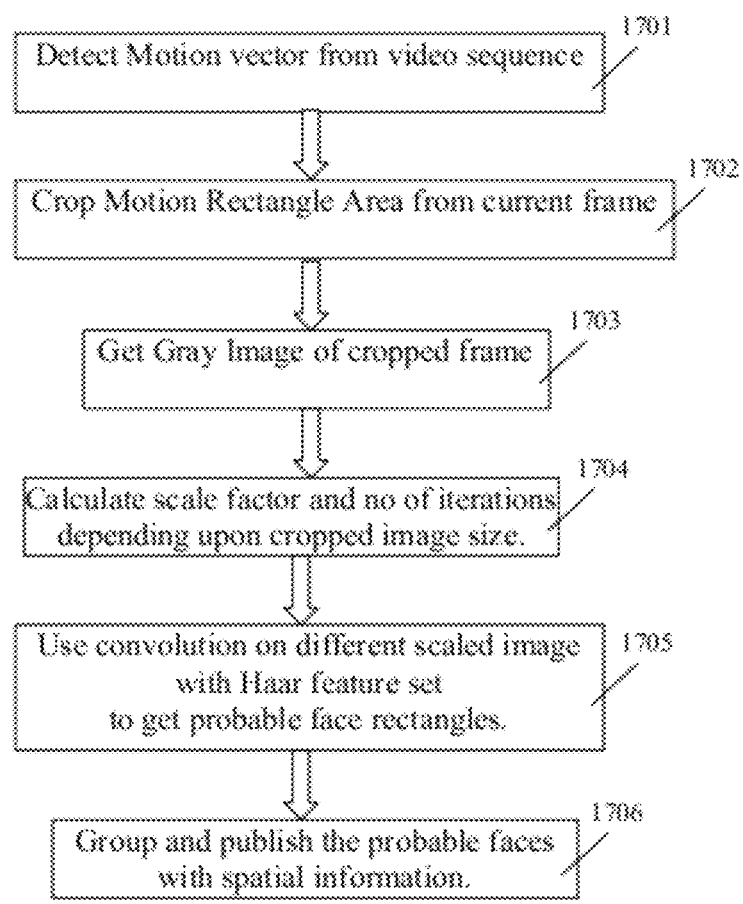
FIG. 17: is an illustration of a conventional process of identification of faces with spatial information.
Figure 18:
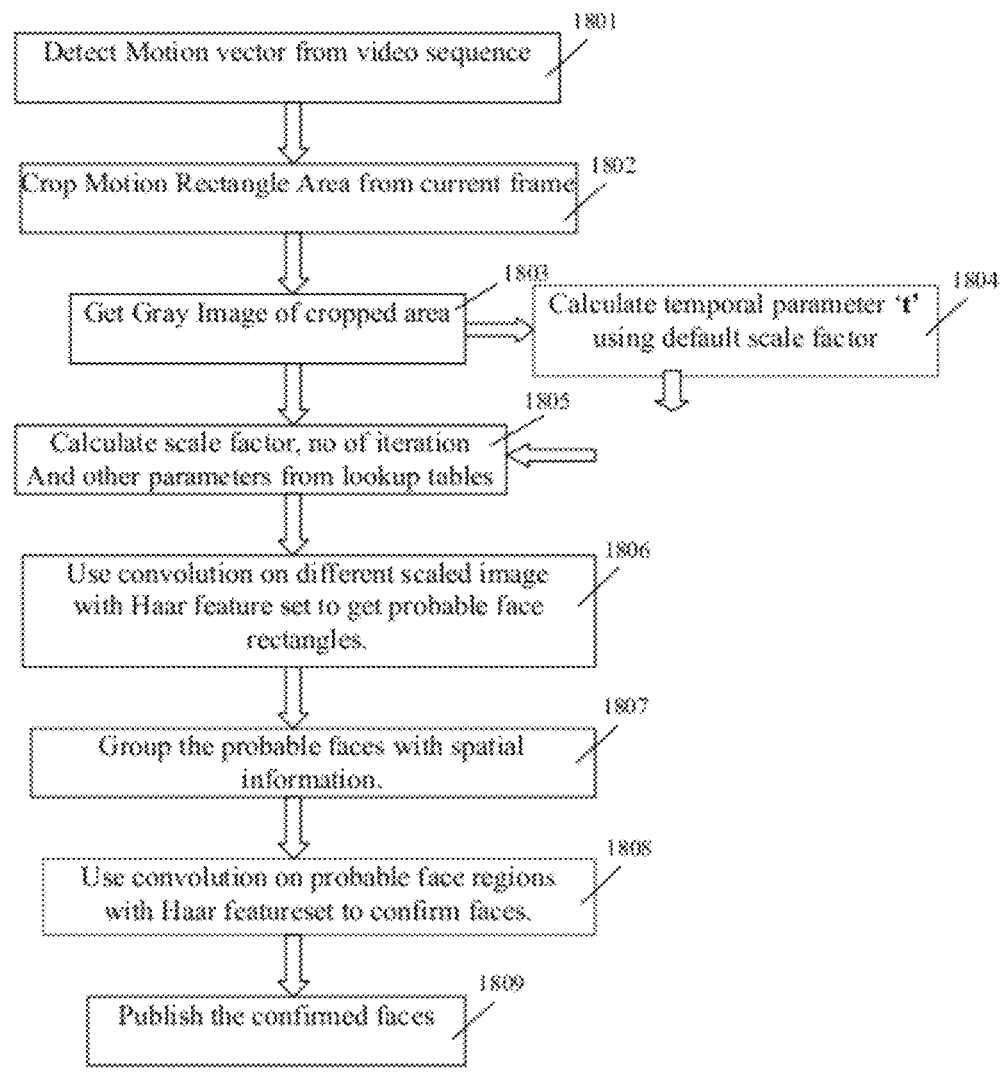
FIG. 18: is an illustration of the process for enhanced and confirmatory identification of faces in accordance with the present invention.

Reference is now invited to accompanying FIGS. 17 and 18 to discuss the modified, computationally efficient technique for Harr feature based face capture application according to the present invention.

More specifically, FIG. 17 shows a tradition method of face detection using the flowchart in FIG. 17 and by way of components/features/stages 1701 to 1706 while Figure illustrates the face detection in accordance with the present invention by way of components/features/stages under 1801 to 1809.

What is disclosed is an efficient technique to find regions in a video to capture faces of people in motion, limiting the search space using motion detection technique, control the computational requirement based on desired accuracy of capturing faces. This technique can be used to capture faces from real time video where the accuracy of the operation can be controlled depending on the computational bandwidth available in the system.

Extraction of particular types of objects (e.g. face of a person, but not limited to) in images based on fiduciary points is a known technique. However, computational requirement is often too high for traditional classifier used for this purpose in the prior art, e.g., Haar classifier. A novel method is proposed to enhance the efficiency of extracting face regions from a sequence of video frames. Also, depending on the availability of computational bandwidth, the number of iterations and pixel shifts as required in the proposed technique is controlled with the help of a look up table. This helps in striking a balance between the computational requirement and the accuracy of face detection. In a multi-channel, multiple analysis process system, this novel technique can be used as a cooperative process coexisting with other compute intensive processes. In the proposed technique, the search space is reduced by considering the motion vector and sliding the window only in the blob regions where motion is detected. First, the average time t to analyze an image in host machine is calculated, and for subsequent frames pixel-shifts and number of iterations are calculated based on two lookup tables, to suite the computational bandwidth.

To increase the accuracy, a second pass upon the probable face regions detected by first pass is performed. This concept of increasing the accuracy of data analysis automatically depending on available computational bandwidth is novel and unique.

Traditionally, the faces are located in a still image using Haar feature based classifier Inherently, some non-face regions are also wrongly classified as faces. Computational requirement is also very high due to excessive number of convolution operations. This is unacceptable in a real time surveillance scenario. Viola et al. [1] have introduced a rapid object detection scheme based on a boosted cascade of simple features to achieve high frame rates working only with the information present in a single grey scale image using Integral Matrices. Operating on 384 by 288 pixel images, it's able to detect faces at 15 fps on a conventional 700 MHz Intel Pentium III.

R. Leinhart [2] introduced a novel set of rotated Haar-like features, which significantly enrich this basic set of simple Haar-like features and gives on average a 10% lower false alarm. These extended feature set, however, increase overall computational requirement. In some other face detection systems, auxiliary information, such as image differences in video sequences or pixel color in color images have been used to decrease computation time. But after applying all these techniques together, the system cannot process more than 10-15 frames per second for a 384 by 288 pixel video in a 2.0 GHz Core 2 Duo Intel processor based system.

Increasing the video size decreases the fps exponentially. A 384 by 288 pixel image size is not effective for a real-time surveillance system for proper detection and subsequent processing using these faces, e.g. recognition, and other biometric applications. With the advent of Megapixel cameras, we can use wide areas with prominent higher resolution face capture to effectively use the faces for subsequently applications as explained above. However, the computational requirement with traditional technology significantly increases to make it prohibitive for on-line application, such as surveillance, and on-line criminal detection system in a smart city.

An advanced technique is proposed in this disclosure so that the search space is significantly reduced by considering the motion vector of the moving objects only and applying the proposed novel algorithm in the regions represented by these motion vectors only. This reduced computation enables to process larger resolution video imagery to advance the face detection systems in today's era of increasingly growing demand of higher resolution surveillance cameras. Also, several parameters can also be dynamically adjusted so that detection and capture of face of people in motion can be done with varying accuracy depending upon the computational bandwidth available at any point.

Before discussing in detail the advanced technique of the invention, review is made of the tradition method of face detection using the flowchart in FIG. 17.

Limitations of the Traditional Approach:
1. As the above algorithm is a multi-scale convolution-based face detection algorithm, it takes huge time to process a single frame. In real-time situation it's very much problematic to suite the m/c bandwidth.
2. Even at the cost of very high computation, it generates lots of non-face regions as face regions as it processes a rectangular image bounding the presumed face region (where some background portions are present with motion areas).
3. Because of the inefficient nature of the today's algorithm, often these bounding rectangular regions are too large with very small percentage of pixels with actual motion. The larger the input image size, the execution time increases exponentially.

The Proposed Advanced Technique of the Present Invention:

The present invention involves advanced and enhanced the technology by incorporating advanced features as follows in order to accomplish effective face capture and detection system with higher resolution imagery with reduced computation requirement. The proposed technique of the invention is explained in Flowchart F-2 shown in accompanying FIG. 18.

Importantly, the proposed concept is not limited to Haar features, however for illustration herein Haar feature has been used to explain the advancement. The estimation of several parameter such as temporal estimation "t", prediction of possible number of iterations 'nIteration' in above flowchart is novel and described below.

Let, the time taken to process a single window area (fixed window size m×n) with Haar feature set=t.

Then, time taken to detect face for Image with size M×N $$T_{MN} \approx t * [(M-m)*(N-n)]/[pixelShift*pixelShift]$$

where, pixelShift is the window shift size.

For multi-scale processing ScaleFactor=f(M, N, m, n, nIteration)

Total time taken to detect faces, $$T = \sum_{i=0}^{nIteration} X_{M'N'}$$

Where, $M'=M/(ScaleFactor^i)$
$N'=N/(ScaleFactor^i)$

So, T=f(M, N, t, pixelShift, nIteration), for a fixed size window.

Calculate average t in host machine and tune the parameters pixelShift, nIteration accordingly using the lookup table T-1, T-2 to suite the bandwidth.

To increase the accuracy, enable a second pass upon the probable face regions detected by first pass.

Lookup Table T-1:

| SL | Calculated nIteration | nIteration (First Pass) | nIteration (Second Pass) |
|---|---|---|---|
| 1 | 15 | 15 | 0 |
| 2 | 14 | 12 | 0 |
| 3 | 13 | 12 | 0 |
| 4 | 12 | 12 | 0 |
| 5 | 11 | 6 | 15 |
| 6 | 10 | 6 | 15 |
| 7 | 9 | 6 | 12 |
| 8 | 8 | 6 | 12 |
| 9 | 7 | 3 | 12 |
| 10 | 6 | 3 | 12 |
| 11 | 5 | 3 | 9 |
| 12 | 4 | 3 | 9 |
| 13 | 3 | 3 | 6 |
| 14 | 2 | 3 | 6 |
| 15 | 1 | 3 | 6 |

Lookup Table T-2:

| SL. | nIteration | pixelShift |
|---|---|---|
| 1 | 6 to 15 | 2 |
| 2 | 1 to 5 | 1 |

Figure 19:
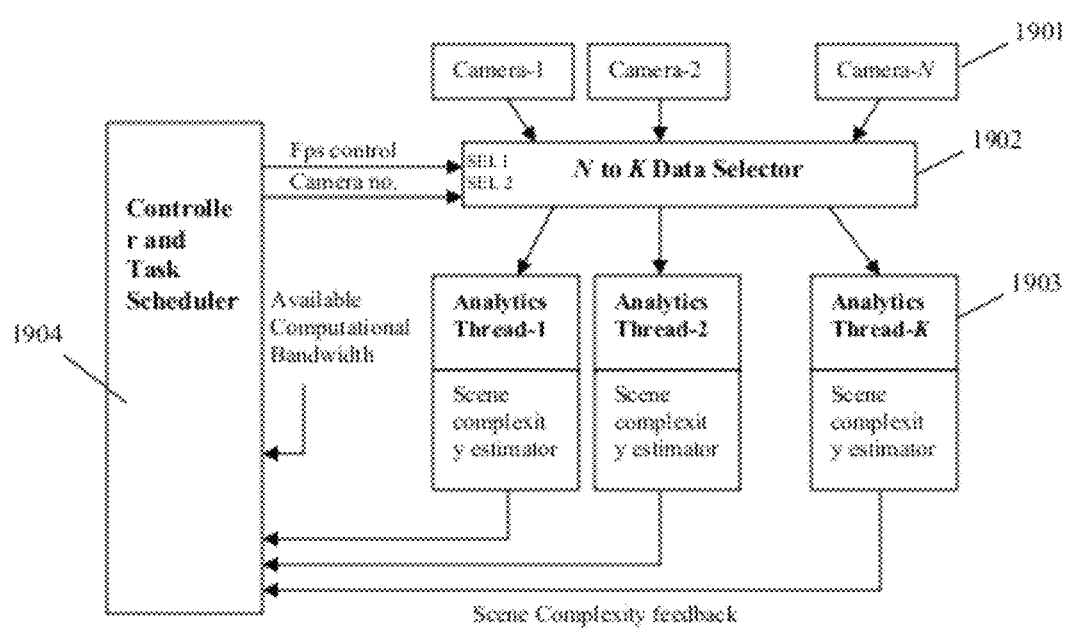
FIG. 19: is an illustration of the manner of providing scene complexity feedback in accordance with the present invention.
Figure 20:
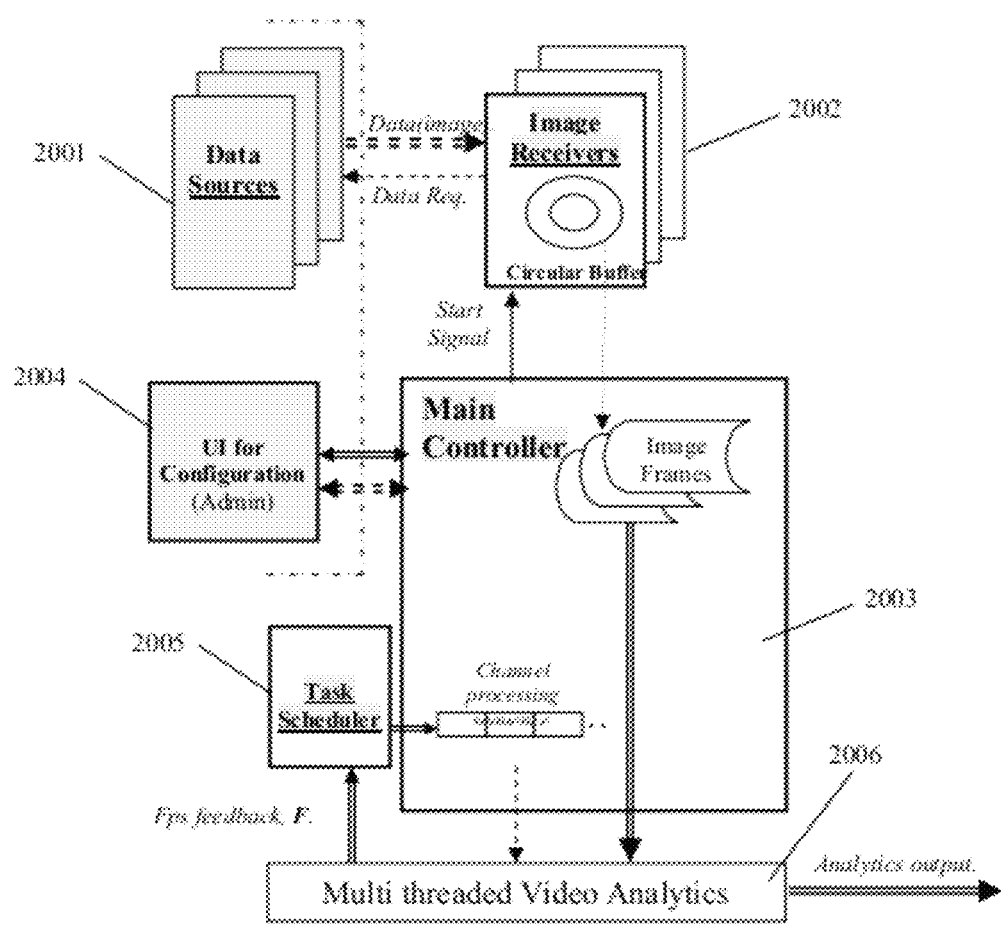
FIG. 20: is an illustration of multi threaded video analytics in accordance with the present invention.

Reference is now invited to accompanying FIGS. 19 and 20 which illustrate the advancement residing in the video content driven resource allocation for analytical processing by way of reference components/features/stages 1901 to 1904 and 2001 to 2006 respectively.

What is disclosed is a method for allocating computing resource and allied resources (e.g, Physical memory) in a computer for Analytics processing on video channels in a multi-channel environment, estimating scene complexity as relevant to the frequency of frame processing, spawning of processor threads based on physical CPU cores, allocation of threads to video channels for Analytics processing based on requirement. In a multi-camera system with limited server hardware resource (CPU, Memory), the video frames are fed to the Video Analytics engine at an fps f∝F, where F is calculated dynamically by the Analytics engine itself depending on its processing requirement. This enables an optimum sharing of resources among multiple channels with constrained resources and also eliminates unnecessary computing.

The resource requirement for Analytics processing varies to a large extend from one point of time to another during run time. This is because the optimal requirement of analyzing the scene depends on the activities of the objects in the scene, the noise level, number of objects, and similar parameters. Also, to extract meaningful information from the video, a minimum fps requirement is to be met so that many to many mapping amongst objects present in the scene can be done from one frame to the next frame. Therefore, calculating the resource requirement for Analytics processing for a set of channels is difficult and cannot be correctly estimated apriori. Traditionally, a worst case scenario is considered and either the worst case requirement or an average requirement of resources is estimated. This not only gives unrealistic estimates but also forces un-optimized usage of resources. A novel technique for estimating current resource requirement for Analytics processing per channel and a method to allocate the resources (CPU and Memory) to the competing Analytics tasks is suggested, where the resource allocation is done based on Analytics engine's run time feedback.

In accordance with the present advancement, a fixed number of Analytics Task processing threads are spawned as a function of number of processor cores present. The Threads are kept suspended in a thread pool. Depending on the fps requirement of the Analytics Engines for a particular channel, the channels are allocated/de-allocated to the threads. The Analytics engine calculates the optimum FPS requirement as a function of scene complexity. The Scene complexity is calculated based on:
  a. Inter class difference of foreground and background.
     (i.e. For noisy image scene complexity is high)
  b. Number of objects present
  c. Required level of calculation (dependent on the particular processing task).

A Controller module coordinates the tasks for multi-channel camera analytics. The Controller spawn a number of Analytics processing threads depending on the number of CPU cores present, as available from the system hardware information. A Task Scheduler module generates a sequence indicating the order in which the individual channels are to be served for Analytics tasks. If there are 3 channels and there ratio of processing requirement is 1:2:3, then the sequence generated is: 1 3 2 3 2 3 1 3 2 3 2 3 1 3 2 3 2 3 1 . . . . The Controller dispatches the frames of different channels, in the order as in the sequence, to the Video Analytics Processing threads as when they are free. After a fixed amount of time, say 1 second, the Controller regenerates the sequence based on feedback from Video Analytics Engine.

Figure 21:
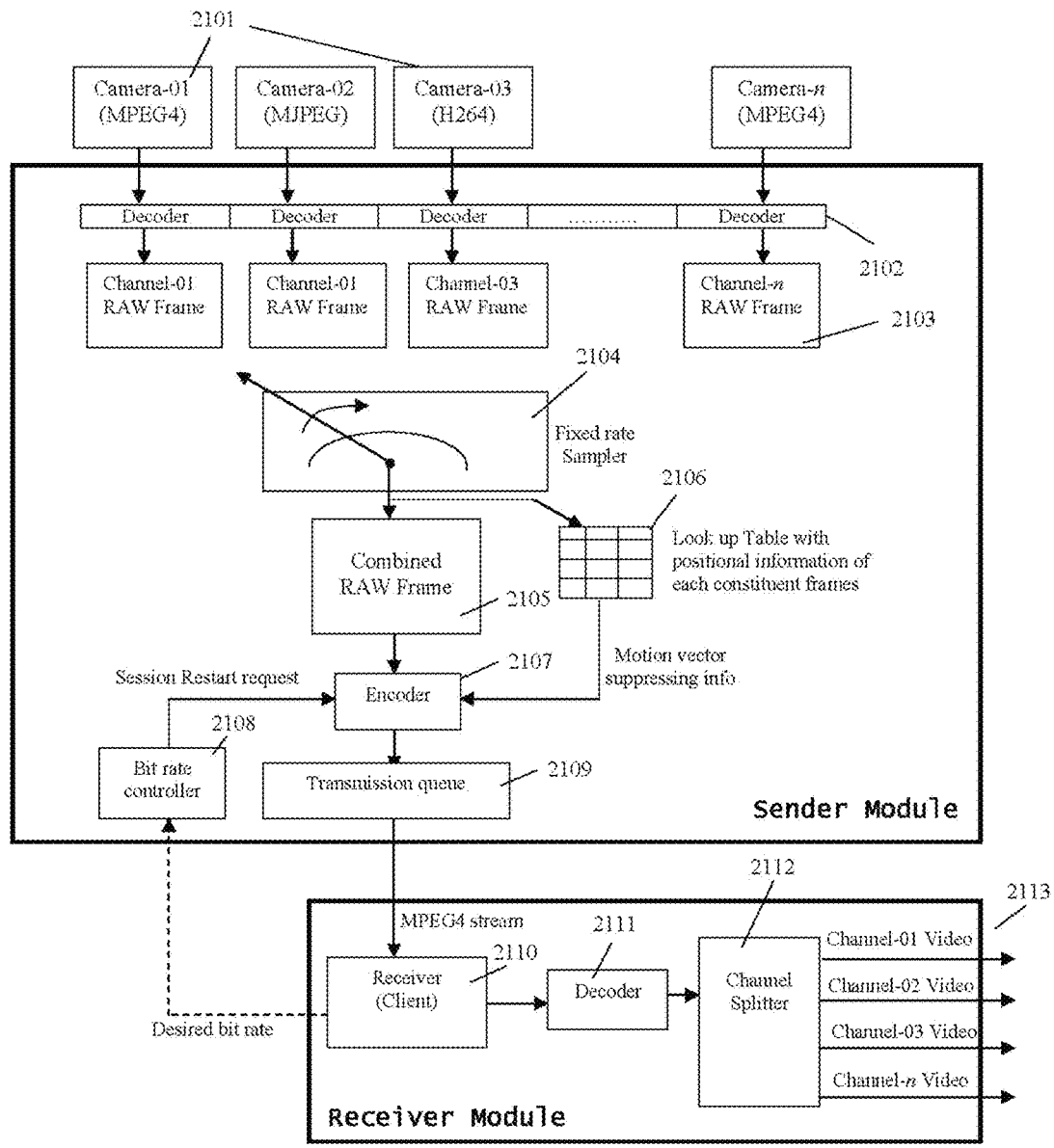
FIG. 21: is an illustration of the sender and receiver modules used in the system in accordance with the present invention.

Reference is now invited to accompanying FIG. 21 which illustrates the video channel join-split mechanism for low bandwidth communications in accordance with the present invention by way of representative components/features/stages under 2101 to 2103.

What is disclosed is an on-line video transfer mechanism for multiple channels over IP network with low and variable network bandwidth, invariance to individual channel video format and bit rate, automatic learning and optimal utilization of available network bandwidth for transmitting video, avoiding inter-channel interference in the combined frames, embedding metadata information to extract the individual channel video at the receiver end. The system consists of two components—a Sender and a Receiver. The Sender and Receiver are to be used in pair, the former installed at the multi-camera site to join and compress the video streams in a single channel video, and the later at the Client side to receive the video and extract the individual channels for the purpose of viewing live, recording or retransmitting. The bit rate of the compression at the Sender's end is adaptable to the available network bandwidth of the network path connecting the server and the client.

Video surveillance or video chatting domain is characterized with transmission and receiving of videos from one site to another. An IP-network is often used as the transmitting channel—wired or wireless. In a distributed environment a WAN network is often used in between the communication path between the sender and the receiver of the video channels. When multiple channels are to be transferred live, the varying and sometimes low bandwidth of the WAN network may not be sufficient for transmitting the multiple channels on-line individually in the form as they are received from the cameras. Also, there is a high possibility that one or a subset of the video channels to consume most of the available network bandwidth leading to starvation for other channels. The problem is enhanced when MPEG4 or H264 video compression is used inside cameras, as the video bandwidth consumption is very much video content sensitive in those cases. In a geographically distributed deployment of servers and clients in a Video Management system or any system with similar requirements, the transmission of multiple camera views to a particular channel is therefore difficult, and results in jittery video for some channels, if not for all. Also, while combining the frames from multiple channels into a single channel, inter-channel interference is observed. Requirement is there to transmit multiple channels on-line from the sender to receiver using low and variable network bandwidth without jittering and also avoiding inter-channel interference. An enhanced multi channel data aggregation technique for data transmission over low and variable bandwidth communication network has been proposed which also avoids inter-channel interferences. While transmitting multi-channel video over low and variable bandwidth network link, they are combined into a single channel video, frame by frame, and then transmission bit rate is controlled to avoid jittery video at the other end or interference between individual channels. It also avoids starvation for any single channel. In this process, the underlying data compression algorithm is intelligently handled without affecting the decoding process with a standard equivalent decoder. For example in case of video, the motion vector generation step in the underlying MPEG type compression is intelligently controlled, so that no motion vector crosses-over the inter-frame boundary in the combined frame. This eliminates interference between any two channel data frames in the combined frame. This technique of bandwidth adaptive multi-channel data transfer without inter-channel interference is novel and unique.

A module in accordance with the present invention has been developed which combines multiple video channels into a single combined stream and encodes the stream with variable bit rate depending on the available bandwidth from the Server to the Client. The individual video stream may have varying formats (one with MPEG4, another with MJPEG, etc). A frame header is transmitted with each frame of the combined video stream. The frame header contains metadata about the constituent streams. A receiver at the receiving end splits the combined video stream into constituent video streams based on the frame header Information.

Sender module: The video from multiple cameras are received and decoded individually to get the RAW frames. If the video is available in RAW form itself then this step is skipped for that channel. The RAW frames, as and when available from the individual decoder, are kept in memory, overwriting the existing frame; each channel has a dedicated space in memory for that. On request from the client, an initial fps (f) is determined. As for example, if it is for live viewing the client may request for an fps of 10.

When the client requests for a subset of the video channels, a Sampler module takes the current frame from the channel specific memory area at a fixed rate, f, for those channels and combines them into a single frame. A lookup table is created to store the channel ID and its boundary within the combined frame. The frame is then compressed in MPEG4 or to any other similar format as desired using a default bit rate. The set of motion vectors generated as part of the compressing technique is then checked to identify all such motion vectors which cross the inter-frame boundary. All such motion vectors are forcibly set to null to ensure that the video content of one constituent frame (within the combined frame) does not contribute in deciding the content of another constituent frame, and thus avoiding inter-channel interference.

A frame header is composed with metadata information about the position of the individual channel frames within the combined frame, the resolution of the individual frames, and a timestamp. Once the combined compressed frame is generated with the header, it is transmitted to the client.

Receiver Module: The receiver module open a TCP connection with the sender and requests for all or selective channel video. It can also specify the format for compression. Additional commands to get the existing channel information, the resolution of the channels, the fps of the individual channels at the senders end, etc are available to facilitate the client in selecting the channels of interest and specifying other parameters as the transmitting fps (f), initial bit rate etc.

Changing bit rates: As the receiver receives the video frames, it calculates the receiving bit rate taking a rolling average, and requests for a target bit rate to the sender. The bit rate controller at the server end prepares the encoder for new bit rate, flushes the transmission queue and responds to the client with the new bit rate as set. The Client reacts with clearing its own session and prepares itself to receive video with new bit rate. The accompanying FIG. 21 clearly illustrates the above discussed Sender module & Receiver module.

Figure 22:
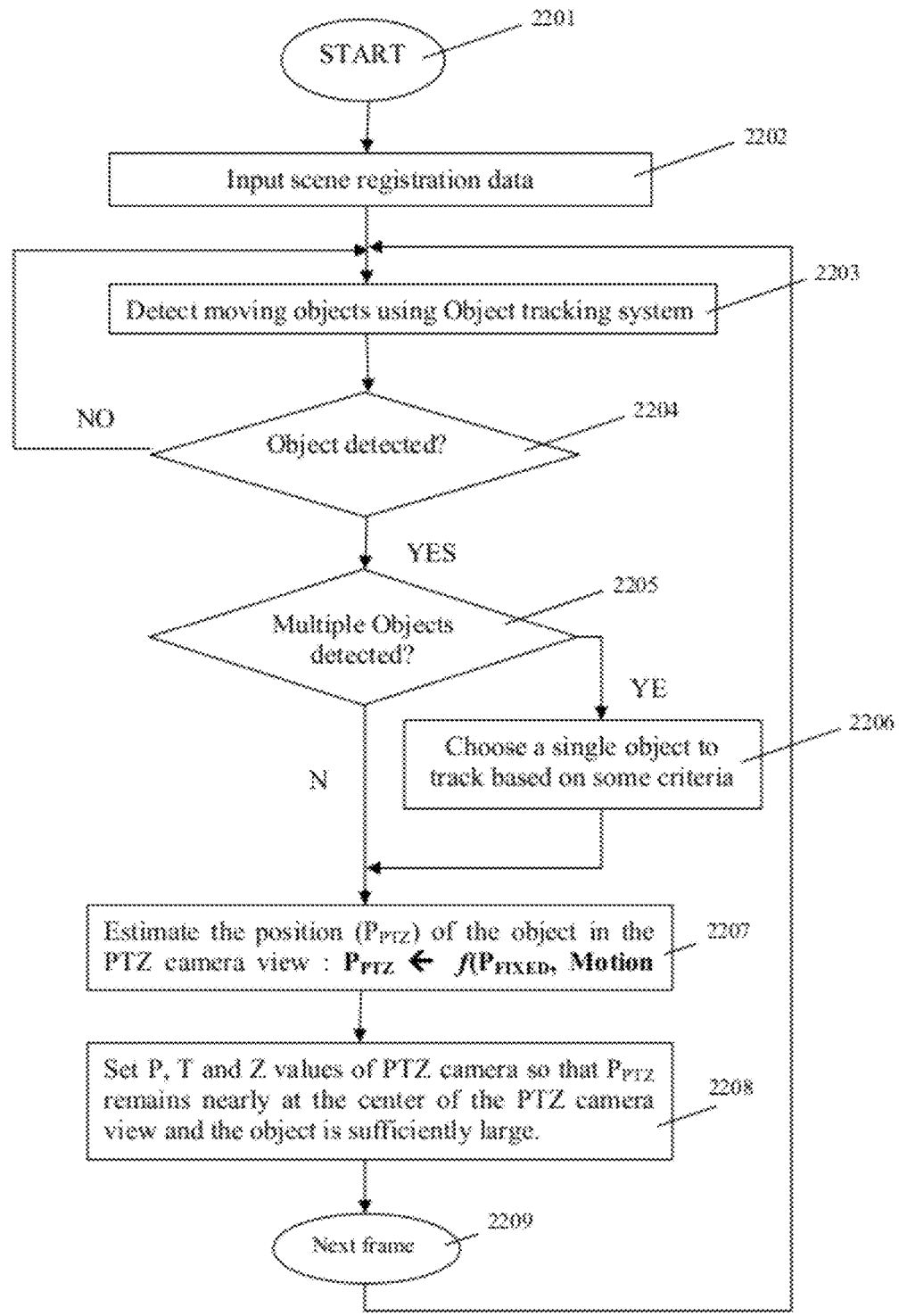
FIG. 22: is an illustration of the enhanced object tracking system in accordance with the present invention.
Figure 23:
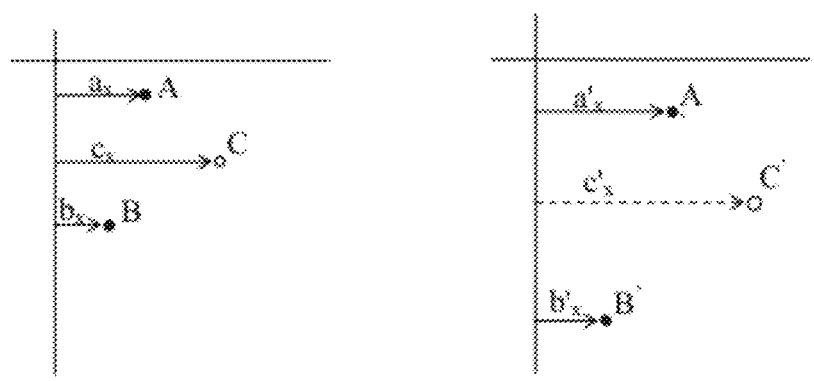
FIG. 23: is an illustration of the coordinate transformation used in the present invention.

Reference is now invited to accompanying FIG. 22 involving references of components/features/stages 2201 to 2209 and FIG. 23 which illustrate in greater detail the features of the advancement involving enhanced object tracking.

Object tracking systems are used to detect the presence of any moving object in a scene and track the object to distinguish it from other similar objects in the scene and also to record the trajectory of the object. In some of such systems Video data of the scene as captured by a fixed camera is analyzed to detect and track moving objects. However, this requires the background to be stable and the camera should cover the whole region where the trajectory is to be formed. This has the side effect that the size of the object in the camera view becomes small, particularly when the object is far.

To overcome this limitation, PTZ Camera based Tracking Systems are used where A PTZ camera is used to automatically track the object and zoom on the object so that the detail features of the object is visible in the video frames. However, traditional PTZ based tracking system suffers from some major drawbacks and is not deployable in a real life video, particularly when the video is infected with noises like shadow, glare, electronic noises etc. One of the reason is the inability of such systems to form a good reference background frame. Also, the system is non adaptive to demographic and environmental variations.

Additionally, when PTZ camera starts tracking an object, it loses the visibility of other parts of the scene. Therefore, some important scene event may be missed while the PTZ camera tracks one of the objects. This may encourage miscreants to fool the system. The accuracy of detection and tracking of objects is also very low, as there is no fixed background while the tracking is in progress and the foreground objects are to be extracted based on motion detection or some modified version of the method or using some modified version of object extraction technique from still images. In case of some tracking error, which is likely to occur when the speed of the object in the scene is high or random, the system cannot recover from this error state in a short time, as it loses visibility of the object.

To take the best of the above two techniques, a novel method is designed where an Object tracking system is used in conjunction with one or more PTZ cameras. When an object is detected in the Fixed camera view, the object tracking system tracks the object and pass on the positional information of the object along with a velocity prediction data to the PTZ camera controller in a periodic manner. If more than a single object is detected, one object is taken at a time for handling based on some criteria (viz, the priority of the zone where the object appeared, the duration of the object in the scene etc.). A PTZ camera controller receives the positional information of the object periodically and estimates corresponding position of the object in the PTZ camera view using a novel Scene Registration and coordinate transformation technique. The P, T and Z values are set by the Controller such that the object remains nearly at the center of the PTZ camera view and is sufficiently large.

Hence, the proposed system enhances the functionalities and utility of a traditional Object tracking system and at the same time eliminates the drawbacks of a standalone PTZ camera based tracking mechanism. This concept and implementation technique is novel and unique. The concept can be extended to develop a system to handle multiple objects in parallel with the more than one PTZ cameras. Also, trigger from multiple fixed cameras can be received to develop a system with multiple fixed cameras and multiple PTZ cameras together to cover a wider range in the scene, or to enhance multiple Object tracking systems over a single framework.

FIG. 22 thus shows an embodiment of the enhanced object tracking system.

Technique for Coordinate Transformation from Fixed Camera View to PTZ Camera View To map the bounding rectangle of an object visible in the Static camera view to the corresponding Rectangle in the PTZ camera view a weighted interpolation technique is used. The technique requires as input a set of points (A, B . . . ) spread uniformly over the static camera view and their corresponding positions in the PTZ camera view. This can be done by the user while configuring the system.

FIG. 23: Illustrates the Coordinate Transformation involved in the present invention enhanced object tracking Let A and B be any two such points in the static camera view as marked by the user, and let A' and B' be the corresponding mapped points in the PTZ camera view as also marked by the user. Now, any arbitrary point (C) in the static camera view is mapped to the corresponding point (C') in the PTZ camera view dynamically, using the following method:

Let $a_x$, $b_x$, $c_x$ are x-coordinates of points A, B and C respectively in the static Camera view. Similarly $a'_x$, $b'_x$ and $c'_x$ are for the corresponding points in PTZ view. Let, $$C'_{xAB} = B_x'[(A_x'-B_x') \times (C_x-B_x) \div (A_x-B_x)]$$

This gives an estimate of the x-coordinate of the point C' as interpolated with the help of points A and B, with a confidence factor $W_{AB}$, where $W_{AB} = (A_x-B_x) \div [\text{Minimum of } (C_x-B_x, C_x-A_x)]$.

Similarly, an estimate of x-coordinate of the same point C is calculated for all pair of points (A, B) in the Static camera view.

Now, $C'_x = \Sigma [C'_{xAB} \times W_{AB}] \div \Sigma W_{AB}$

Similarly, the y-coordinate $C'_y$ is calculated for the point C.

When a bounding rectangle is to be mapped from the static view to the PTZ view, this technique is applied for all the four corner points of the rectangle.

Figure 26:
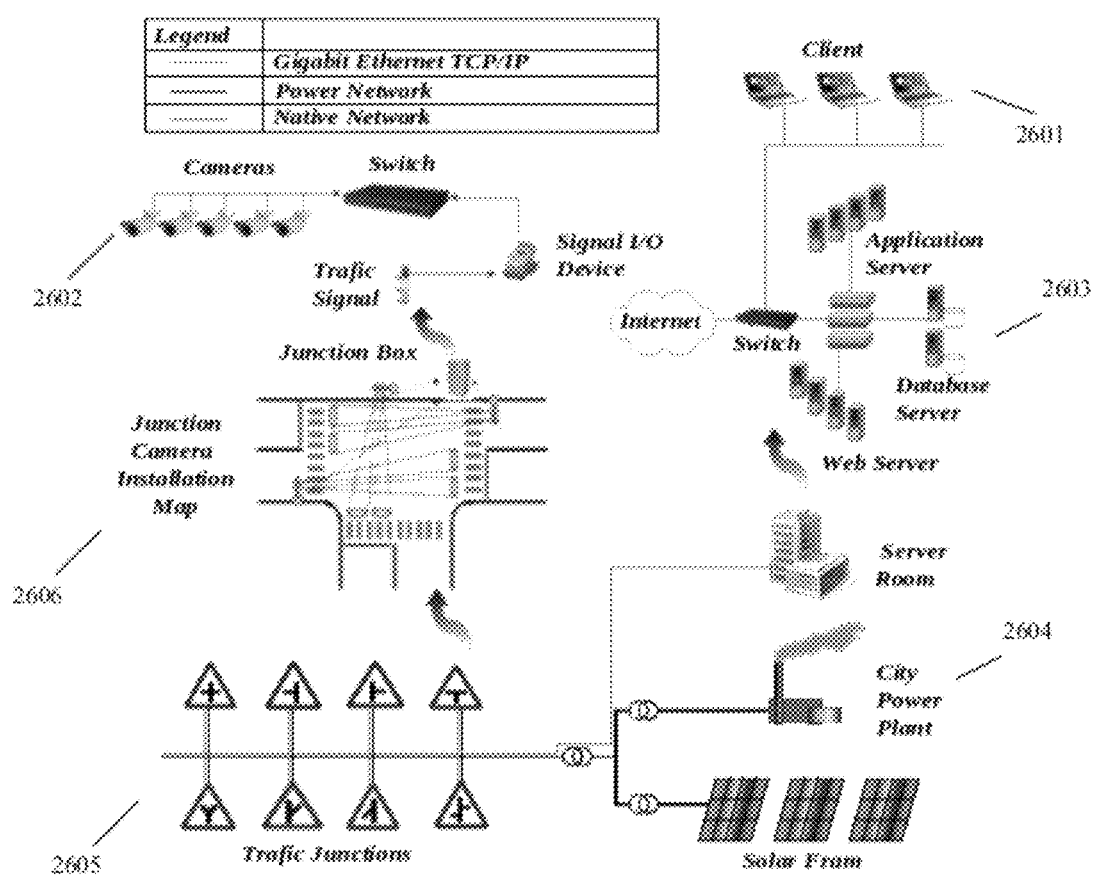
FIG. 26: is an illustration of top level system diagram in accordance with the present invention.
Figure 27:
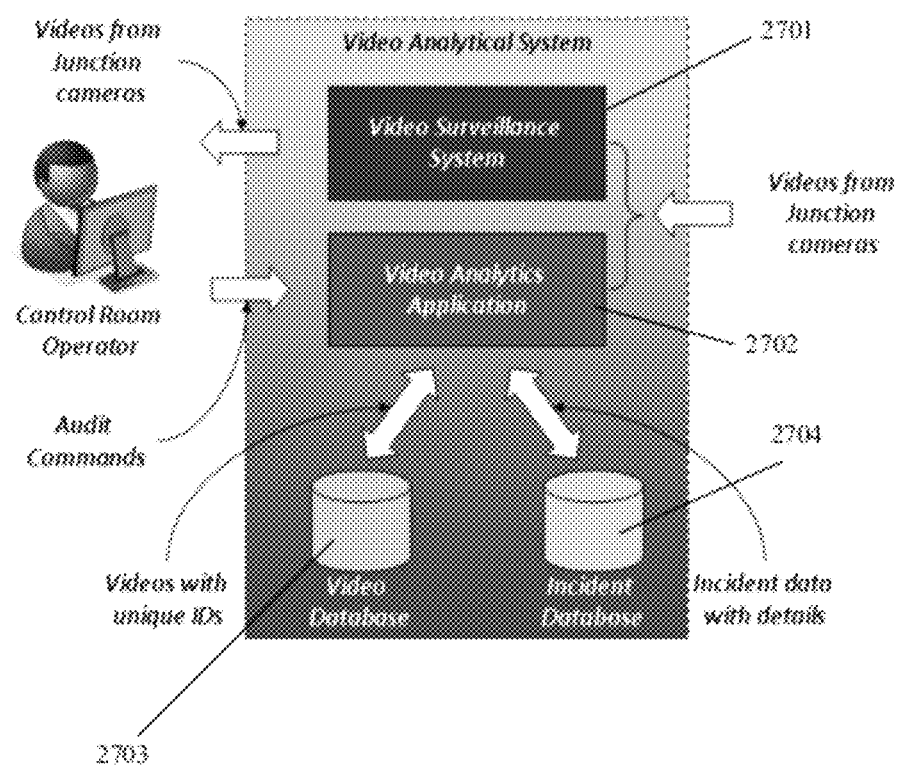
FIG. 27: is an illustration of the flow diagram in accordance with the surveillance system in accordance with the present invention.
Figure 28:
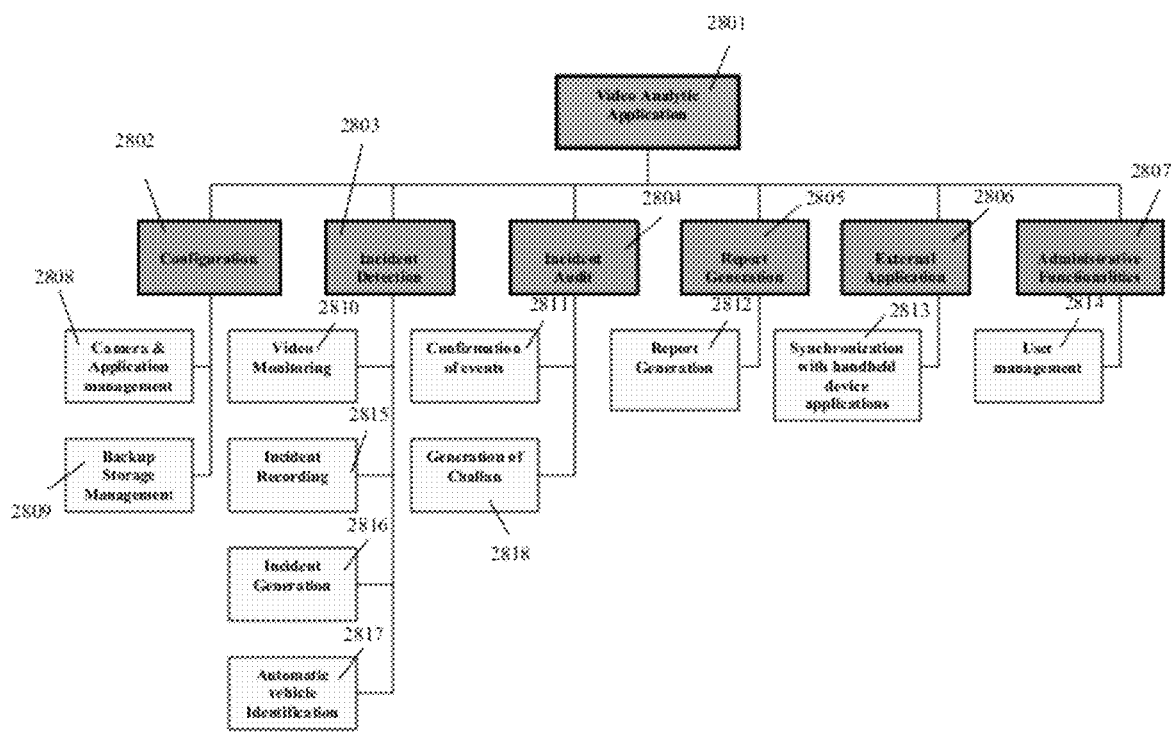
FIG. 28: is an illustration of the video analytics application breakdown structure in accordance with the present invention.

Reference is now invited to accompanying FIGS. 24 to 34 which illustrates in detail an intelligent and automatic traffic enforcement system built in accordance with the advancement of the present invention including components/features/stages 2401 to 2409 in FIG. 24, 2501 to 2512 in FIG. 25, 2601 to 2605 in FIG. 26, 2701 to 2704 in FIG. 27, 2801 to 2818 in FIG. 28.

Traffic signal violation is a burning traffic enforcement issue throughout the world. Beyond optimistic illusions, ground realities are too fierce to be accepted, as the fearsome road accident, traffic jam are the main effect of the same. Seeds of improvement are however being planted at all possible arenas but they are very costly and high human resource consuming too. The proposed system describes an Intelligent Automated Traffic Enforcement System.

Following are the regular challenges for the road transportation department at the different road junctions:

Ensuring that the rules and regulations are followed by each and every vehicle crosses any junction at any point of time.

Enhance Road safety for all types of vehicles and as well as pedestrians.

Road transportation department requires intelligent automatic enforcement system for the surveillance in each traffic junction and for the on-field enforcement team, allowing them to book offences and access other Transport department application's events in real time.

Smooth traffic flow within city/country.

The present advancement is targeted a the following:

CCTV IP cameras and Video Analytics Applications using virtual loops (opposed to any physical magnetic Loop) for automatic detection of offences like 'red signal violation, 'over speeding', 'wrong way vehicle movement' in every important junction and integrated with the remote traffic control room.

Smart phone solution for the on-field enforcement team allowing them to book offences and access other Transport Department Application's events via GPS/GPRS enabled Mobile/Handheld devices.

Setting up of the Control room for backend activities with complete hardware, software solution and networking.

The additional data center hardware set-up for Road Transportation Department to store evidence/archive data for all the relevant events.

Connectivity management in real time by data transfer between the above components to ensure synchronized communication.

The proposed intelligent automated traffic enforcement system of the present invention can help the traffic management department to identify the violation by traffic department personnel by remotely observing the video feeds coming to the control room from the junction through computer monitor. Alternately, it can be automatically detected by our proposed system and automatically alert a traffic personnel without physically being present at the traffic junction or sitting in the control room. Videonetics proposed system does not require any specialized or proprietary camera to detect these violations. It analyzes video feed from traditional security cameras in a computer to detect the events. Security cameras are installed at strategic locations around the traffic junction in such a way so that video analytic engine can capture and process the video to detect the violating vehicles, automatically find the identity of the vehicle such as Number Plate, shape, size, color, logo, type of the vehicle, and possibly the snapshot of the driver if visible. The engine then automatically stores these information and images of those vehicles in event log database. The traffic inspector can identify possible violations like red light violation, over speed vehicle, wrong way vehicle, vehicle rider without helmet, without wearing seat belt, using mobile phone while driving, motorcycle with more than two passengers, etc. either by automated video analytic application or manually through computer monitor. Images can be manually tagged with comments by the traffic personnel or automatically tagged with possible violation type, and can be manually or automatically sent to handheld devices of on-field enforcement team through communication network for subsequent physical action and are also kept in database for future use.

Exemplary illustrative components of The proposed solution:

The proposed solution consists of SEVEN major COMPONENTS.

Number plate recognition engine (NPR—Engine)
Object presence detection engine (OPD—Engine)
Control Room setup and handheld devices.
Installation of 'CCTV IP Cameras' for the Video Surveillance System.
Synchronized Communication of Traffic Junction to Control Room and/or Traffic Junction to handheld device.
Automatic event detection by intelligent Video Analytical Application software.
Detected Event Recording as evidence for future use.
Communication between event server and peripheral devices of the system.

Figure 24:
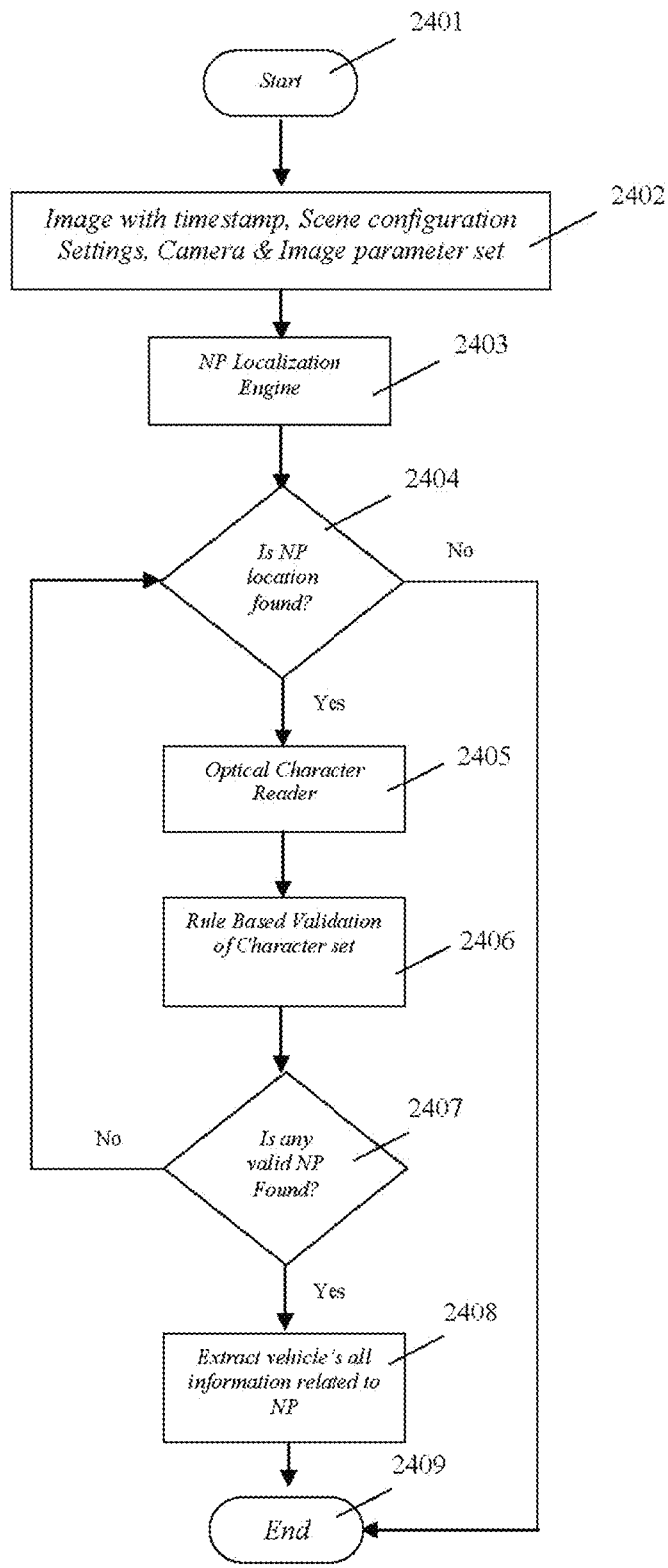
FIG. 24: is an illustration of the number plate recognition engine components in accordance with the present invention.

The top level Number Plate Recognition (NPR)—Engine flow chart is provided in accompanying FIG. 24. The method to localize multiple number plate regions in video images is shown in accompanying FIG. 25.

Figure 25:
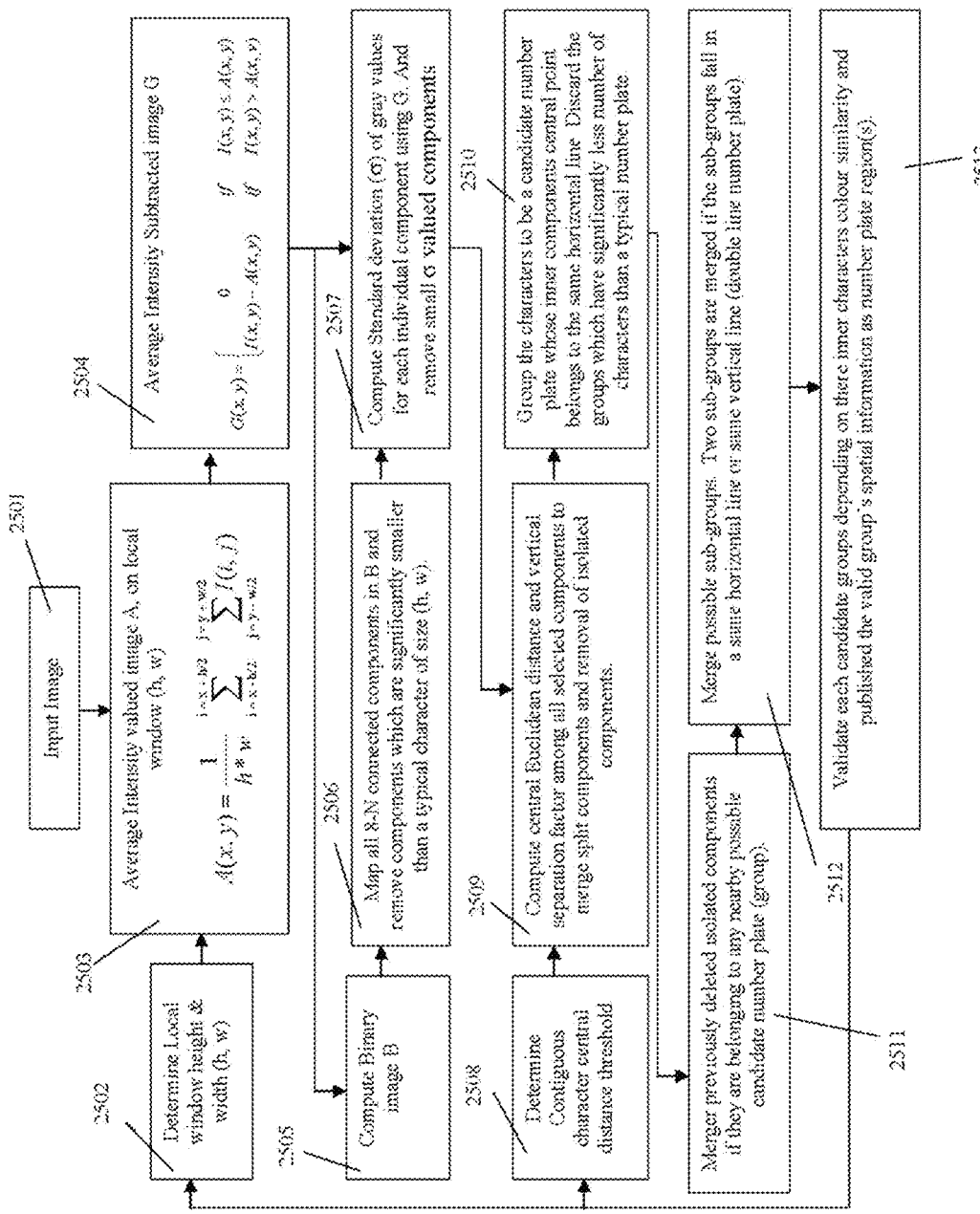
FIG. 25: is an illustration of the localized multiple number plate regions in video images in accordance with the present invention.

As would be apparent following the localization technique shown in FIG. 25 the same basically follows as hereunder:

Find the average height (h) and width (w) of a typical character in the field of view.

Compute a gray image G,
Where, $$G(x, y) = \begin{cases} 0 & \text{if } I(x, y) \le A(x, y) \\ I(x, y) - A(x, y) & \text{if } I(x, y) > A(x, y) \end{cases} \text{ in pixel coordinate } (x, y).$$

A(x,y) is the average of all the pixels in a 2-dimensional window of size (h, w) centering (x,y), $$\text{i.e. } A(x, y) = \frac{1}{h*w} \sum_{i=x-h/2}^{i=x+h/2} \sum_{j=y-w/2}^{j=y+w/2} I(i, j)$$

Binarize gray image G to a binary image B.

Extract possible characters in the image plane and group them to construct number plates as follows.

Find all the connected components in B and remove the components significantly smaller than a typical character of size (h, w). This removes significant amount of non-character regions to select connected components representing possible characters.

Compute the standard deviation ($\sigma$) of grey values of pixels in a region in G representing a possible character. Ignore the connected components with too small $\sigma$ values to further remove non-character regions.

Depending upon the quality of the image, sometimes a single character can be split into multiple subcomponents. Merge possible such subcomponents. Two subcomponents are merged if the central point of those subcomponents fall in a vertical line and centre distance is small.

Discard possible isolated characters. For a true number plate region, there will be number of contiguous characters in the region.

Group the characters whose centre points belong to the same horizontal line. Find all the groups. Discard the groups which have significantly less number of characters than a typical number plate.

Check previously deleted list of possible isolated characters and check whether inclusion of any such character to a nearby group can form a possible number plate.

Depending upon the type of font and Number plate writing style, sometimes grouped characters can be split into multiple sub-groups. Merge possible sub-groups. Two sub-groups are merged if the sub-groups fall in a horizontal line (case of split group) or vertical line (case of multi-line number plate).

Compute color feature of each character in a group and for the over all group. By comparison of the color feature validate all inner characters of the group. Depending on the validity of the majority number of characters finally validate the possibility of the group as a number plate.

The advancement residing in the above method of localization is further discussed hereunder:

1. Real-time detection of multiple type of traffic enforcement violation in a single unified architecture.
2. Novel Number Plate localization Algorithm to localize appearance of a number plate in any part of the video.
3. Filters out other textual and alphanumeric type information from the video using a unique signature representing Number Plate regions
4. Novel Number Plate localization Algorithm to localize appearance of multiple number plates in different parts of the image for multiple vehicles at a time.
5. Effective with English Alpha-numerical characters independent of the font, size, style, and color of the characters.
6. A general localization technique without particularly forcing requirement to use any reflective quoting in the license plate
7. Completely detected by image processing techniques in software. Does not require any specialized camera particularly build for number plate recognition.
8. The technique works with any off-the-self security camera—analog and IP
9. On-line and off-line processing
10. Independent of the speed of the vehicle
11. Lighting condition independent—Works in Day and light condition with sufficient illumination of any type of light (neon, fluorescent, IR, etc.)
12. Does not depend upon color characteristics of the image or video
13. Low foot print computational and memory requirement for real-time implementation and embedded processing.
14. OCR algorithm independent—The localized number plate region can be processed by any OCR device or algorithm.

15. Automatic skew detection and correction
16. Processing of the type of vehicle, color of vehicle, logo, make of vehicle, silhouette of the vehicle, possible driver snapshot, all can be processed in real time.

An illustrative top level system overview for such traffic surveillance system is shown in accompanying FIG. 26.

The proposed system thus comprises of two main modules viz. Video Surveillance System and Intelligent Video Analytical Application for event detection. The Video Surveillance System facilitates monitoring using security cameras in traffic junctions. The videos feeds can be displayed in the control room for monitoring. The video feeds are continuously and automatically recorded, indexed, and properly archived in databases. The time of recording is configurable at administrator level. It is typically configured inline with the operation shift/day shift. The Video Analytics Application supports various functions as shown in the figure below. Each function consists of various use cases of incident detection and management. The video Analytical Process, flows in a sequence starting from Configuration—Incident Detection—Incident Audit—Reporting—Synchronization—User Management.

FIG. 27 illustrates a schematic diagram of the various features in such traffic surveillance system of the invention.

FIG. 28 is a detailed breakdown illustration of the video analytics application for the purposes of traffic surveillance and violation detection and registration and follow-up actions.

Advantageously, the system and method of traffic surveillance and violation detection and action is adapted to facilitate configuring the parameters for incident detection and management in following manner.

Camera configuration: Add cameras to the configuration server with a high resolution image for detailed information. Start applicable application with event configuration.

Figure 29:
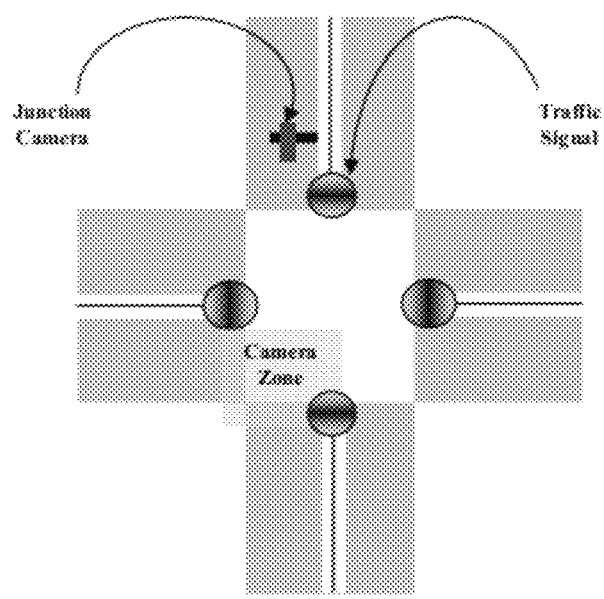
FIG. 29: is an illustration of the junction camera set up in accordance with the present invention.

Virtual Loop: For each camera in the junction/free way, a zone which is to be monitored is defined using this parameter. This is configured before starting the system operations and only once. However the rights of modification are available for administrator user level. The camera is always focused on the zone and it keeps on capturing the videos of the "marked" zone. The zone is marked so as to capture the maximum of the traffic in one direction. For each camera a zone is defined separately. A typical configuration is shown in FIG. 29

Time Limit: The application facilitates defining the working hours and/or nonworking hours for the purpose of recording the videos. The rights of modification in these time limits are available at administrator level. The system captures and records all the videos from the junction/free way cameras during working hours. It captures all the videos and archives the offences detected during non-working hours.

Traffic Direction: To detect the vehicle(s) moving in the wrong direction, the application facilitates defining the regular traffic moving direction for each camera with minimum 10 FPS rate.

Speed Limit: To detect the over speeding vehicles crossing the zone, the application facilitates defining maximum allowable speed limit for the vehicles. An incident is generated on detecting the vehicle crossing the speed limits (not clubbed with Red light camera).

Sensitivity & Duration: To detect the traffic congestion or vehicle presence crossing the zone (virtual loop), the application facilitates defining maximum allowable vehicle in percentage and the duration (time) for which it should not considered as traffic congestion or vehicle present in a zone (not clubbed with Red light violation detection or speed violation detection camera).

Incident Detection

Figure 30:
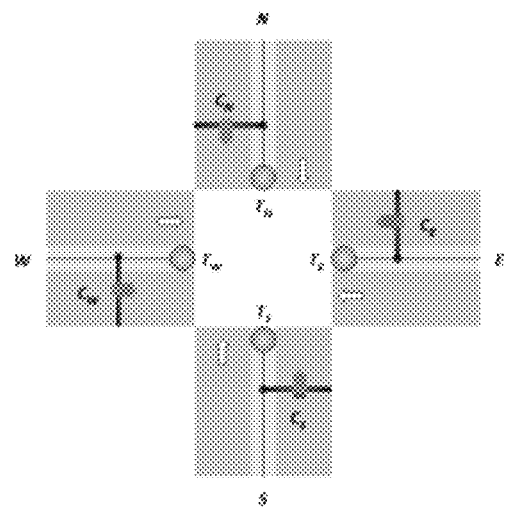
FIG. 30: is an illustration of the junction layout in accordance with the present invention.

Each junction has junction cameras for capturing the junction videos lane wise and an I/O module monitoring the status of traffic signal. The videos from junction cameras and status of traffic signal are sent to the control room via a dedicated link. The analytical application in the control room monitors the change in status of the traffic signal. On detecting the change, it starts analyzing appropriate video and check for an offence happening in the junction. The scenario is explained below. The figure below shows a typical layout of a 4 way junction. The system can operate multiple lane/road which had red signal. A junction layout is shown in FIG. 30.

Recording: When the system operation starts, the junction cameras start capturing the video feeds. These videos are saved in the server with unique serial number i.e. video ID. The serial number is generated using junction ID, camera ID, Date & Time and sequence number. Example: A video coming from junction 1, camera installed in south direction on 22 Mar. 2011 from 10:00 a.m. will have a serial number as J01CS20110810600000025 as an example. This is interpreted as J01—Junction with ID number as 01
CS—camera installed in "S" direction
2011—running year i.e. 2011
081—81st day of running year i.e. 22 March
600—Time of day in minutes i.e. 10:00 am
000025—Sequence number The next consecutive video starting from 10:06 am on the same day will have the video ID as J01CS20110810606000025 as an example. However the format is customizable as required.

Figure 31:
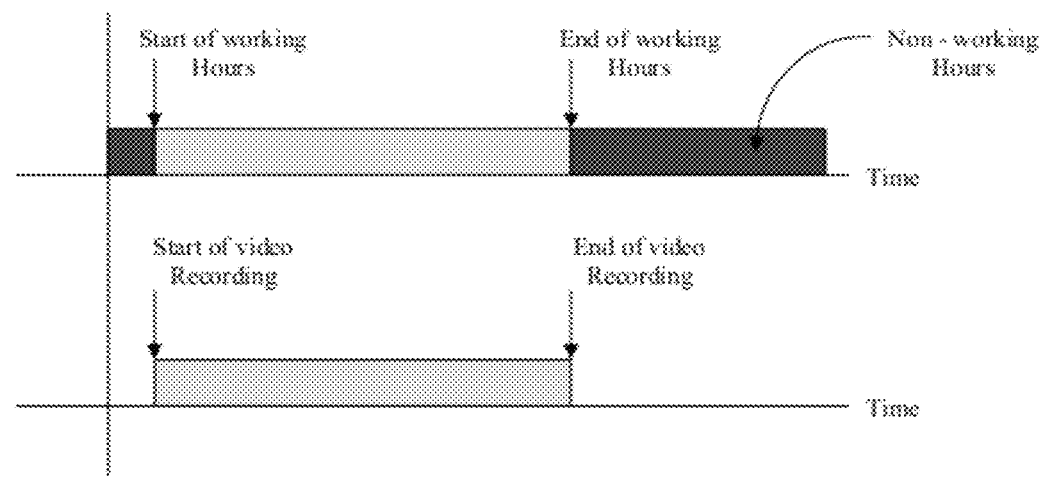
FIG. 31: is an illustration of the video recording during working hours in accordance with the present invention.

An illustrative manner of video recording is shown in FIG. 31.

The recording module is adapted to also display message in case any error is found while playing the video or receiving the video from the camera. The connectivity error is also detected and displayed on the screen and stored in the database.

Figure 32:
FIG. 32: is an illustration of the transition traffic light status in accordance with the present invention.

Trigger: The application monitors the status of traffic lights continuously. As the traffic light status is changed, the same is reported to the control room. FIG. 32 illustrates a transition traffic light status.

Incident Detection: On receiving a trigger from I/O Module, the application starts analyzing the videos. For e.g. When TN is Green, the traffic moves from S—N, S—E or S—W. The traffic in other direction is standstill as the traffic signal is Red. The application checks for following events to detect incidents Vehicles violating Traffic signals
Traffic Congestion.
Vehicle crossing defined speed limits
Traffic presence (Vehicle density).

On detecting any one of the phenomena the application raises an alarm and an incident is generated. The analysis process as activated as shown below.

Incident Display: Once the incident (alerts and notifications) is detected, an alarm with visual along with sound effects is generated at operator's workstation or hand held device. The alerts and notifications are recorded and stored in the operator's inbox. The alert is generated when an incident is detected and a notification is generated after detecting the alert. The notification gives details of the incident. It consists of incident type, date and time of incident, junction name i.e. location of incident, camera IP, and a link to the incident image/video for verification. The notification is shown on the screen and it is flashed continuously till it is acknowledged by the operator. The operator can accept or deny the notification by verifying the video. On denying the alert/notification it is archived and can be reviewed later.

License Plate Recognition: To register an incident the application request the NPR—Engine to extracts the license plate number (Text) of the violating vehicles.

Figure 33:
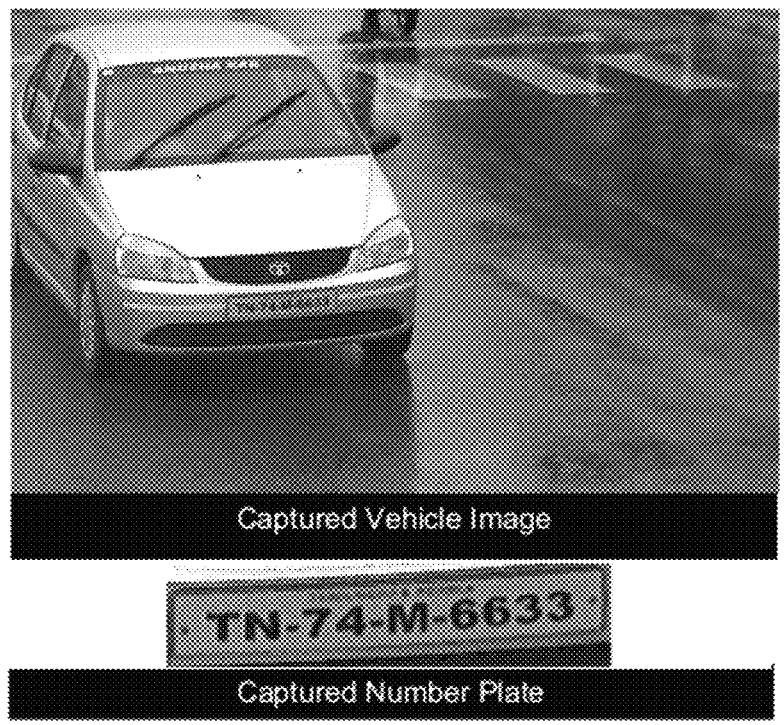
FIG. 33: is an illustration of the captured number plate in accordance with the invention.

FIG. 33 illustrates an exemplary illustration of capture number plate.

Incident Audit

Incident audit is ensures correct enforcement by verifying the incidents and vehicle numbers. The application keeps on raising the alarms for incidents. The operator is sitting in the control room or via handheld device audits these incidents by verifying with the video/images. The audit is carried out in following sequence:

The operator selects an incident by applying suitable filters if this is an archived incident. For a live incident he double clicks on the record to view the details.

The system shows details of the incident, a link to incident video and a link to license plate image of the vehicle.

The operator verifies the incident by playing the video and vehicle's registration number by viewing the license plate image.

If the license plate number is incorrect the operator enters the correct vehicle number of the incident image.

Incident status is changed from "Pending"/"Acknowledged" to "Audit" and it is saved into the database.

The operator enters the remark about the action taken while auditing the incident. The remark is saved in the database for future reference.

Before saving the changes the operator is warned for re-verification of his inputs. He previews the video and the license plate number and saves the audited transaction in the database.

Figure 34:
FIG. 34: is an illustration of the incident audit view in accordance with the present invention.

FIG. 34 is an illustration of an incident audit view generated by the system of the invention.

Reports

The above The traffic surveillance system application in accordance with the invention further facilitates generating various reports including as below:

Incident Details Report: The report shows details of all incidents occurred during selected time slot, for selected junction. The report portrait various details about the incidents including junction name, type of incident, offence vehicle, date & time of occurrence etc. The report can also be generated on hourly, daily, weekly and monthly basis.

Incident Summary Report: The report shows incident count for selected time and junction. The count is provided for each type of incident. The report can also be generated on hourly, daily, weekly and monthly basis.

Offence Report: The report shows the details of a particular incident, with license plate image. The report is generated by providing vehicle number, date and time details and junction name.

External Application Interface

Synchronization with Handheld Device Application:

The analytical software stores the data into the database and provides access to the external application (such as Mobile application) to pull the required data. By facilitating this, the Mobile application checks the duplication of records and avoids the same.

Administrative Functions

User Creation and Management: The access to the application is restricted using user name and password for each system user. The user names and information is registered into the system and each registered user is provided with a unique user name and password. The users are created under defined categories such as operators, supervisors, administrator etc. Access levels for each user category are pre-defined. These are also customizable as per the requirements. While starting the system operations user logs into the system and all the Operators that he has performed are logged with his login name.

Privilege Assignment: Customization of access level is done using this functionality. An administrator can modify the privileges assigned for a particular user category.

Master Data management: This includes entering the data into the system that defines the system Boundaries. Example: junction details, number of camera per junction etc.

We claim:

1. An integrated intelligent server based system for transferring sensory data received from channels to network accessible central storage system comprising a seamless and intelligent interconnection of at least one recording server based autonomous system receiving said sensory data from said channels for transferring to said network accessible central storage system including a cooperative communication channel between all of said recording server based autonomous system enabling desired scalability of number of the recording server based autonomous systems including when spread across wide geographical regions over an ip network and also allocating the sensory data from the channels to said recording servers based autonomous systems through said cooperative communication channel, said cooperative communication channel between said recording server based autonomous systems enabling assessing respective recording server capacity, configuration of each of the recording servers of said recording server based autonomous systems to operate them as a group of recording servers and to enable fail-safe support when any of the recording servers in the group fail to operate, remaining operative recording servers in the group distribute and take over the sensory data load of said recording servers in the group which fail to operate to thus render the system fail safe and self-sufficient;

each of said recording server in the group comprises local storage for storing the sensory data in segmented clips of various size and monitor available network bandwidth and sensory data inflow rate for each of the channels into the recording server; and an intelligent interface communication channel operatively linked to said cooperative communication channel between all of said recording server based autonomous system for carrying said sensory data of each said recording server to said network accessible central storage system involving intelligent network bandwidth sharing amongst said channels for transferring said sensory data received from the channels to the network accessible central storage system based on real time available network bandwidth as well as each of said sensory data inflow rate, local storage space of the respective recording servers wherein each of said recording server is self enabled for adjusting of rate of uploading of said segmented clips received by it to said network accessible central storage system from an individual channel based on the available network bandwidth and the sensory data inflow rate for said individual channel to its connected recording server and requirement of local storage space of said recording server connected to said individual channel for transferring the sensory data received from said individual channels to the network accessible central storage system via the local storage of said recording server in a fail-safe bandwidth optimized manner utilizing optimal bandwidth and share the available network bandwidth amongst the channels and their respective recording servers for uploading the sensory data to the network accessible central storage system in fail safe manner.

2. The integrated intelligent server based system as claimed in claim 1, wherein the channels correspond to cameras, other video sources and sensory data sources generating streaming data.

3. The integrated intelligent server based system as claimed in claim 1, wherein said intelligent interface communication channel is operatively connected to anyone or more (a) user management and client access controller (b) event controller and handler and (c) event and/or selected segments of sensory data distributor.

4. The integrated intelligent server based system as claimed in claim 1, comprising operative client modules comprise selectively standalone surveillance client, internet browser, web client, any hand held devices including mobile device client, and remote event and notification receiver enabling user to receive, view, analyze, search sensory inputs.

5. The integrated intelligent server based system as claimed in claim 1 wherein said recording servers provide for (i) collecting input sensory data from the channels, archiving, tagging, and indexing to seamlessly map in a database or data warehousing system involving any one or more of optimal usage of computing, communication and storage resources, facilitate efficient search, transcoding, retransmission, authentication of data, rendering and viewing of archived data at any point of time and (ii) uploading the input sensory data real time or on demand including streaming video and other sensory content in multiple formats to multiple devices by adjusting the rate of uploading for live viewing in different matrix layout, relaying of the content, local archiving, rendering of the sensory data in multiple forms and formats, by a fail-safe mechanism without affecting speed and performance of on-going operations and services.

6. The integrated intelligent server based system as claimed in claim 1, wherein all the recording servers in the autonomous system auto register themselves by requesting and thereby getting a unique identification number (ID) from the intelligent interface while configuration data related to the recording servers comprising identification of the channels including the video sources it caters to and the network accessible central storage system it uses are stored in a database against said identification number.

7. The integrated intelligent server based system as claimed in claim 1 wherein said intelligent interface is provided for anyone or more of (i) filtering and need based transmission of the sensory data, (ii) directing distribution of alerts (iii) providing a common gateway for heterogeneous entities.

8. The integrated intelligent server based system as claimed in claim 1 comprising central server to serve as a gateway to plurality of said autonomous system and integrate the system into a single unified system.

9. The integrated intelligent server based system as claimed in claim 4 wherein the network accessible central storage system comprising a cluster of one or more network accessible storage devices.

10. The integrated intelligent server based system as claimed in claim 1, wherein the segmented clips of the sensory data includes small granular clips or segments of programmable and variable length sizes and said clips stored in the said local storages of the recording servers, the clip metadata being stored in a local database.

11. The integrated intelligent server based system as claimed in claim 1 wherein said intelligent interface (i) auto registers itself to the system, (ii) accepts request from surveillance clients and relays the same to corresponding recording server and analytic server, (iii) receives configuration data from the surveillance clients and feeds to the intended components of the system, (iv) receives event information from analytic server on-line and transmits to various recipients including remote event receiver, fetches outstanding event clips, if any, (v) periodically receives heartbeat signals alongwith status information from all active devices and relays that to other devices in same or other networks, (vi) streams live video, recorded video or event alerts at appropriate time, (vii) joins multiple channel sensory inputs into a single combined stream to adapt to variable and low bandwidth network, (viii) enables search based on various criteria including data, time, event types, channels, signal features, and other system input and (ix) enables user to perform an user-interactive smart search to filter out desired segment of the sensory input from the database.

12. The integrated intelligent server based system as claimed in claim 1 wherein said recording server group comprise plurality of sensory data recording server to:
record inputs from single/multiple sensory data sources in at least one local storage space database with uniform resource locator of files stored;
transfer the thus stored files from said local storage to a network based central storage for accessing the files for end use/applications;
said transfer of sensory data from the sensory data source to the central storage via said local storage being carried out taking into consideration data download speed (inflow rate) from the sensory data source to the recording server alongwith the availability of network bandwidth at any given point of time for ensuring efficient network bandwidth sharing amongst multiple sensory data sources to said central storage in the network.

13. The integrated intelligent server based system as claimed in claim 12 wherein each of said sensory data recording server monitors available total network bandwidth and per sensory data source inflow rate and based thereon decide rate of per sensory data source the sensory data transfer from the local storage to said central storage.

14. The integrated intelligent server based system as claimed in claim 1 wherein said sensory data from the channels are recorded in the form of the variable length clips wherein the clip duration is set by the user or set by the recording server itself.

15. The integrated intelligent server based system as claimed in claim 1, wherein said recording server determine rate of uploading of the segmented clips of the sensory data received from the channels to the network accessible central storage system by calculating average of the rate for each channel separately in periodic interval involving calculating the rate of clip upload ($U_i$) for a particular channel by
  (a) estimating the sensory data inflow rate ($D_i$) of said particular channel to the recording server;
  (b) identifying the available network bandwidth (B) at that instant from the system;
  (c) calculating the rate of clip upload for the particular channel, based on:

$$U_i = [B \times k \div \Sigma D_i] \times D_i,$$

where 0<k<1, depending on how much of the remaining bandwidth is to be allocated for uploading task.

16. The integrated intelligent server based system as claimed in claim 1 wherein the respective capacity of the recording servers in the recording server group is based on the memory, network bandwidth and current processor utilization within the recording server.

17. The integrated intelligent server based system as claimed in claim 16 wherein the recording server group allocates any one of the operative recording servers in said recording server group as group master server and continuously monitors the recording servers in the group and their respective capacities and decides on the allocation and releases of the channels from any recording servers within the recording server group.

18. The integrated intelligent server based system as claimed in claim 17 the said group master server releases or adds a sensory input source based on required (a) addition of an input source, (b) deletion of an existing input source, (c) addition of a new recording server to the system or when a failed server again re-operates and (d) when a running server stops functioning.

19. An integrated intelligent server based system as claimed in claim 1 comprising multi channel join-split mechanism for low and/or variable bandwidth network link comprising:
  a sender unit to receive multi channel inputs from site to join and compress into a single channel and a receiver unit at client site to receive the inputs and extract the individual channels for the purposes of end use
  said sender unit to combine while transmitting multi channel inputs into a single channel, frame by frame, and controlling the transmission bit rate to avoid jittery outputs and/or any interference between individual channels and/or starvation for any single channel.

* * * * *